United States Patent
Medalsy et al.

(10) Patent No.: US 11,559,945 B2
(45) Date of Patent: *Jan. 24, 2023

(54) MEMBRANE ASSEMBLY FOR A 3D PRINTING SYSTEM

(71) Applicant: NEXA3D INC., Ventura, CA (US)

(72) Inventors: Izhar Medalsy, Ventura, CA (US); Chance Holland, Santa Barbara, CA (US)

(73) Assignee: NEXA3D INC., Ventura, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/249,502

(22) Filed: Mar. 3, 2021

(65) Prior Publication Data

US 2021/0187849 A1 Jun. 24, 2021

Related U.S. Application Data

(63) Continuation of application No. 16/373,449, filed on Apr. 2, 2019, now Pat. No. 10,967,573.

(51) Int. Cl.
*B29C 64/255* (2017.01)
*B29C 64/124* (2017.01)
*B29C 64/245* (2017.01)
*B29C 35/08* (2006.01)
(Continued)

(52) U.S. Cl.
CPC ........ *B29C 64/255* (2017.08); *B29C 35/0805* (2013.01); *B29C 64/124* (2017.08); *B29C 64/245* (2017.08); *B29C 2035/0827* (2013.01); *B33Y 30/00* (2014.12); *B33Y 40/00* (2014.12)

(58) Field of Classification Search
CPC ........................... B29C 64/245; B29C 64/255
See application file for complete search history.

(56) References Cited

U.S. PATENT DOCUMENTS

| 5,122,441 A | 6/1992 | Lawton et al. |
| 5,248,249 A | 9/1993 | Yamamoto et al. |
| 5,306,446 A | 4/1994 | Howe |

(Continued)

FOREIGN PATENT DOCUMENTS

| CN | 203864020 U | 10/2014 |
| CN | 106881863 A | 6/2017 |

(Continued)

OTHER PUBLICATIONS

Examiner's Report dated Oct. 3, 2022, from the Canadian Intellectual Property Office, for Canadian Patent Application No. 3,130,677, 4 pgs.

(Continued)

*Primary Examiner* — Timothy Kennedy
(74) *Attorney, Agent, or Firm* — Ascenda Law Group, PC

(57) ABSTRACT

A tank assembly for a 3D printing system may include a membrane assembly that is releasably secured to a bottom rim of a tank sidewall of the tank assembly. The securing mechanism may include one or more of a friction-fit coupling and a magnetic coupling. The membrane assembly may include a frame, a radiation-transparent flexible membrane and a membrane securing member. A peripheral portion of the flexible membrane may be secured within a groove of the frame by the membrane securing member. The tank sidewall may include one or more components for supplying fresh resin to the tank assembly and one or more components for draining used resin from the tank assembly.

10 Claims, 48 Drawing Sheets

(51) Int. Cl.
B33Y 30/00 (2015.01)
B33Y 40/00 (2020.01)

(56) References Cited

U.S. PATENT DOCUMENTS

| | | |
|---|---|---|
| 5,340,433 A | 8/1994 | Crump |
| 5,426,722 A | 6/1995 | Batchelder |
| 5,491,643 A | 2/1996 | Batchelder |
| 5,503,785 A | 4/1996 | Crump et al. |
| 5,587,913 A | 12/1996 | Abrams et al. |
| 5,625,495 A | 4/1997 | Moskovich |
| 5,653,925 A | 8/1997 | Batchelder |
| 5,764,521 A | 6/1998 | Batchelder et al. |
| 5,900,207 A | 5/1999 | Danforth et al. |
| 6,028,410 A | 2/2000 | Leavitt et al. |
| 6,054,077 A | 4/2000 | Comb et al. |
| 6,067,480 A | 5/2000 | Stuffle et al. |
| 6,085,957 A | 7/2000 | Zinniel et al. |
| 6,238,613 B1 | 5/2001 | Batchelder et al. |
| 6,367,791 B1 | 4/2002 | Calderon et al. |
| 6,437,034 B2 | 8/2002 | Lombardi et al. |
| 6,547,995 B1 | 4/2003 | Comb |
| 6,578,596 B1 | 6/2003 | Batchelder et al. |
| 6,629,011 B1 | 9/2003 | Calderon et al. |
| 6,685,866 B2 | 2/2004 | Swanson et al. |
| 6,749,414 B1 | 6/2004 | Hanson et al. |
| 6,790,403 B1 | 9/2004 | Priedeman, Jr. et al. |
| D514,913 S | 2/2006 | Dunn et al. |
| 7,063,285 B1 | 6/2006 | Turley et al. |
| 7,255,821 B2 | 8/2007 | Priedeman, Jr. et al. |
| 7,297,304 B2 | 11/2007 | Swanson et al. |
| 7,534,386 B2 | 5/2009 | Priedeman, Jr. |
| 7,896,209 B2 | 3/2011 | Batchelder et al. |
| 7,897,074 B2 | 3/2011 | Batchelder et al. |
| 7,910,041 B1 | 3/2011 | Priedeman, Jr. |
| 8,014,889 B2 | 9/2011 | Zinniel et al. |
| 8,033,811 B2 | 10/2011 | Swanson et al. |
| D650,787 S | 12/2011 | Taatjes et al. |
| 8,153,182 B2 | 4/2012 | Comb et al. |
| 8,153,183 B2 | 4/2012 | Skubic et al. |
| 8,155,775 B2 | 4/2012 | Batchelder |
| 8,157,202 B2 | 4/2012 | Taatjes et al. |
| D663,191 S | 7/2012 | Taatjes et al. |
| 8,215,371 B2 | 7/2012 | Batchelder |
| 8,221,858 B2 | 7/2012 | Mannella et al. |
| 8,222,908 B2 | 7/2012 | Paul et al. |
| 8,227,540 B2 | 7/2012 | Priedeman et al. |
| 8,245,757 B2 | 8/2012 | Crump et al. |
| 8,287,959 B2 | 10/2012 | Batchelder |
| D673,605 S | 1/2013 | Johnson et al. |
| 8,419,996 B2 | 4/2013 | Swanson et al. |
| D682,490 S | 5/2013 | Goetzke et al. |
| 8,465,111 B2 | 6/2013 | Swanson et al. |
| 8,598,509 B2 | 12/2013 | Batchelder |
| 8,609,204 B2 | 12/2013 | Kritchman |
| 8,636,850 B2 | 1/2014 | Narovlyansky et al. |
| 8,663,533 B2 | 3/2014 | Swanson et al. |
| 8,663,568 B2 | 3/2014 | Bar Nathan et al. |
| 8,815,141 B2 | 8/2014 | Swanson et al. |
| 8,955,558 B2 | 2/2015 | Bosveld et al. |
| 8,961,167 B2 | 2/2015 | Swanson et al. |
| 8,974,715 B2 | 3/2015 | Hopkins et al. |
| 8,986,767 B2 | 3/2015 | Batchelder |
| 9,027,378 B2 | 5/2015 | Crump et al. |
| 9,050,753 B2 | 6/2015 | Rodgers et al. |
| 9,050,788 B2 | 6/2015 | Swanson et al. |
| D734,788 S | 7/2015 | Reches et al. |
| 9,073,263 B2 | 7/2015 | Mannella et al. |
| 9,090,428 B2 | 7/2015 | Batchelder et al. |
| 9,108,360 B2 | 8/2015 | Comb et al. |
| 9,141,015 B2 | 9/2015 | Hanson et al. |
| D741,149 S | 10/2015 | Koop et al. |
| 9,174,388 B2 | 11/2015 | Batchelder et al. |
| 9,174,389 B2 | 11/2015 | Swanson |
| 9,205,601 B2 | 12/2015 | Desimone et al. |
| 9,205,690 B2 | 12/2015 | Leavitt et al. |
| 9,215,882 B2 | 12/2015 | Zimmerman et al. |
| 9,233,506 B2 | 1/2016 | Leavitt |
| 9,238,329 B2 | 1/2016 | Swanson et al. |
| 9,321,609 B2 | 4/2016 | Koop et al. |
| 9,334,402 B2 | 5/2016 | Napadensky |
| 9,359,499 B2 | 6/2016 | Cernohous |
| 9,399,320 B2 | 7/2016 | Johnson et al. |
| 9,423,756 B2 | 8/2016 | Hanson et al. |
| 9,427,838 B2 | 8/2016 | Comb et al. |
| 9,483,588 B2 | 11/2016 | Nehme et al. |
| 9,511,547 B2 | 12/2016 | Swanson et al. |
| 9,523,934 B2 | 12/2016 | Orrock et al. |
| 9,527,247 B2 | 12/2016 | Dikovsky et al. |
| D777,251 S | 1/2017 | Reches et al. |
| 9,546,270 B2 | 1/2017 | Hirsch et al. |
| 9,550,327 B2 | 1/2017 | Swanson et al. |
| 10,328,634 B2 | 6/2019 | Zitelli et al. |
| 2009/0179355 A1 | 7/2009 | Wicker et al. |
| 2010/0140849 A1 | 6/2010 | Comb et al. |
| 2010/0161105 A1 | 6/2010 | Blake |
| 2011/0117268 A1 | 5/2011 | Batchelder et al. |
| 2012/0258190 A1 | 10/2012 | Batchelder et al. |
| 2013/0186549 A1 | 7/2013 | Comb et al. |
| 2013/0186558 A1 | 7/2013 | Comb et al. |
| 2013/0224423 A1 | 8/2013 | Mikulak et al. |
| 2013/0297063 A1 | 11/2013 | Kritchman et al. |
| 2014/0036455 A1 | 2/2014 | Napadensky |
| 2014/0052288 A1 | 2/2014 | El-Siblani et al. |
| 2014/0127524 A1 | 5/2014 | Batchelder et al. |
| 2014/0141166 A1 | 5/2014 | Rodgers |
| 2014/0265032 A1 | 9/2014 | Teicher et al. |
| 2014/0319716 A1 | 10/2014 | Shtilerman |
| 2014/0339720 A1 | 11/2014 | Menchik et al. |
| 2014/0358273 A1 | 12/2014 | LaBossiere et al. |
| 2015/0001750 A1 | 1/2015 | Kozlak et al. |
| 2015/0024317 A1 | 1/2015 | Orrock et al. |
| 2015/0028523 A1 | 1/2015 | Jaker et al. |
| 2015/0037587 A1 | 2/2015 | Sella |
| 2015/0076739 A1 | 3/2015 | Batchelder |
| 2015/0084239 A1 | 3/2015 | Batchelder et al. |
| 2015/0097053 A1 | 4/2015 | Batchelder et al. |
| 2015/0097307 A1 | 4/2015 | Batchelder et al. |
| 2015/0097308 A1 | 4/2015 | Batchelder et al. |
| 2015/0145171 A1 | 5/2015 | Walker et al. |
| 2015/0145174 A1 | 5/2015 | Comb |
| 2015/0148931 A1 | 5/2015 | Heide |
| 2015/0152217 A1 | 6/2015 | Cernohous et al. |
| 2015/0158691 A1 | 6/2015 | Mannella et al. |
| 2015/0209836 A1 | 7/2015 | Dunn et al. |
| 2015/0210010 A1 | 7/2015 | Napadensky |
| 2015/0224709 A1 | 8/2015 | Napadensky |
| 2015/0224710 A1 | 8/2015 | El-Siblani |
| 2015/0224714 A1 | 8/2015 | Swanson et al. |
| 2015/0224717 A1 | 8/2015 | Kritchman |
| 2015/0251353 A1 | 9/2015 | Rodgers et al. |
| 2015/0251356 A1 | 9/2015 | Batchelder |
| 2015/0252190 A1 | 9/2015 | Rodgers et al. |
| 2015/0259530 A1 | 9/2015 | Rodgers et al. |
| 2015/0266236 A1 | 9/2015 | Farah et al. |
| 2015/0266241 A1 | 9/2015 | Batchelder |
| 2015/0266242 A1 | 9/2015 | Comb et al. |
| 2015/0273582 A1 | 10/2015 | Crump et al. |
| 2015/0273767 A1 | 10/2015 | Batchelder et al. |
| 2015/0352788 A1 | 12/2015 | Livingston et al. |
| 2015/0360417 A1 | 12/2015 | Kritchman et al. |
| 2016/0009027 A1 | 1/2016 | Martin |
| 2016/0023373 A1 | 1/2016 | Demuth et al. |
| 2016/0033756 A1 | 2/2016 | Miller |
| 2016/0039120 A1 | 2/2016 | Dikovsky et al. |
| 2016/0039146 A1 | 2/2016 | Swanson et al. |
| 2016/0039147 A1 | 2/2016 | Crump et al. |
| 2016/0046072 A1 | 2/2016 | Rolland et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0082655 A1 | 3/2016 | Castanon et al. |
| 2016/0107383 A1 | 4/2016 | Dikovsky et al. |
| 2016/0114535 A1 | 4/2016 | Kritchman et al. |

(56) References Cited

U.S. PATENT DOCUMENTS

| | | |
|---|---|---|
| 2016/0122541 A1 | 5/2016 | Jaker et al. |
| 2016/0129645 A1 | 5/2016 | Wighton et al. |
| 2016/0136890 A1 | 5/2016 | Castanon et al. |
| 2016/0161872 A1 | 6/2016 | Orrock et al. |
| 2016/0167313 A1 | 6/2016 | Swanson et al. |
| 2016/0176120 A1 | 6/2016 | Skubic et al. |
| 2016/0193786 A1 | 7/2016 | Moore et al. |
| 2016/0193791 A1 | 7/2016 | Swanson et al. |
| 2016/0200052 A1 | 7/2016 | Moore et al. |
| 2016/0229123 A1 | 8/2016 | Carlson et al. |
| 2016/0236421 A1 | 8/2016 | Mannella et al. |
| 2016/0236899 A1 | 8/2016 | Beery et al. |
| 2016/0250810 A1 | 9/2016 | Lynch August et al. |
| 2016/0251486 A1 | 9/2016 | Cernohous et al. |
| 2016/0257033 A1 | 9/2016 | Jayanti et al. |
| 2016/0263830 A1 | 9/2016 | Batchelder et al. |
| 2016/0263837 A1 | 9/2016 | Goldman et al. |
| 2016/0303793 A1 | 10/2016 | Ermoshkin et al. |
| 2016/0303795 A1 | 10/2016 | Liu et al. |
| 2016/0311158 A1 | 10/2016 | DeSimone et al. |
| 2016/0325493 A1 | 11/2016 | DeSimone et al. |
| 2016/0339643 A1 | 11/2016 | Dikovsky et al. |
| 2016/0339646 A1 | 11/2016 | Baecker et al. |
| 2016/0342149 A1 | 11/2016 | Napadensky |
| 2016/0361763 A1 | 12/2016 | Batchelder et al. |
| 2016/0369096 A1 | 12/2016 | Rolland et al. |
| 2016/0375636 A1 | 12/2016 | Rodgers et al. |
| 2016/0378004 A1 | 12/2016 | Martin |
| 2017/0050389 A1 | 2/2017 | Lee |
| 2017/0129167 A1 | 5/2017 | Castanon |
| 2017/0151717 A1 | 6/2017 | Li |
| 2018/0029290 A1 | 2/2018 | Bottiglio et al. |
| 2018/0029296 A1 | 2/2018 | Van Esbroeck et al. |
| 2018/0029311 A1 | 2/2018 | Depalma et al. |
| 2018/0036941 A1 | 2/2018 | Xu et al. |
| 2018/0136514 A1 | 5/2018 | van Esbroeck et al. |
| 2018/0200948 A1 | 7/2018 | Kuijpers et al. |
| 2018/0333917 A1 | 11/2018 | Lee et al. |
| 2018/0341184 A1 | 11/2018 | Hundley et al. |
| 2019/0116938 A1 | 4/2019 | DeHaven et al. |
| 2019/0212572 A1 | 7/2019 | Tomioka |
| 2020/0001525 A1 | 1/2020 | Wynne et al. |
| 2020/0180215 A1 | 6/2020 | Truong |

FOREIGN PATENT DOCUMENTS

| | | |
|---|---|---|
| CN | 107336438 A | 11/2017 |
| CN | 107428084 A | 12/2017 |
| CN | 206840705 U | 1/2018 |
| CN | 108773067 A | 11/2018 |
| JP | 2948893 B2 | 9/1999 |
| JP | 2014-518171 A | 7/2014 |
| JP | 2018-515379 A | 6/2018 |
| WO | WO9937453 A1 | 7/1999 |
| WO | WO9937454 A1 | 7/1999 |
| WO | WO9937456 A1 | 7/1999 |
| WO | WO9937457 A1 | 7/1999 |
| WO | WO9960508 A1 | 11/1999 |
| WO | WO2007005236 A1 | 11/2007 |
| WO | WO2009088420 A1 | 7/2009 |
| WO | WO2009088423 A1 | 7/2009 |
| WO | WO2012140658 A2 | 10/2012 |
| WO | WO2012140658 A3 | 10/2012 |
| WO | WO2014149312 A1 | 9/2014 |
| WO | WO2014186463 A1 | 11/2014 |
| WO | WO2015084422 A1 | 6/2015 |
| WO | WO2015145439 A1 | 10/2015 |
| WO | WO2015164234 A1 | 10/2015 |
| WO | WO2015170330 A1 | 11/2015 |
| WO | WO2015175682 A1 | 11/2015 |
| WO | WO2016009426 A1 | 1/2016 |
| WO | WO2016010946 A1 | 1/2016 |
| WO | WO2016014088 A1 | 1/2016 |
| WO | WO2016014543 A1 | 1/2016 |
| WO | WO2016049642 A1 | 3/2016 |
| WO | WO2016063282 A1 | 4/2016 |
| WO | WO2016081410 A1 | 5/2016 |
| WO | WO2016085965 A1 | 6/2016 |
| WO | WO2016106136 A2 | 6/2016 |
| WO | WO2016106136 A3 | 6/2016 |
| WO | WO2016109550 A1 | 7/2016 |
| WO | 2016/122408 A1 | 8/2016 |
| WO | WO2016123499 A1 | 8/2016 |
| WO | WO2016123506 A1 | 8/2016 |
| WO | WO2016125170 A1 | 8/2016 |
| WO | WO2016126796 A2 | 8/2016 |
| WO | WO2016126796 A3 | 8/2016 |
| WO | WO2016133759 A1 | 8/2016 |
| WO | WO2016138345 A1 | 9/2016 |
| WO | WO2016140886 A1 | 9/2016 |
| WO | WO2016140891 A1 | 9/2016 |
| WO | WO2016142947 A2 | 9/2016 |
| WO | WO2016142947 A3 | 9/2016 |
| WO | WO2016145050 A1 | 9/2016 |
| WO | WO2016145182 A1 | 9/2016 |
| WO | WO2016149097 A1 | 9/2016 |
| WO | WO2016149104 A1 | 9/2016 |
| WO | WO2016149151 A1 | 9/2016 |
| WO | WO2016151586 A1 | 9/2016 |
| WO | WO2016172784 A1 | 11/2016 |
| WO | WO2016172788 A1 | 11/2016 |
| WO | WO2016172804 A1 | 11/2016 |
| WO | WO2016172805 A1 | 11/2016 |
| WO | WO2016191473 A1 | 12/2016 |
| WO | WO2016199131 A1 | 12/2016 |
| WO | WO2016205690 A1 | 12/2016 |
| WO | WO2017009830 A1 | 1/2017 |
| WO | WO2017009831 A1 | 1/2017 |
| WO | WO2017009832 A1 | 1/2017 |
| WO | WO2017009833 A1 | 1/2017 |
| WO | WO2017056124 A1 | 4/2017 |
| WO | 2017/165832 A1 | 9/2017 |
| WO | WO2017210298 A1 | 12/2017 |
| WO | WO2017219942 A1 | 12/2017 |
| WO | WO2018006029 A1 | 1/2018 |
| WO | WO2018032531 A1 | 2/2018 |
| WO | WO2019014098 A1 | 1/2019 |

OTHER PUBLICATIONS

Examination Report dated Feb. 23, 2022, from the Intellectual Property India, The Patent Office, for India Patent Application No. 202117034931 (filed Aug. 3, 2021), 5 pgs.

Examination Report dated Apr. 22, 2022, from the Intellectual Property India, The Patent Office, for India Patent Application No. 202117038096 (filed Aug. 23, 2021), 6 pgs.

Notice of Allowance dated Aug. 31, 2021, for U.S. Appl. No. 16/745,158, filed Jan. 16, 2020, 10 pgs.

Amendment filed Aug. 12, 2021, for U.S. Appl. No. 16/745,158, filed Jan. 16, 2020, 7 pgs.

Final Office Action dated Jul. 19, 2021, for U.S. Appl. No. 16/745,158, filed Jan. 16, 2020, 12 pgs.

Amendment filed Jul. 7, 2021, for U.S. Appl. No. 16/745,158, filed Jan. 16, 2020, 8 pgs.

Non-Final Office Action dated Jun. 24, 2021, for U.S. Appl. No. 16/745,158, filed Jan. 16, 2020, 12 pgs.

Notice of Allowance dated Sep. 16, 2021, for U.S. Appl. No. 16/676,940, filed Nov. 7, 2019, 9 pgs.

Amendment filed Sep. 2, 2021, for U.S. Appl. No. 16/676,940, filed Nov. 7, 2019, 7 pgs.

Final Office Action dated Sep. 2, 2021, for U.S. Appl. No. 16/676,940, filed Nov. 7, 2019, 12 pgs.

Amendment filed Aug. 18, 2021, for U.S. Appl. No. 16/676,940, filed Nov. 7, 2019, 10 pgs.

Non-Final Office Action dated Jun. 9, 2021, for U.S. Appl. No. 16/676,940, filed Nov. 7, 2019, 19 pgs.

Notice of Allowance dated Aug. 4, 2021, for U.S. Appl. No. 16/105,307, filed Aug. 20, 2018, 10 pgs.

Advisory Action dated Jun. 18, 2021, for U.S. Appl. No. 16/105,307, filed Aug. 20, 2018, 6 pgs.

(56) References Cited

OTHER PUBLICATIONS

Amendment filed Jun. 18, 2021, for U.S. Appl. No. 16/105,307, filed Aug. 20, 2018, 9 pgs.
Amendment filed May 14, 2021, for U.S. Appl. No. 16/105,307, filed Aug. 20, 2018, 8 pgs.
Final Office Action dated Apr. 28, 2021, for U.S. Appl. No. 16/105,307, filed Aug. 20, 2018, 19 pgs.
International Search Report and Written Opinion dated Oct. 12, 2018, from the ISA/EPO, for International Patent Application No. PCT/US2018/041225 (filed Jul. 9, 2018), 14 pages.
International Application No. PCT/US2019/045214; International Search Report and Written Opinion; ISA/EP; dated Nov. 26, 2019; 16 pages.
International Search Report and Written Opinion dated Jun. 24, 2020, from the ISA/European Patent Office, for International Application No. PCT/US2019/060219 (filed Nov. 7, 2019), 22 pgs.
International Search Report and Written Opinion dated Jul. 7, 2020, from ISA/European Patent Office, for International Patent Application No. PCT/US2020/026342 (filed Apr. 2, 2020), 49 pages.
International Preliminary Report on Patentability dated Feb. 17, 2021, for International Patent Application No. PCT/US2020/026342 (filed Apr. 2, 2020), 10 pgs.
International Search Report dated May 7, 2020, from the ISA/European Patent Office, for International Application No. PCT/US2020/013895 (filed Jan. 16, 2020), 3 pgs.
Written Opinion dated May 7, 2020, from the ISA/European Patent Office, for International Application No. PCT/US2020/013895 (filed Jan. 16, 2020), 6 pgs.
Non-Final Office Action dated Jan. 7, 2021, from U.S. Appl. No. 16/105,307, filed Aug. 20, 2018, 14 pgs.
Amendment filed Jan. 25, 2021, from U.S. Appl. No. 16/105,307, filed Aug. 20, 2018, 12 pgs.
Non-Final Office Action dated Jan. 21, 2021, from U.S. Appl. No. 16/373,449, filed Apr. 2, 2019, 11 pgs.
Amendment filed Feb. 5, 2021, from U.S. Appl. No. 16/373,449, filed Apr. 2, 2019, 8 pgs.
Notice of Allowance dated Feb. 17, 2021, from U.S. Appl. No. 16/373,449, filed Apr. 2, 2019, 8 pgs.
Written Opinion of the International Preliminary Examining Authority dated Feb. 16, 2021, from the IPEA/European Patent Office, for International Patent Application No. PCT/US2020/013895 (filed Jan. 16, 2020), 6 pgs.
International Preliminary Report on Patentability dated May 20, 2021, from the The International Bureau of WIPO, for International Patent Application No. PCT/US2019/060219 (filed Nov. 7, 2019), 14 pgs.
International Preliminary Report on Patentability dated Apr. 1, 2021, from teh IPEA/US, for International Patent Application No. PCT/US2019/045214 (filed Aug. 6, 2019), 13 pgs.
First Office Action dated Jun. 29, 2022, from the State Intellectual Property Office of the P.R.C., for Chinese Patent Application No. 201980069128.4 (filed Apr. 20, 2021), 9 pgs.
International Preliminary Report on Patentability dated Jun. 14, 2021, from the IPEA/European Patent Office, for International Patent Application No. PCT/US2020/013895 (filed Jan. 16, 2020), 14 pgs.
Examination Report No. 1 dated Jun. 29, 2022, from the Australian Government, IP Australia, for Australian Application No. 2020253460, 5 pgs.
Notice of Preliminary Rejection dated Oct. 25, 2022, from the Korean Intellectual Property Office (KIPO), for Korean Patent Application No. 10-2021-7030242, 8 pgs.
Office Action dated Oct. 31, 2022, from the Japanese Patent Office (JPO), for Japanese Patent Application No. 2021-559060, 4 pgs.

MEMBRANE ASSEMBLY FOR A 3D PRINTING SYSTEM

RELATED APPLICATIONS

This application is a Continuation Application of U.S. application Ser. No. 16/373,449, filed on 2 Apr. 2019 (now issued as U.S. Pat. No. 10,967,573), incorporated by reference herein.

FIELD OF THE INVENTION

The present invention relates to a tank assembly and components of the tank assembly for a 3D (i.e., three-dimensional) printing system, and more particularly relates to a membrane assembly that is releasably secured to a bottom rim of a tank sidewall of the tank assembly.

BACKGROUND 3D printing is becoming ever more widespread, allowing three-dimensional objects to be fabricated (often in a short amount of time) in any facility (i.e., room, garage, laboratory, etc.). Typically, cross-sections of a three-dimensional object are modelled and saved into a digital format, and the three-dimensional object is fabricated layer by layer using the cross-sectional models.

SUMMARY OF THE INVENTION

In one embodiment of the invention, a tank assembly for a 3D printing system may include a membrane assembly that is releasably secured to a bottom rim of a tank sidewall of the tank assembly (i.e., can be secured to the bottom rim and then at a later time, removed from the bottom rim).

In a first embodiment of the membrane assembly, the membrane assembly includes a frame, a radiation-transparent flexible membrane and a membrane securing member. A peripheral portion of the flexible membrane may be secured, by the membrane securing member, within a groove disposed on a bottom surface of the frame. The size and shape of the frame may be complementary to the size and shape of the bottom rim of the tank sidewall. More specifically, an inner side surface of the frame may press against an outer side surface of the bottom rim. Ribs may be present on the frame and/or bottom rim in this region where the frame contacts the bottom rim. A magnetic coupling mechanism may additionally be used to more securely affix the frame to the bottom rim of the tank sidewall.

In a second embodiment of the membrane assembly, the membrane assembly includes a frame, a radiation-transparent flexible membrane and a membrane securing member. The frame may include a flange portion that is joined to a hollow shaft portion. A peripheral portion of the flexible membrane may be secured, by the membrane securing member, to an outer side surface of the hollow shaft portion and, additionally, to the bottom surface of the flange portion. The size and shape of the frame may be complementary to the size and shape of the bottom rim of the tank sidewall. More specifically, an inner side surface of the frame may press against an outer side surface of the bottom rim. Ribs may be present on the frame and/or bottom rim in this region where the frame contacts the bottom rim. A magnetic coupling mechanism may additionally be used to more securely affix the frame to the bottom rim of the tank sidewall.

In a third embodiment of the membrane assembly, the membrane assembly includes a radiation-transparent flexible membrane and a membrane securing member. The membrane securing member is configured to secure the membrane directly to the bottom rim of the tank sidewall.

The tank sidewall may include one or more components for supplying fresh (or cooled) resin into the tank assembly as well as one or more components for draining used (or warmed) resin from the tank assembly. In the resin supplying pathway, a channel may fluidly couple a first tube coupling member to an inlet that supplies fresh resin into the cavity of the tank assembly. The first tube coupling member, in turn, may be coupled to a tube that supplies fresh resin. In the resin draining pathway, a channel may fluidly couple a second tube coupling member to an outlet that drains resin from the cavity of the tank assembly. The second tube coupling member, in turn, may be coupled to a tube that drains used resin from the cavity of the tank assembly.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps.

Figure 1:
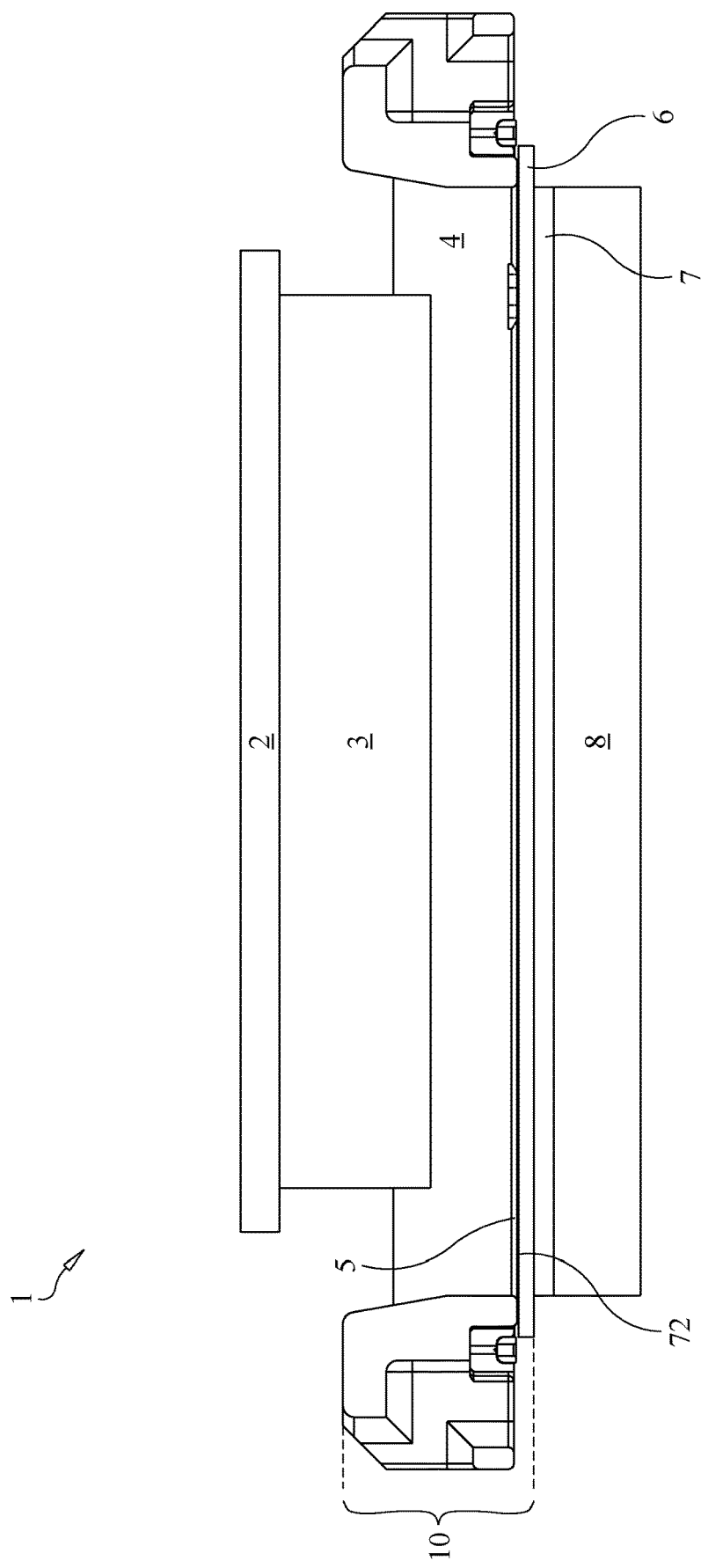
FIG. 1 depicts a cross-sectional view of a 3D printing system, in accordance with one embodiment of the invention.

FIG. 1 depicts a cross-section of 3D printing system 1, in which electromagnetic radiation (e.g., ultra-violet light) is used to cure photo-curing liquid polymer 4 (also called "resin") in order to fabricate object 3 (e.g., a 3D object). Object 3 may be fabricated layer by layer (i.e., a new layer of object may be formed by photo-curing a layer of resin 4 adjacent to the bottom surface of object 3; object 3 may be raised by extractor plate 2, allowing a new layer of resin 4 to be drawn under the newly formed layer; and the process may be repeated to form additional layers of object 3).

3D printing system 1 may include tank assembly 10 for containing resin 4. The bottom of tank assembly 10 may include an electromagnetic transparent opening to allow electromagnetic radiation from light source 8 to enter into tank assembly 10. A radiation-transparent backing member 6 may be used, in part, to form the electromagnetic transparent opening. In one embodiment, backing member 6 may be made from borosilicate glass. A mask 7 (e.g., a liquid crystal layer) may be disposed between light source 8 and the resin 4 so as to allow the selective curing of the resin (which allows the formation of 3D object with intricate shapes/patterns). In various embodiments, collimation and diffusion elements such as lenses, reflectors, filters, and/or films may be positioned between mask 7 and light source 8. These elements are not shown in the illustrations so as not to unnecessarily obscure the drawings.

One challenge faced by 3D printing systems is that in addition to adhering to the object, the newly formed layer has a tendency for adhering to the bottom of tank assembly 10, which is not desired, as the newly formed layer could tear off from object 3 when object 3 is raised by extractor plate 2. To address this issue, a flexible membrane 72 (also called a self-lubricating membrane) may be disposed adjacent to backing member 6. In some embodiments, flexible membrane 72 may be a silicone membrane, silicone membrane treated with a lubricant (e.g., silicone oil), or a silicone membrane that releases a layer of lubricant 5 onto the surface of flexible membrane 72 over time. Flexible membrane 72 and/or lubricant layer 5 may reduce the likelihood for the newly formed layer to adhere to the bottom of tank assembly 10. Either or both of liquid lubricant 5 and flexible membrane 72 may be enriched with polytetrafluoroethylene (PTFE) to further increase the "non-stick" quality of flexible membrane 72 and/or lubricant layer 5. Both flexible membrane 72 and liquid lubricant 5 are also radiation-transparent so as to allow electromagnetic radiation from light source 8 to enter into tank assembly 10 in order to cure resin 4.

In the following discussion, a particular embodiment of tank assembly 10 will be discussed. Backing member 6 of tank assembly 10 will not be further depicted, but it is understood that tank assembly 10 may include backing member 6. Other components of 3D printing system 1, such as extractor plate 2, object 3, resin 4, mask 7 and light source 8, have been discussed in FIG. 1 to provide some context for understanding the various embodiments of the invention, but will not be depicted further for conciseness.

Figure 2A:
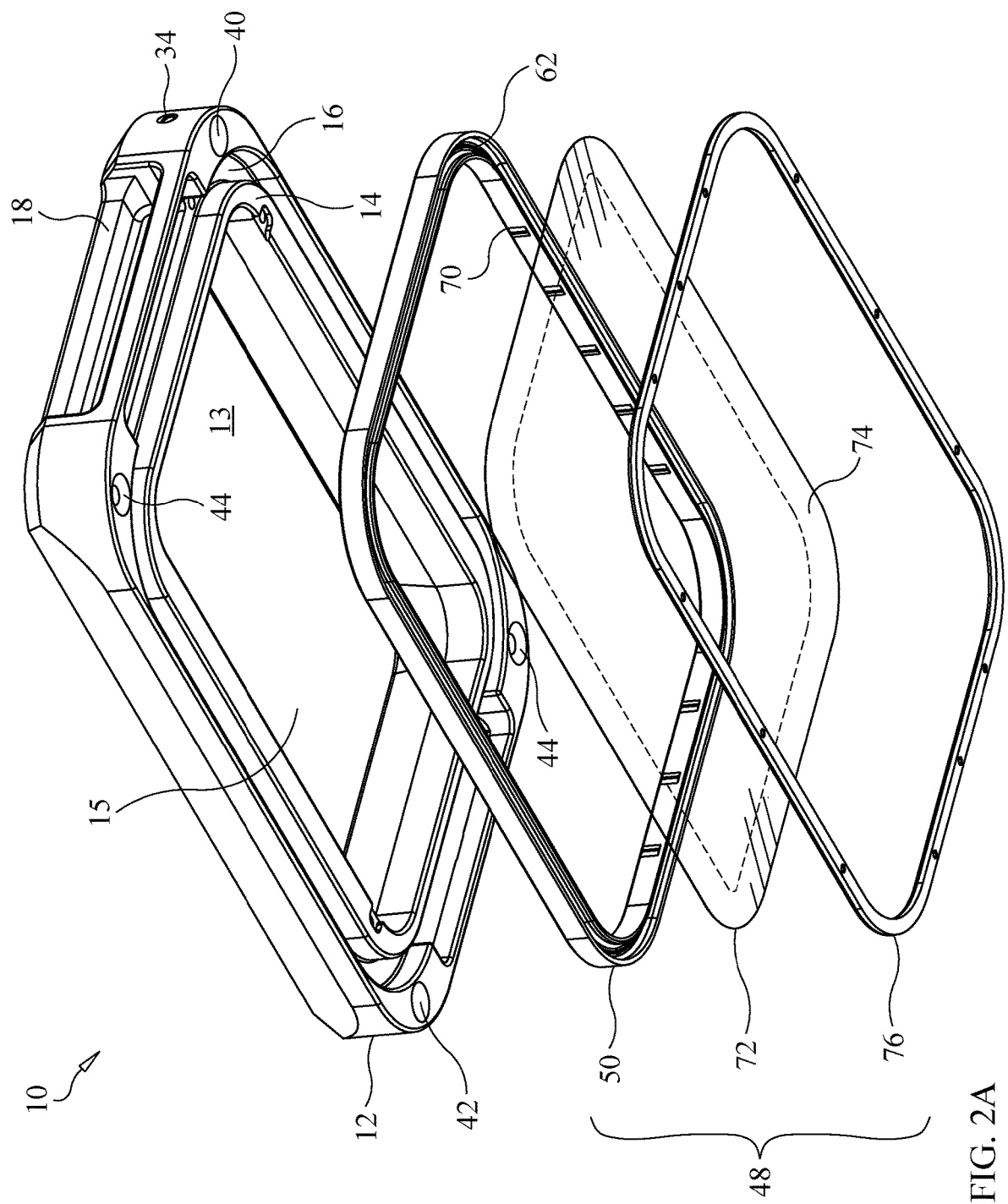
FIG. 2A depicts a perspective—exploded view of a tank assembly showing details on the bottom and side surfaces of the tank assembly components, in accordance with one embodiment of the invention.

FIG. 2A depicts a perspective—exploded view of tank assembly 10 showing details on the bottom and side surfaces of the tank assembly components. Tank assembly 10 may include tank sidewall 12 and membrane assembly 48. Tank sidewall 12 may surround central cavity 13. Membrane assembly 48 may include frame 50, flexible membrane 72 and membrane securing member 76. As will be explained in detail below, membrane securing member 76 may be configured to secure perimeter portion 74 of flexible membrane 72 to frame 50. Also, as will be explained in detail below, membrane assembly 48 may be configured to be coupled to bottom rim 14 of tank sidewall 12. More specifically, membrane assembly 48 may be configured to seal central opening 15 of bottom rim 14 of tank sidewall 12, in which central opening 15 is conjoined with central cavity 13 of tank sidewall 12. The coupling between membrane assembly 48 and tank sidewall 12 may be a friction-fit coupling, and ribs 70 on an inner side surface of frame 50 may increase a degree of friction between membrane assembly 48 and tank sidewall 12.

In one embodiment, groove 16 may be present on a bottom surface of tank sidewall 12, and frame 50 of membrane assembly 48 may be inserted within such groove. A size and shape of membrane assembly 48 may be complementary to a size and shape of bottom rim 14 of tank sidewall 12. More specifically, the outline of membrane assembly 48 and the outline of bottom rim 14 may both be rectangular in shape (even more specifically, a rectangle with rounded corners). The size (i.e., dimensions in terms of length and width) of membrane assembly 48 may be slightly larger than the size of bottom rim 14, allowing the inner side surface of frame 50 to contact the outer side surface of bottom rim 14.

Also depicted in the exploded—perspective view of FIG. 2A are certain receptacles located on the bottom surface of tank sidewall 12. Leg receptacles 44 may be configured to receive legs of the tank assembly. Tube coupling member receptacle 40 may be configured to receive tube coupling member 30 (depicted later in FIG. 3A) for coupling a tube that supplies fresh resin, and tube coupling member receptacle 42 may be configured to receive tube coupling member 32 (depicted later in FIG. 3A) for coupling a tube that drains used resin. Also, port 34 may be present for supplying an additive or other substance to the fresh resin. Such details will become clearer in the subsequent drawings in which the tube coupling members are depicted. While not visible in FIG. 2A, tube coupling member receptacle 42 may also be associated with a port, an in such case, the port may be used as another drain, in addition to tube coupling member 32 (depicted later in FIG. 3A).

Tank sidewall 12 may also include handles 18 on two opposing sides (although only one handle is visible in the view of FIG. 2A) for a person to move and/or transport tank assembly 10 and/or tank sidewall 12.

Figure 2B:
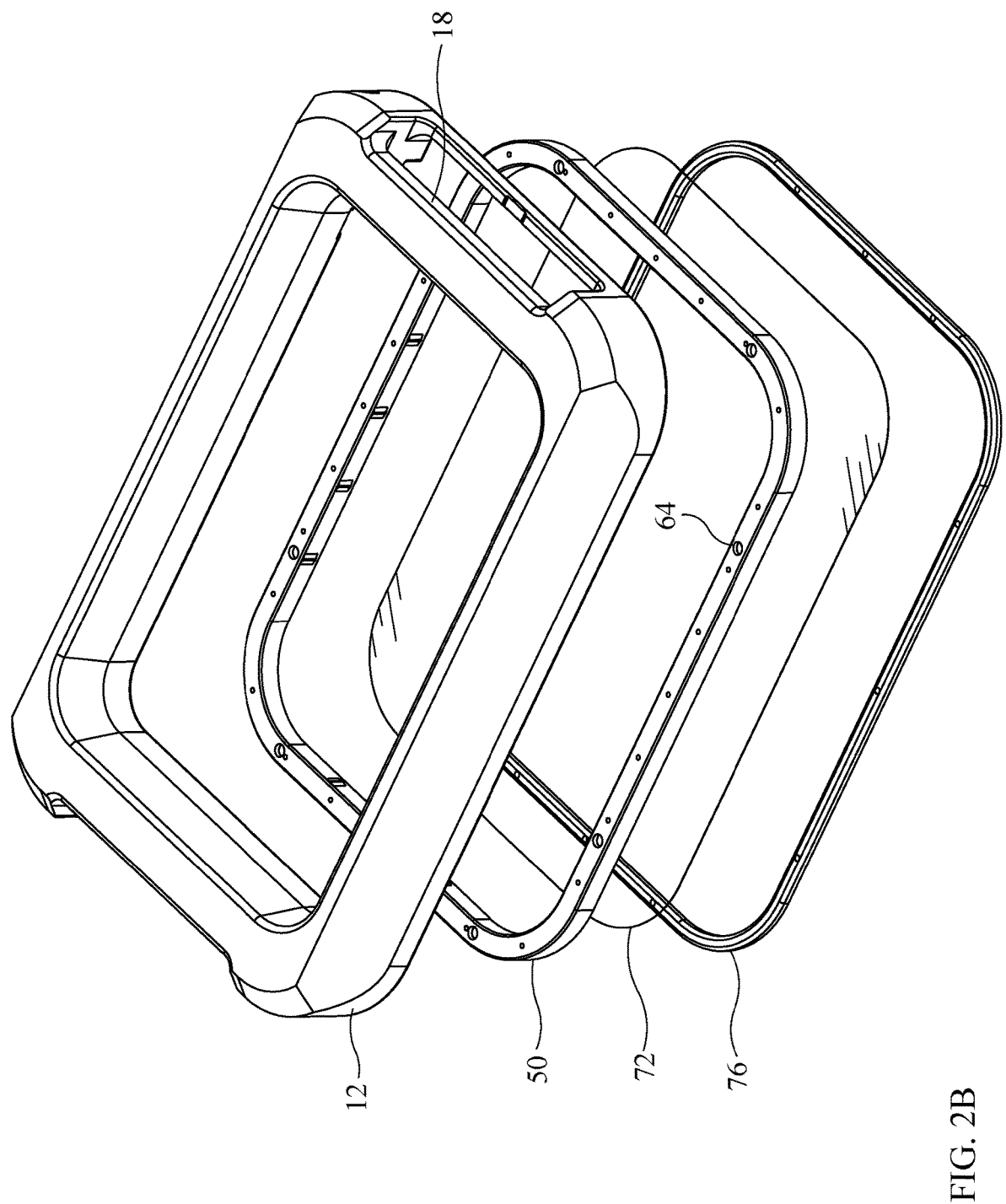
FIG. 2B depicts a perspective—exploded view of a tank assembly showing details on the top and side surfaces of the tank assembly components, in accordance with one embodiment of the invention.

FIG. 2B depicts a perspective—exploded view of tank assembly 10 showing details on the top and side surfaces of the tank assembly components. Additionally visible in the view of FIG. 2B are magnets 64 (or materials that are attracted to magnets, such as iron, nickel and cobalt) which may be present on frame 50 to increase the strength of coupling between membrane assembly 48 and tank sidewall 12. While not visible in FIG. 2B, magnets of an opposite polarity to magnets 64 (or materials that are attracted to magnets) may be present in groove 16 of tank sidewall 12 to allow membrane assembly 48 and tank sidewall 12 to be releasably coupled to one another. It is understood that the above-described friction-fit and magnetic coupling means are only two possible coupling mechanisms, and that other coupling mechanisms are possible, such as an electrostatic coupling, a suction coupling, a coupling using a weak adhesive, etc.

Figure 2C:
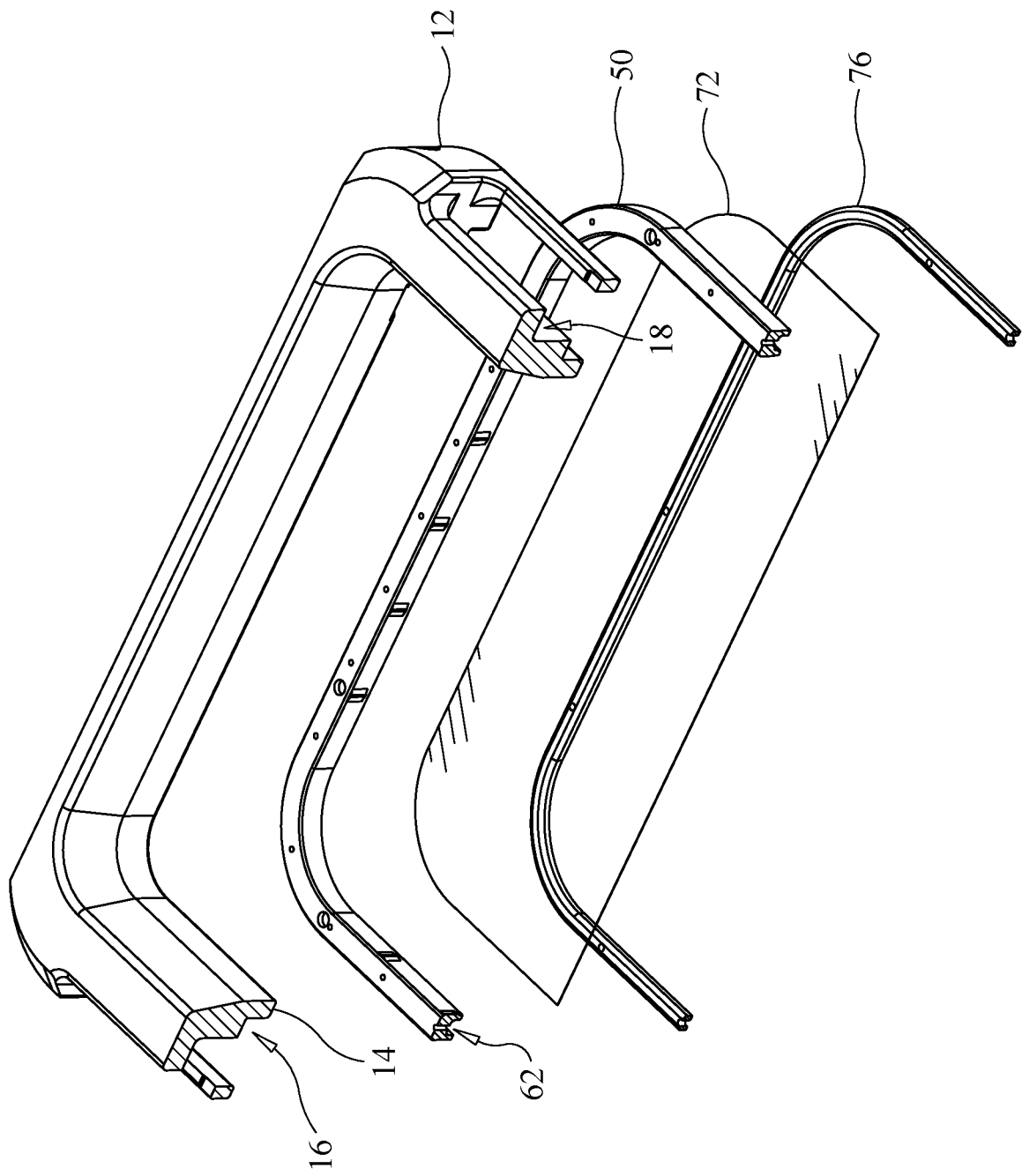
FIG. 2C depicts a cross-sectional—perspective—exploded view of a tank assembly, in accordance with one embodiment of the invention.

FIG. 2C depicts a cross-sectional—perspective—exploded view of tank assembly 10. As shown, the cross section of groove 62 of frame 50 may have an up-side-down U-profile that is complementary to the cross section of membrane securing member 76. Similarly the cross section of groove 16 of tank sidewall 12 may have a profile that is complementary to the cross section of frame 50. In the cross-sectional view of FIG. 2C, groove 16 has an up-side-down L profile or r profile (due to the cut-outs to form handle 18). However, in other regions of tank sidewall 12, groove 16 may also have an up-side-down U-profile, as will be more apparent in other views to follow.

Figure 2D:
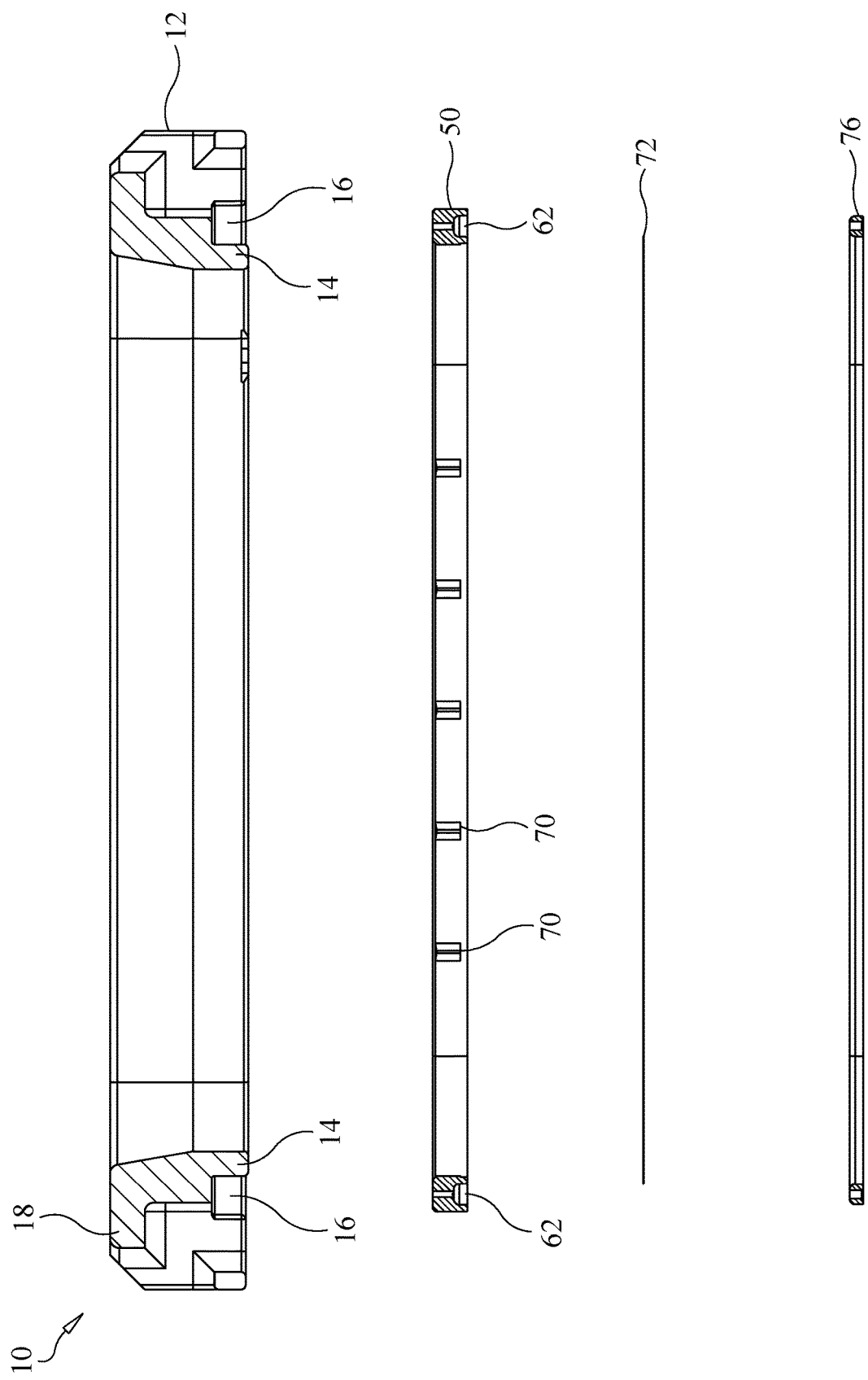
FIG. 2D depicts a cross-sectional—perspective—exploded view of a tank assembly (when viewed in a direction normal to the cross-sectional surface), in accordance with one embodiment of the invention.

FIG. 2D depicts a cross-sectional—perspective—exploded view of tank assembly 10 when viewed in a direction normal to the cross-sectional surface. The cross-sectional profile of bottom rim 14 and groove 16 of tank sidewall 12 are visible in FIG. 2D, as well as the cross-sectional profile of groove 62 of frame 50.

Figure 3A:
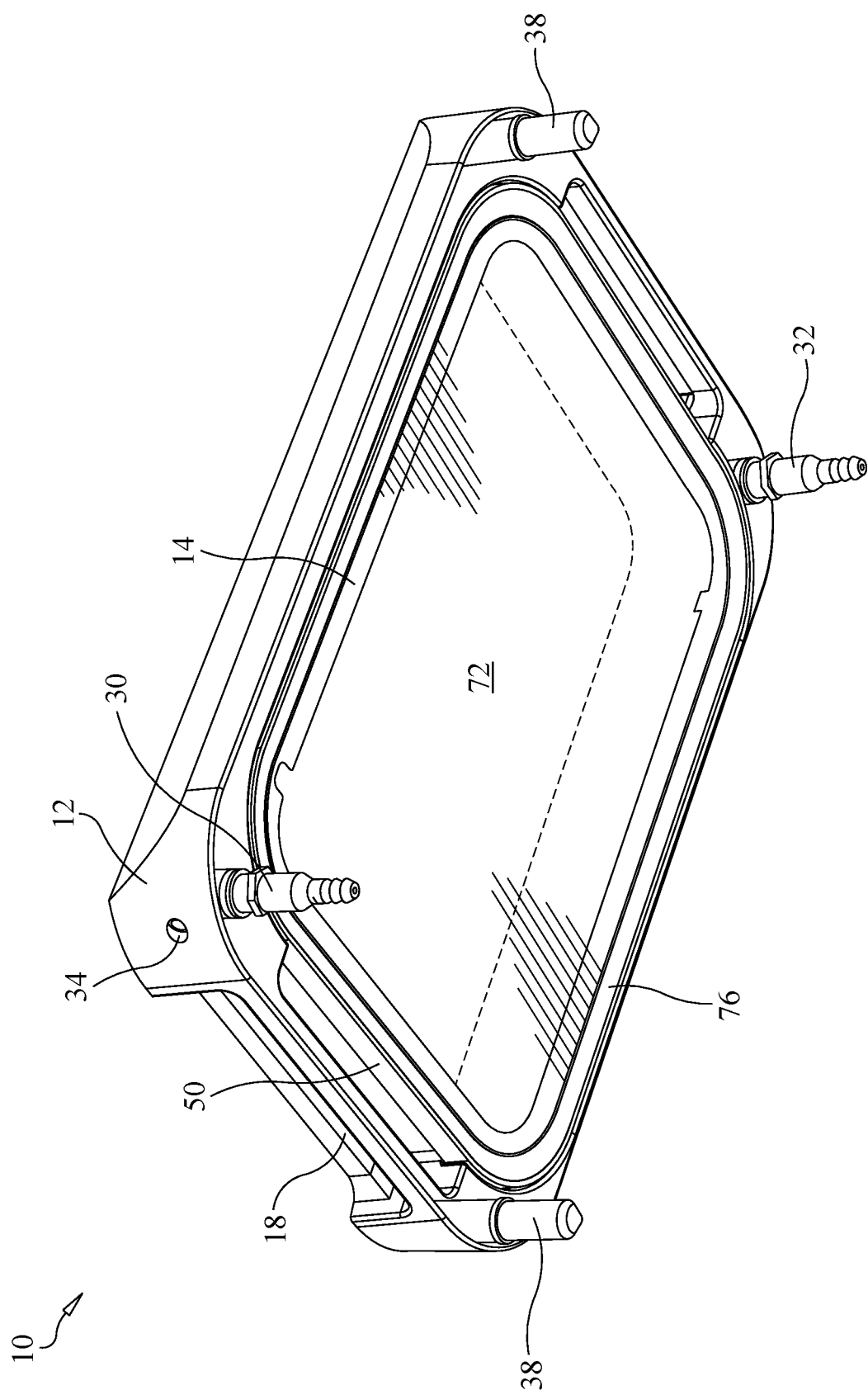
FIG. 3A depicts a perspective view of a tank assembly showing details on the bottom and side surfaces of the tank assembly, in accordance with one embodiment of the invention.

FIG. 3A depicts a perspective view of tank assembly 10 showing details on the bottom and side surfaces of the tank assembly. In contrast to FIGS. 2A-2D, FIG. 3A depicts tank assembly 10 in an assembled state. As shown, membrane 72 is secured to frame 50 by membrane securing member 76. Membrane assembly 48 in turn is inserted into (and secured within) groove 16 (not visible) of tank sidewall 12. Tube coupling member 30 (for supplying fresh resin) is inserted into tube coupling member receptacle 40; tube coupling member 32 (for draining used resin) is inserted in tube coupling member receptacle 42; and legs 38 are inserted into leg receptacles 44. In one interpretation, tank sidewall 12 may be considered to have four legs, with two of the four legs embodied as tube coupling members 30, 32. It is noted that the location of legs 38 may be different in some embodiments. In some embodiments, it is possible for legs 38 to be located at diagonal corners, while in other embodiments to be located at two corners on one side of tank sidewall 12. In fact, such variation in the design can be observed across the various figures (c.f., FIGS. 3A and 4A).

In one embodiment, the height of all four legs may be identical so that tank assembly 10 may stably rest upon a surface when in an off-line state. When in an operational state, tank assembly 10 typically will not rest on any of the four legs, but will instead rest on backing member 6 (depicted in FIG. 1).

As shown in FIG. 3A, membrane 72 forms the bottom surface of tank assembly 10. As described previously, membrane 72 may be made from a material, such as silicone treated with a lubricant, so as to form a non-stick surface. Over time, however, membrane 72 may lose its non-stick properties as the lubricant gradually dissipates into resin 4 and/or adheres to object 3. Membrane 72 may also start to wear out as a result of the flexing of membrane 72 when object 3 is repeatedly separated from the tank bottom. One advantage of the present invention is that membrane assembly 48 can be replaced with a new membrane assembly after the existing membrane assembly has reached the end of its useful lifetime. As such, an analogy to membrane assembly 48 is a printer cartridge or a razor blade (or other consumable product) that is periodically replaced with a new part as the old part wears out. On the other hand, the tank sidewall 12 along with tube coupling members 30, 32 and legs 38 (much like the printer without the print cartridge or a razor without the razor blade) typically are replaced much less frequently than membrane assembly 48. In other embodiments described below, it is also possible for only membrane 72 to be the consumable product (i.e., frame 50 and membrane securing member 76 may be reused with new membranes).

Figure 3B:
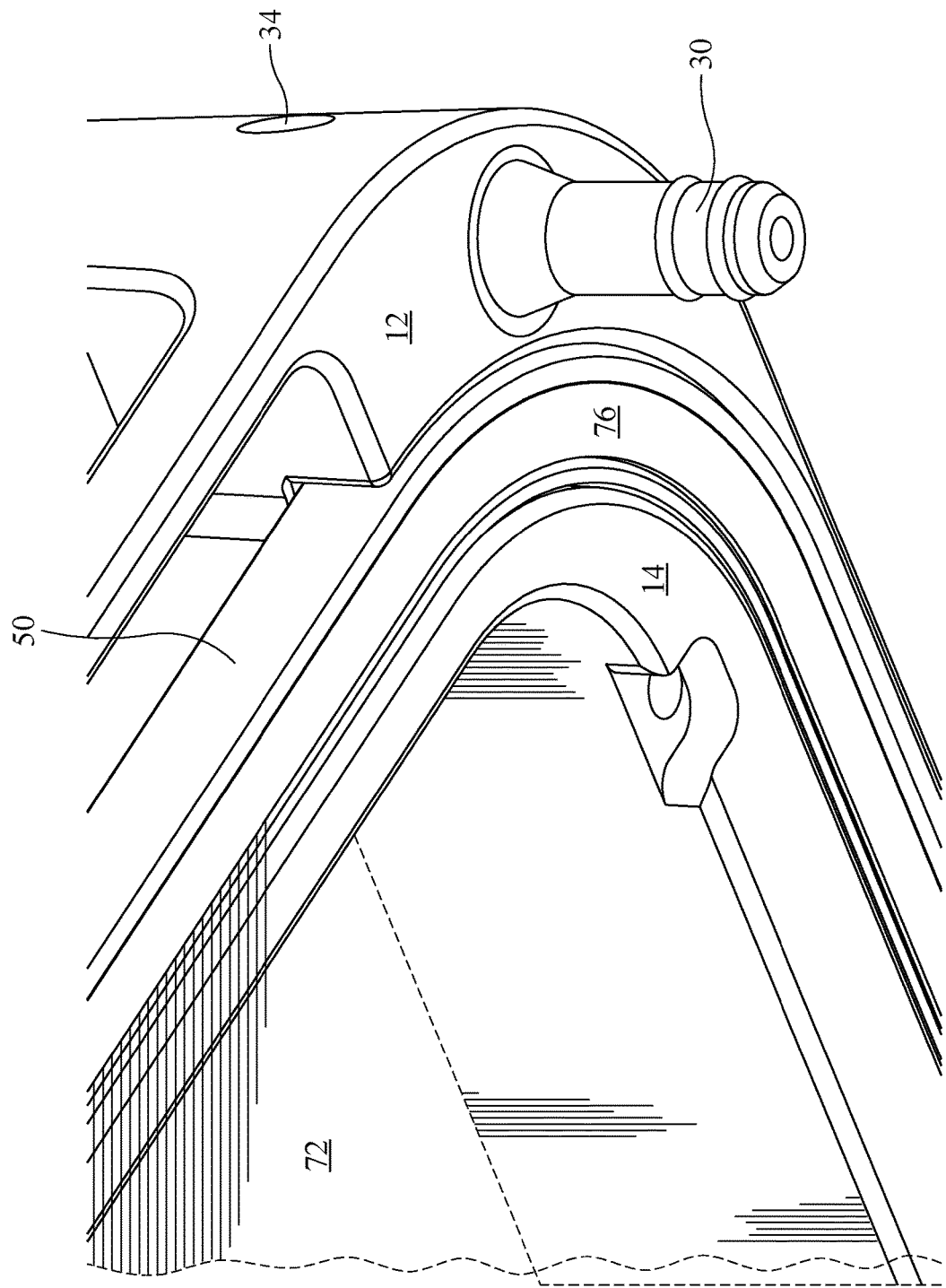
FIG. 3B depicts a magnified portion of FIG. 3A, in accordance with one embodiment of the invention.

FIG. 3B depicts a magnified portion of FIG. 3A. As shown, flexible membrane 72 extends across bottom rim 14 and across a portion of the bottom surface of frame 50 before being clamped and secured in the tight space between frame 50 and membrane securing member 76. The structure of tube coupling member 30 is also visible in great detail in FIG. 3B with rings that increase the friction between tube coupling member 30 and a tube (not depicted) for supplying fresh resin.

Figure 3C:
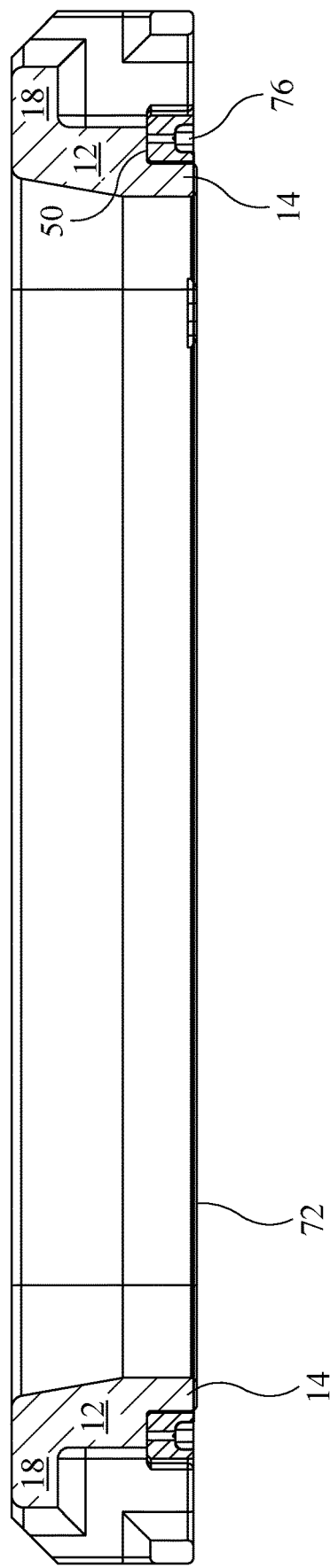
FIG. 3C depicts a cross-sectional—perspective view of a tank assembly (when viewed in a direction normal to the cross-sectional surface), in accordance with one embodiment of the invention.

FIG. 3C depicts a cross-sectional—perspective view of tank assembly 10 when viewed in a direction normal to the cross-sectional surface. This view shows membrane securing member 76 inserted (and secured) within a groove of frame 50, and in turn frame 50 is inserted into a groove of tank sidewall 12. The cross section of flexible membrane 72 is represented by a black line, and if one looks at the figure carefully, will see flexible membrane 72 extending across bottom rim 14 and a portion of the bottom surface of frame 50.

Figure 3D:
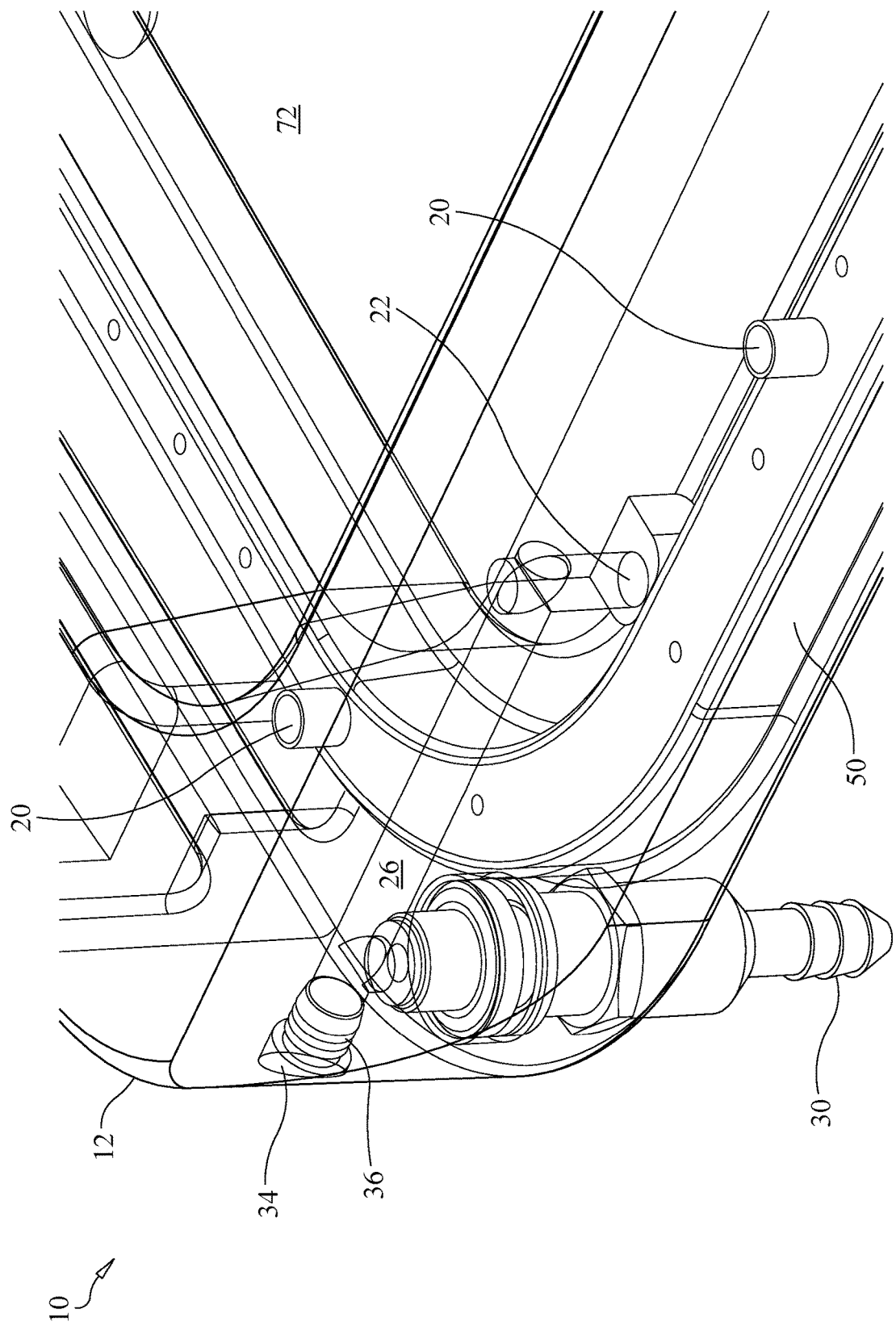
FIG. 3D depicts a semi-transparent perspective view of a tank assembly showing details within the tank assembly, in accordance with one embodiment of the invention.

FIG. 3D depicts a semi-transparent perspective view of tank assembly 10 showing details within the tank assembly. The structure of the components for delivering fresh resin are visible in this view, and includes channel 26 fluidly coupling tube coupling member 30 and inlet 22. Port 34 may be used to supply an additive or other chemicals to the fresh resin in channel 26, although in the configuration of FIG. 3D, plug 36 is present in port 34 (in effect rendering port 34 inactive). Port 34 may further be used as a drain in some circumstances. Magnets 20 (or other materials that are attracted to magnets) of tank sidewall 12 are shown disposed immediately adjacent to frame 50, and serve to secure frame 50 within the groove of tank sidewall 12. Magnets 20 of tank sidewall 12 may be attracted to magnets 64 of frame 50 (not visible in the current view).

Figure 4A:
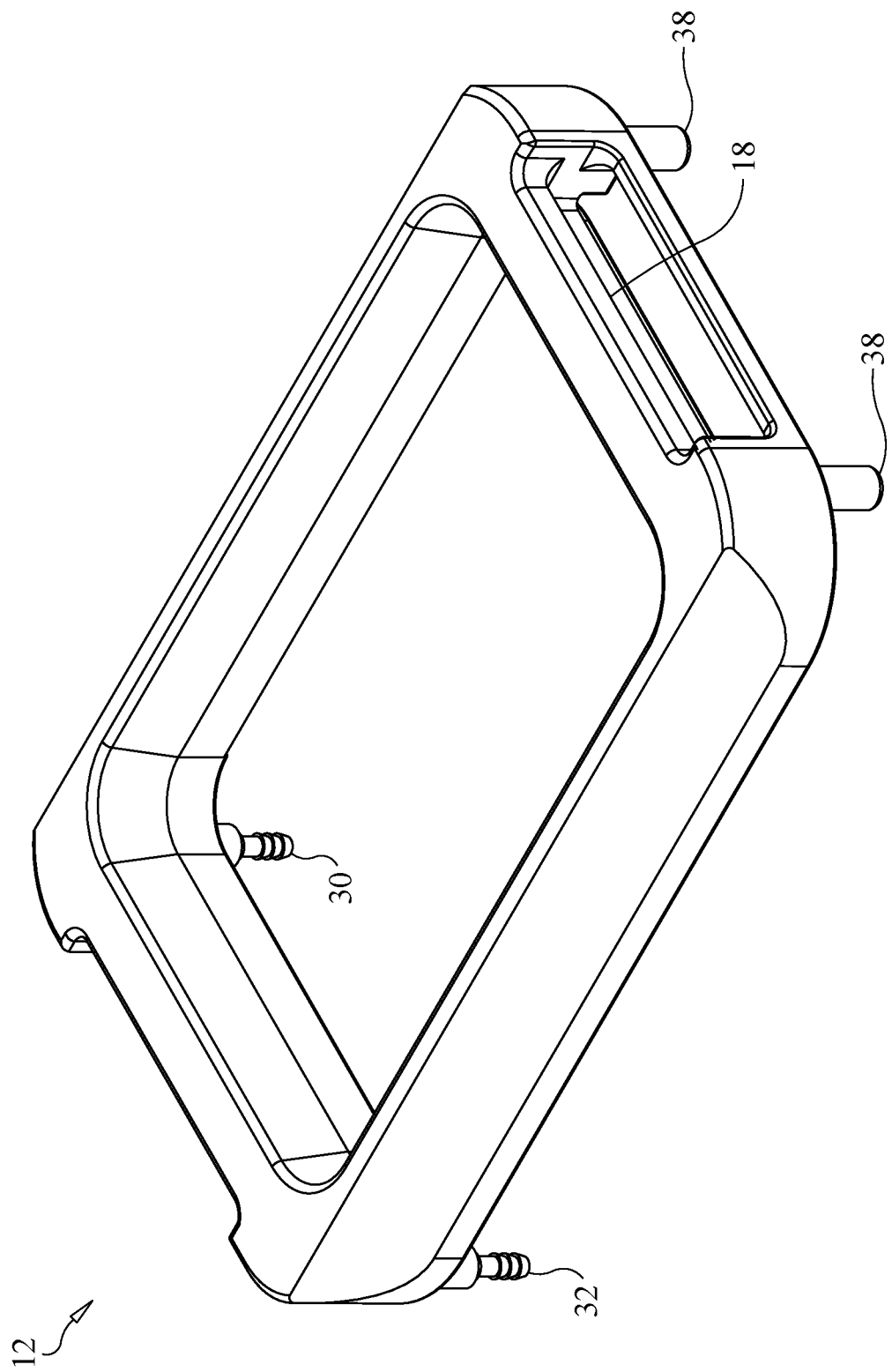
FIG. 4A depicts a perspective view of a tank sidewall showing details on the top and side surfaces of the tank sidewall, in accordance with one embodiment of the invention.

FIG. 4A depicts a perspective view of tank sidewall 12 showing details on the top and side surfaces of the tank sidewall. In the depicted embodiment, tube coupling member 30 (for supplying fresh resin) and tube coupling member 32 (for draining used resin) are located on a first side of tank sidewall 12, while legs 38 are located on a second side of tank sidewall 12 opposite to the first side.

Figure 4B:
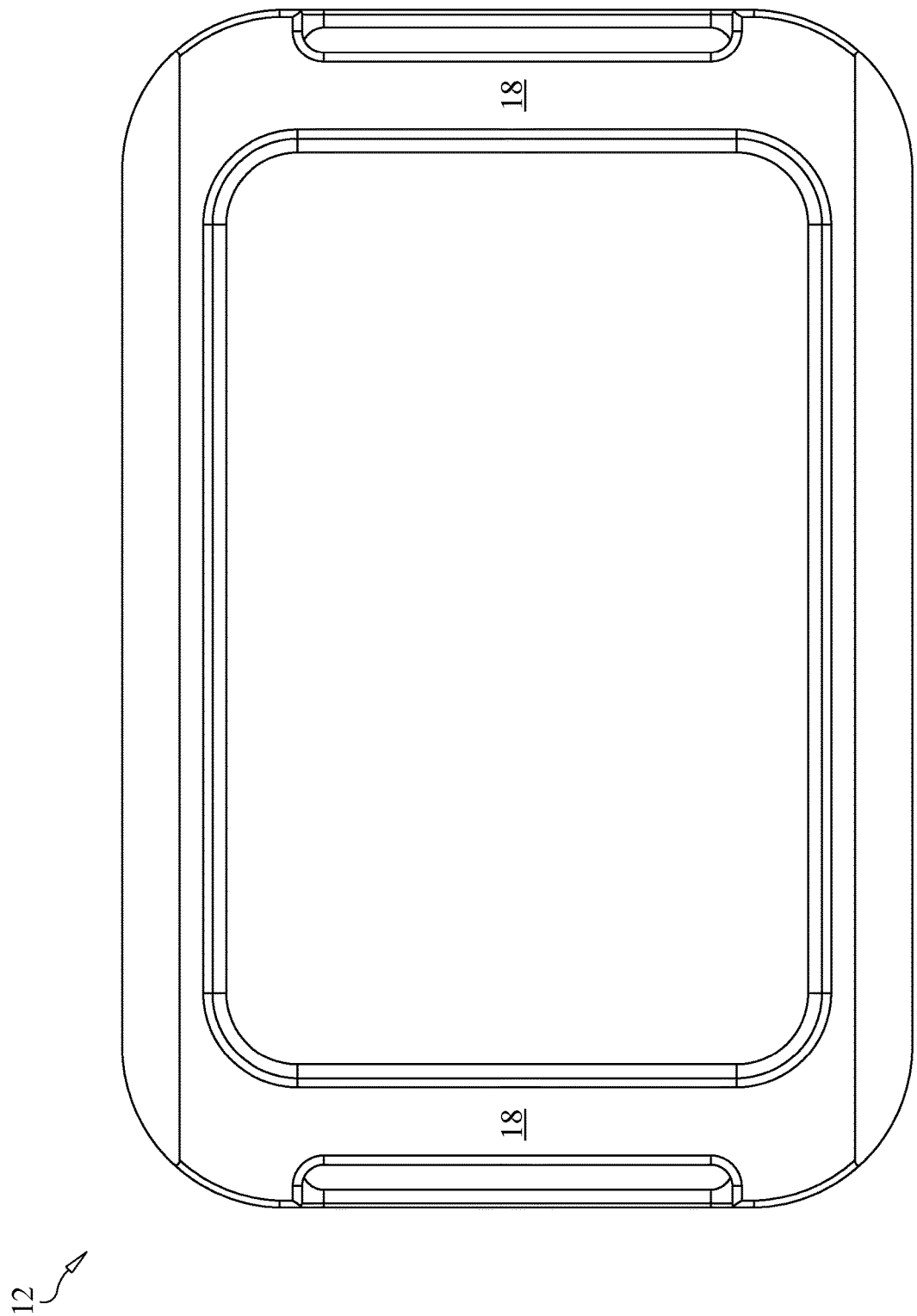
FIG. 4B depicts a top view of a tank sidewall, in accordance with one embodiment of the invention.
Figure 4C:
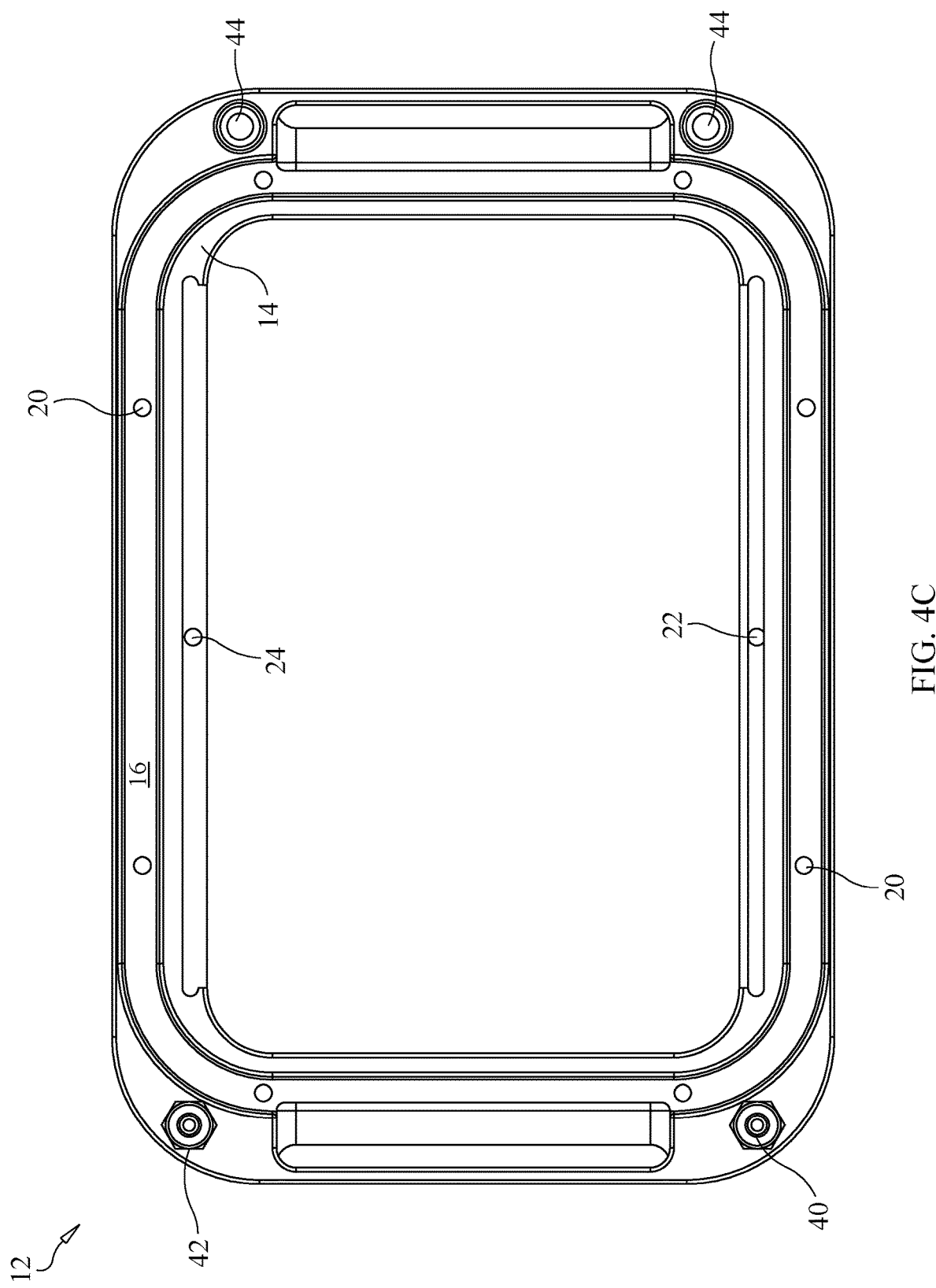
FIG. 4C depicts a bottom view of a tank sidewall, in accordance with one embodiment of the invention.

FIG. 4B depicts a top view of tank sidewall 12. Handles 18 for a person to transport the tank sidewall and/or tank assembly are visible in the top view. FIG. 4C depicts a bottom view of tank sidewall 12. Groove 16 is shown surrounding bottom rim 14. Magnets 20 may be disposed within a surface of groove 16. Inlet 22 and outlet 24 may be present on opposite sides of tank sidewall 12. While not visible in the bottom view, inlet 22 is fluidly coupled to tube coupling member receptacle 40 by channel 26, and outlet 24 is fluidly coupled to tube coupling member receptacle 42 by channel 28.

Figure 4D:
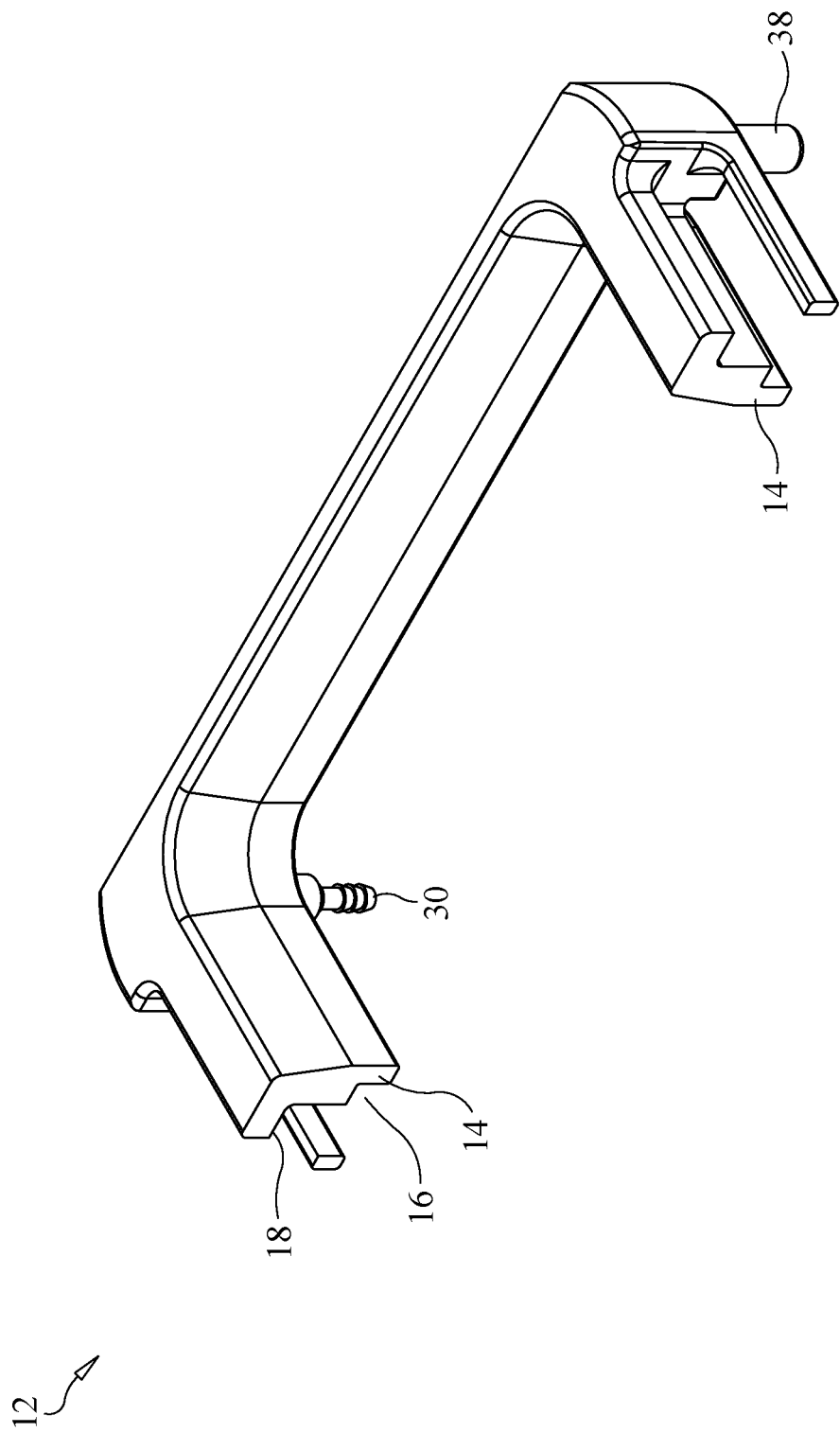
FIG. 4D depicts a cross-sectional—perspective view of a tank sidewall, in accordance with one embodiment of the invention.
Figure 4E:
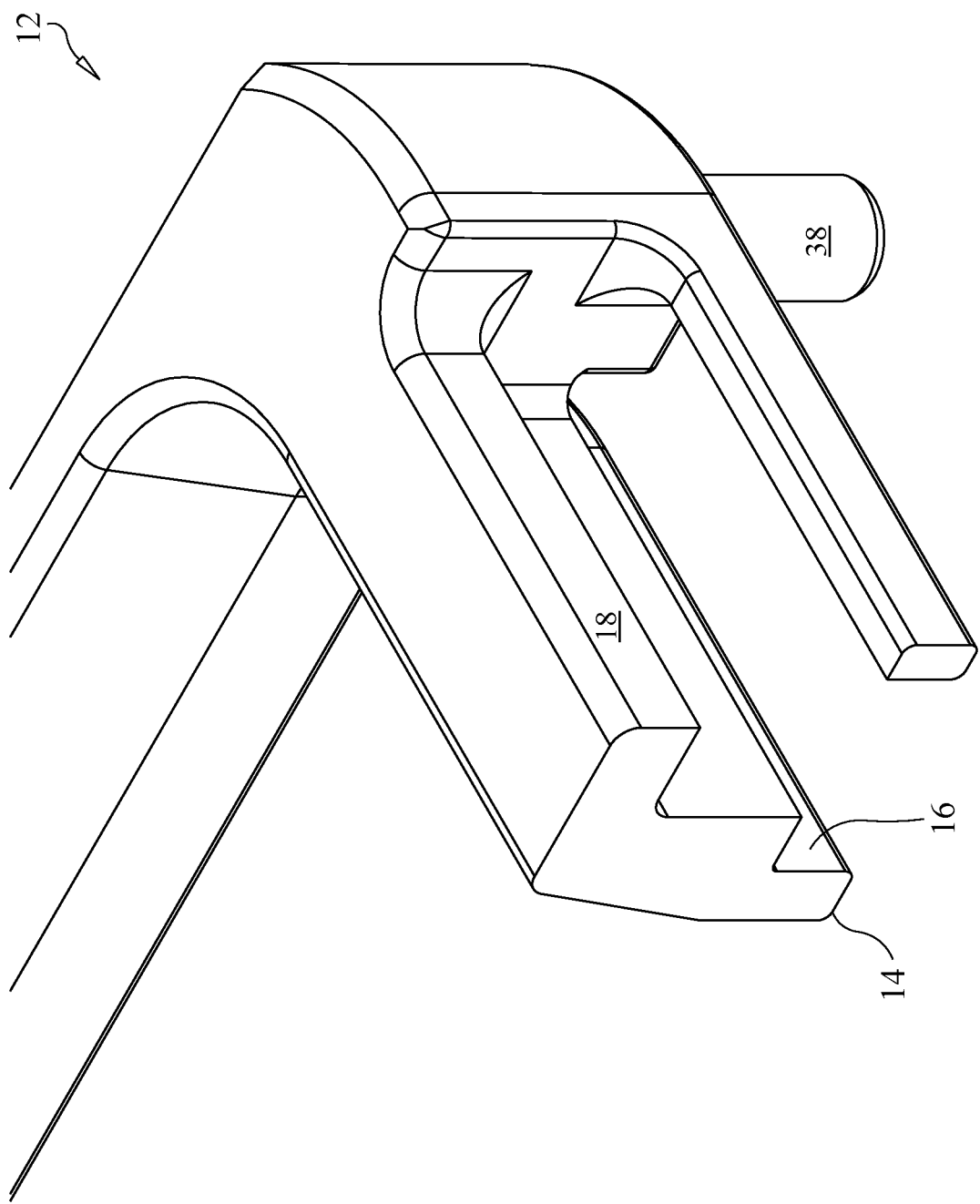
FIG. 4E depicts a magnified portion of FIG. 4D, in accordance with one embodiment of the invention.
Figure 4F:
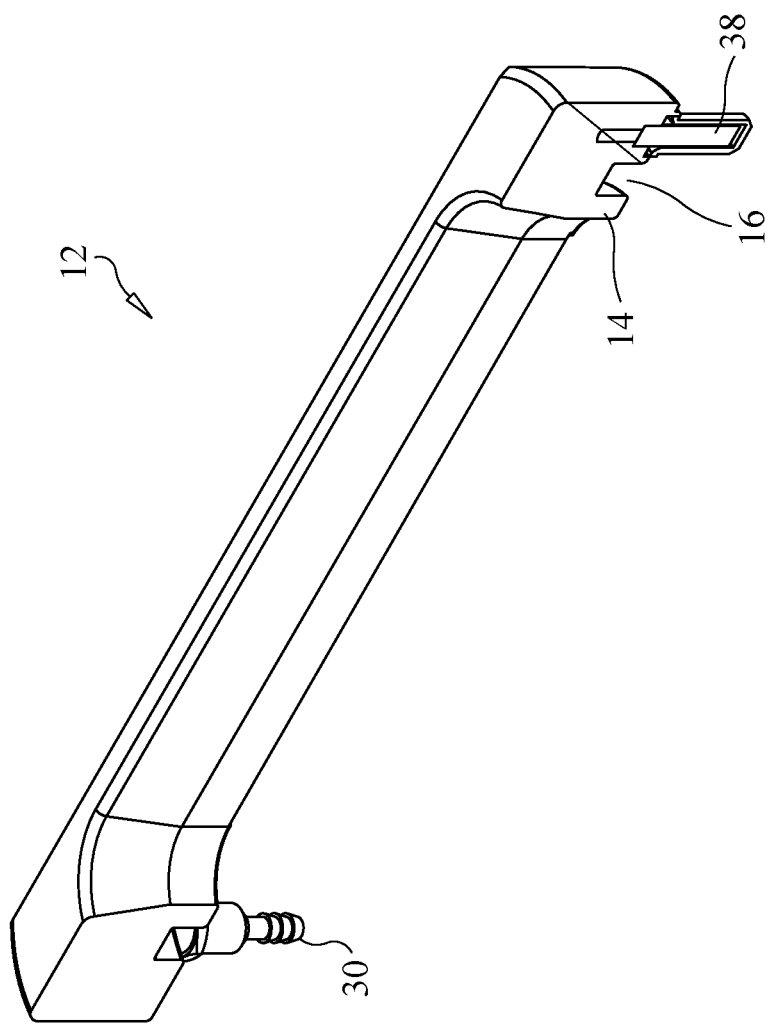
FIGS. 4F-4K depict cross-sectional—perspective views of a tank sidewall, in accordance with one embodiment of the invention.
Figure 4G:
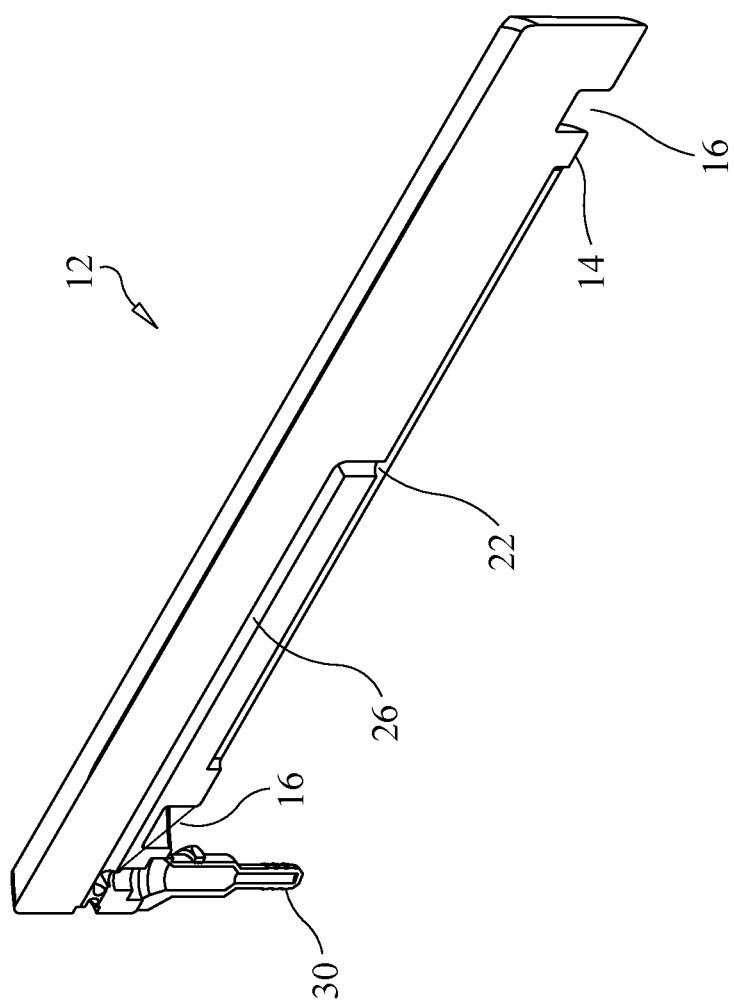

FIG. 4D depicts a cross-sectional—perspective view of tank sidewall 12, and FIG. 4E depicts a magnified portion of FIG. 4D that shows the structure of bottom rim 14, groove 16 and handle 18 in greater detail. FIG. 4F depicts another cross-sectional—perspective view of tank sidewall 12, and shows a cross section through leg 38. FIG. 4G depicts another cross-sectional—perspective view of tank sidewall 12, and shows a cross section through tube coupling member 30. The structure of the components for delivering fresh resin are also visible in FIG. 4G, and includes channel 26 fluidly coupling tube coupling member 30 and inlet 22.

Figure 4H:
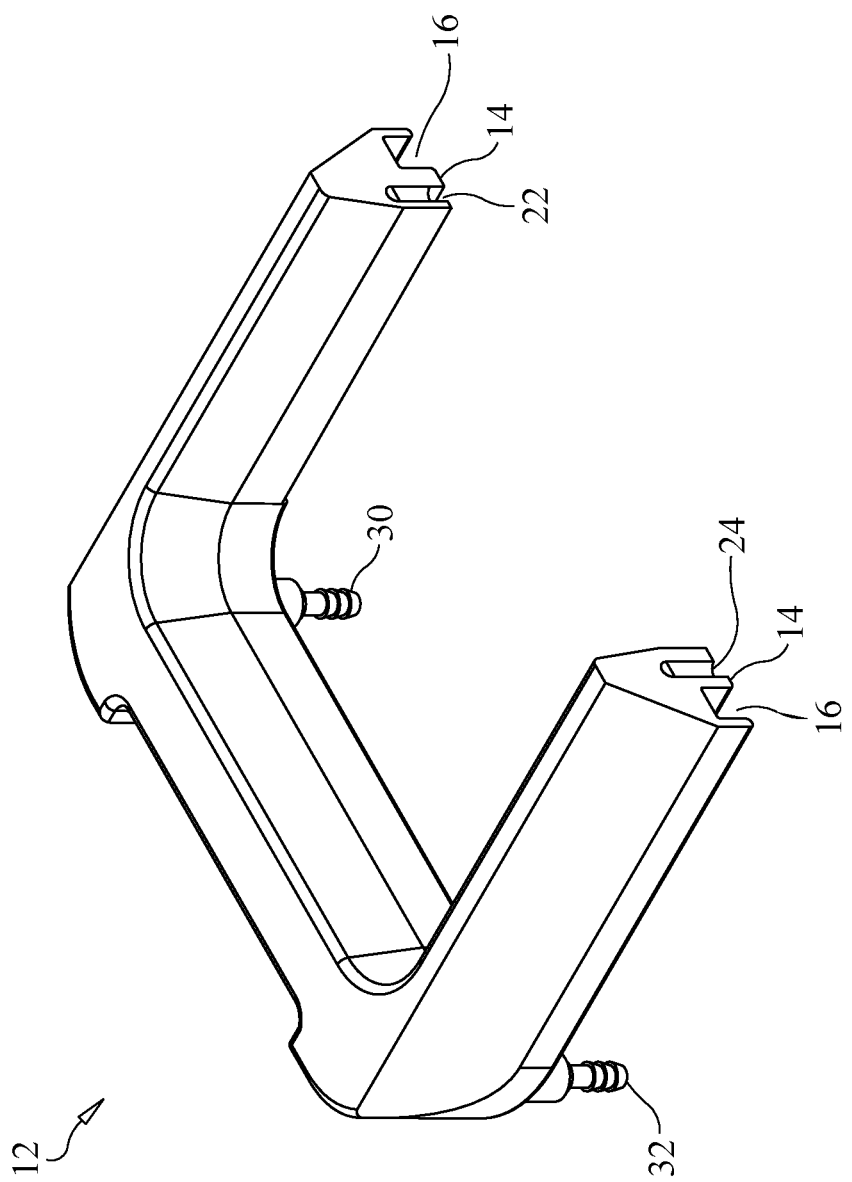
Figure 4I:
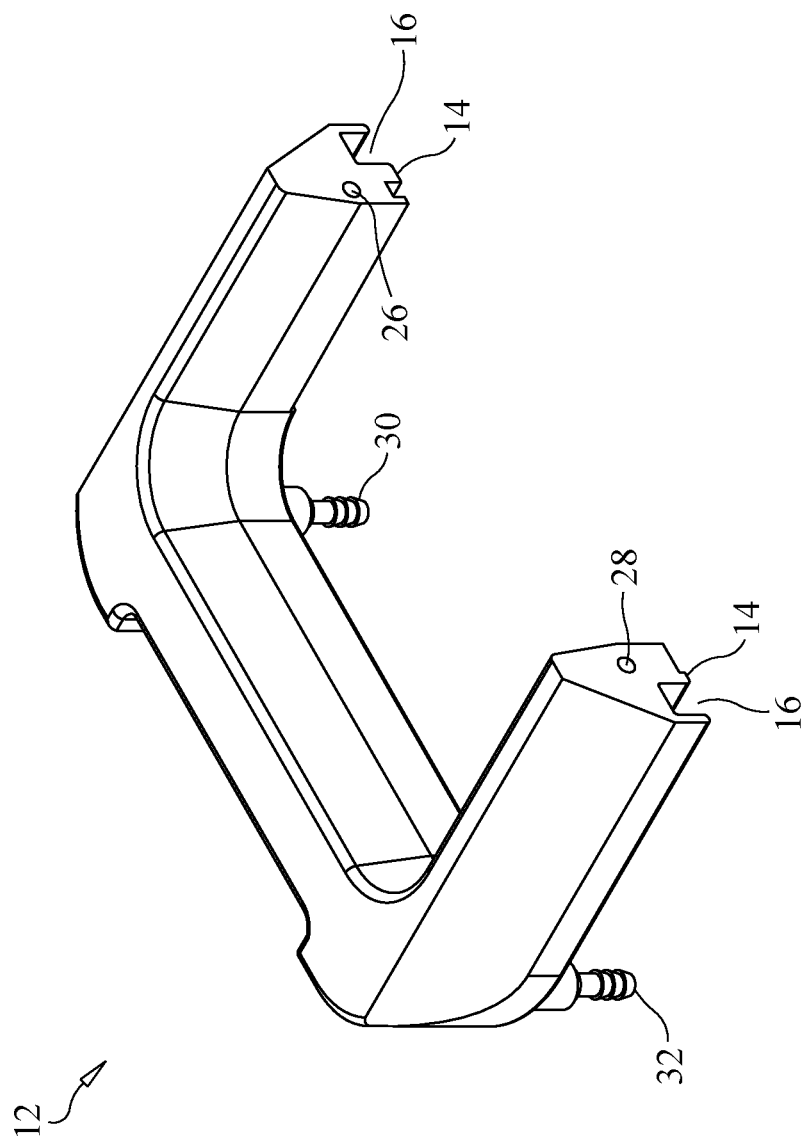
Figure 4J:
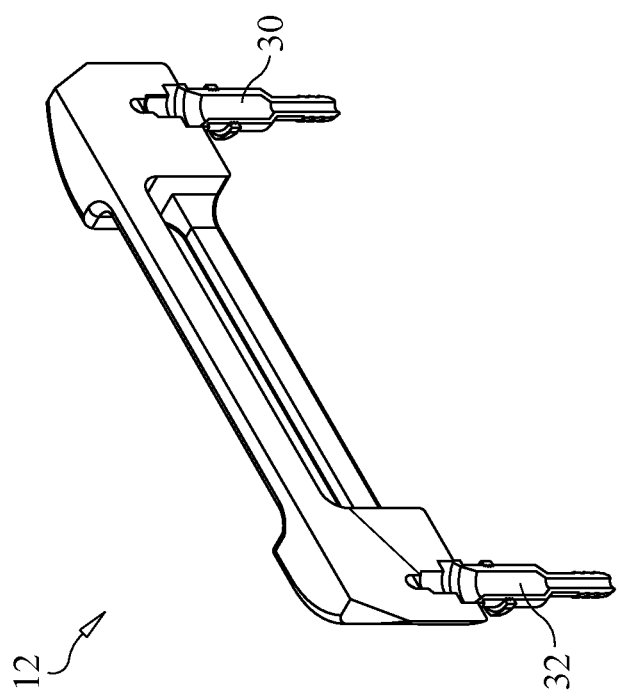
Figure 4K:
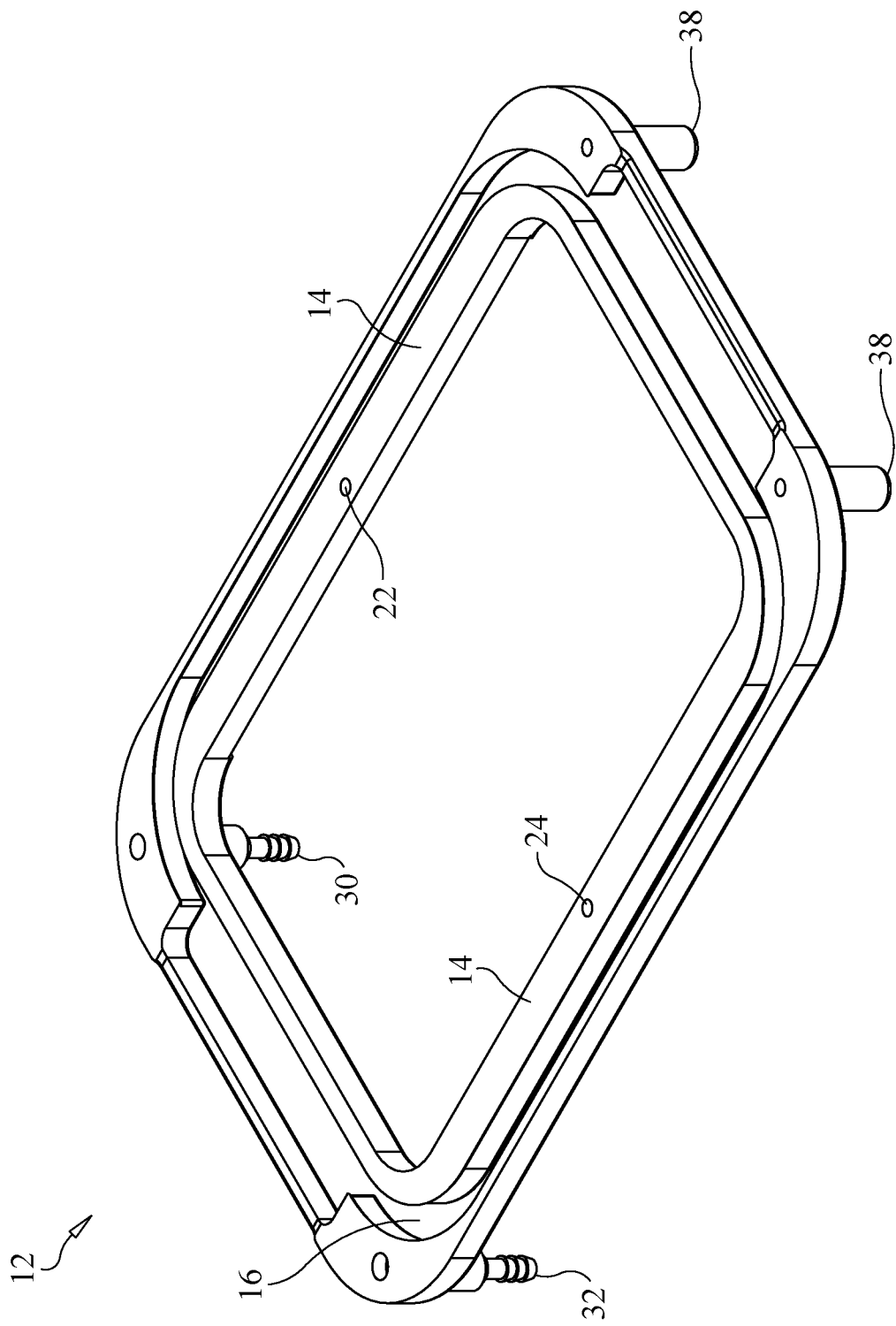

FIG. 4H depicts another cross-sectional—perspective view of tank sidewall 12, and shows the cross-sectional profile of inlet 22, outlet 24, bottom rim 14 and groove 16. FIG. 4I depicts another cross-sectional—perspective view of tank sidewall 12, and shows the cross-sectional profile of channel 26, channel 28, bottom rim 14 and groove 16. FIG. 4J depicts another cross-sectional—perspective view of tank sidewall 12, and shows the cross-sectional profile of tube coupling members 30 and 32. FIG. 4K depicts a cross-sectional—perspective view of tank sidewall 12 with the cross-sectional surface disposed along a horizontal plane, and shows groove 16 surrounding bottom rim 14.

Figure 5A:
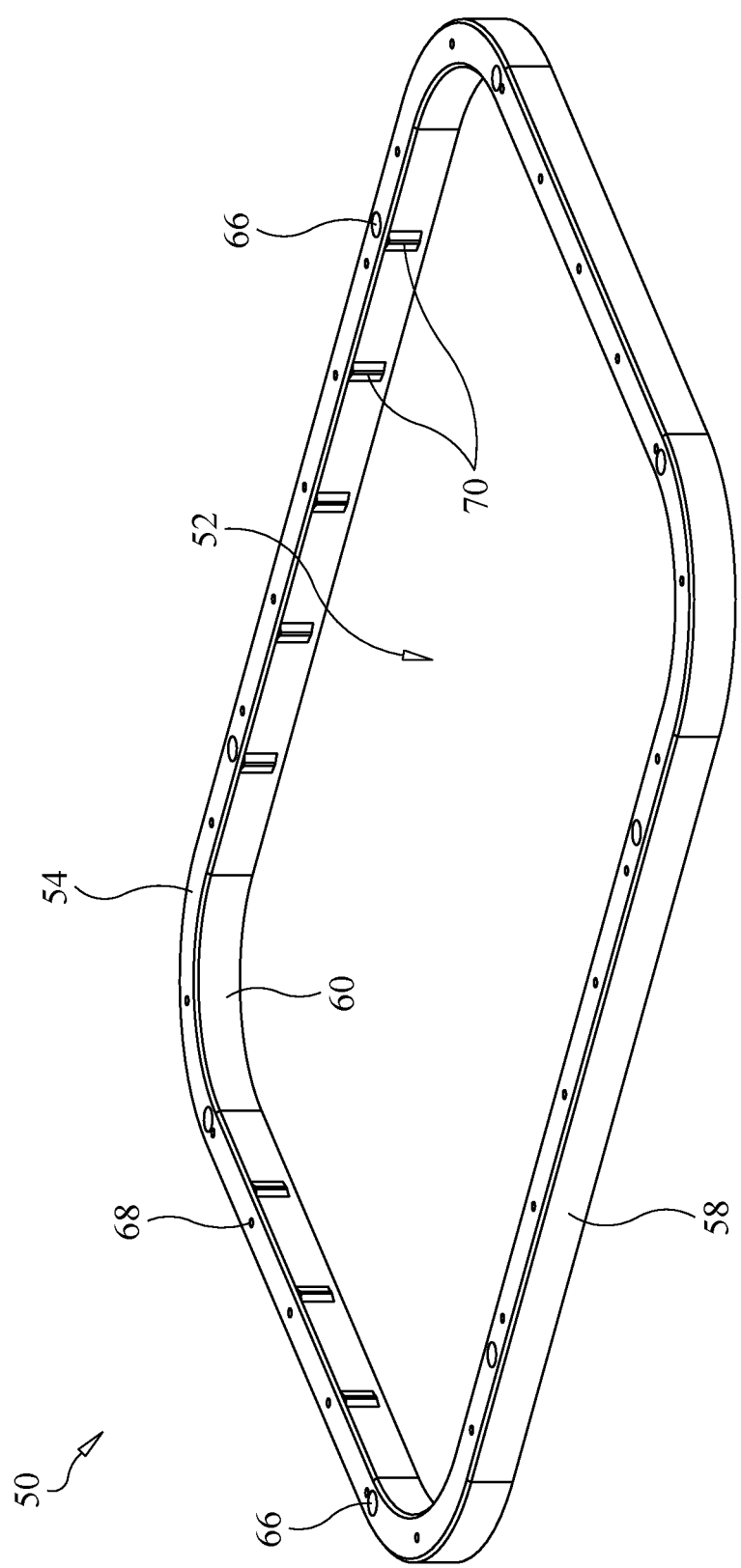
FIG. 5A depicts a perspective view of a frame showing details on the top and side surfaces of the frame, in accordance with one embodiment of the invention.

FIG. 5A depicts a perspective view of frame 50 showing details on the top and side surfaces of the frame. Frame 50 surrounds central opening 52. Frame 50 includes top surface 54, outer side surface 58 facing away from central opening 52 and inner side surface 60 facing towards central opening 52. Ribs 70 may be located on inner side surface 60, and as explained above, may increase a degree of friction between frame 50 and bottom rim 14 of the tank sidewall. Vias 68 (more specifically the ends thereof) are visible in the view of FIG. 5A, and may be present to allow air to quickly escape from the groove of frame 50 when membrane securing member 76 is inserted into the groove. In FIG. 5A, magnets have not yet been inserted into frame 50. Instead, what are visible are magnet receptacles 66 (holes, depressions, etc.) for receiving the magnets.

Figure 5B:
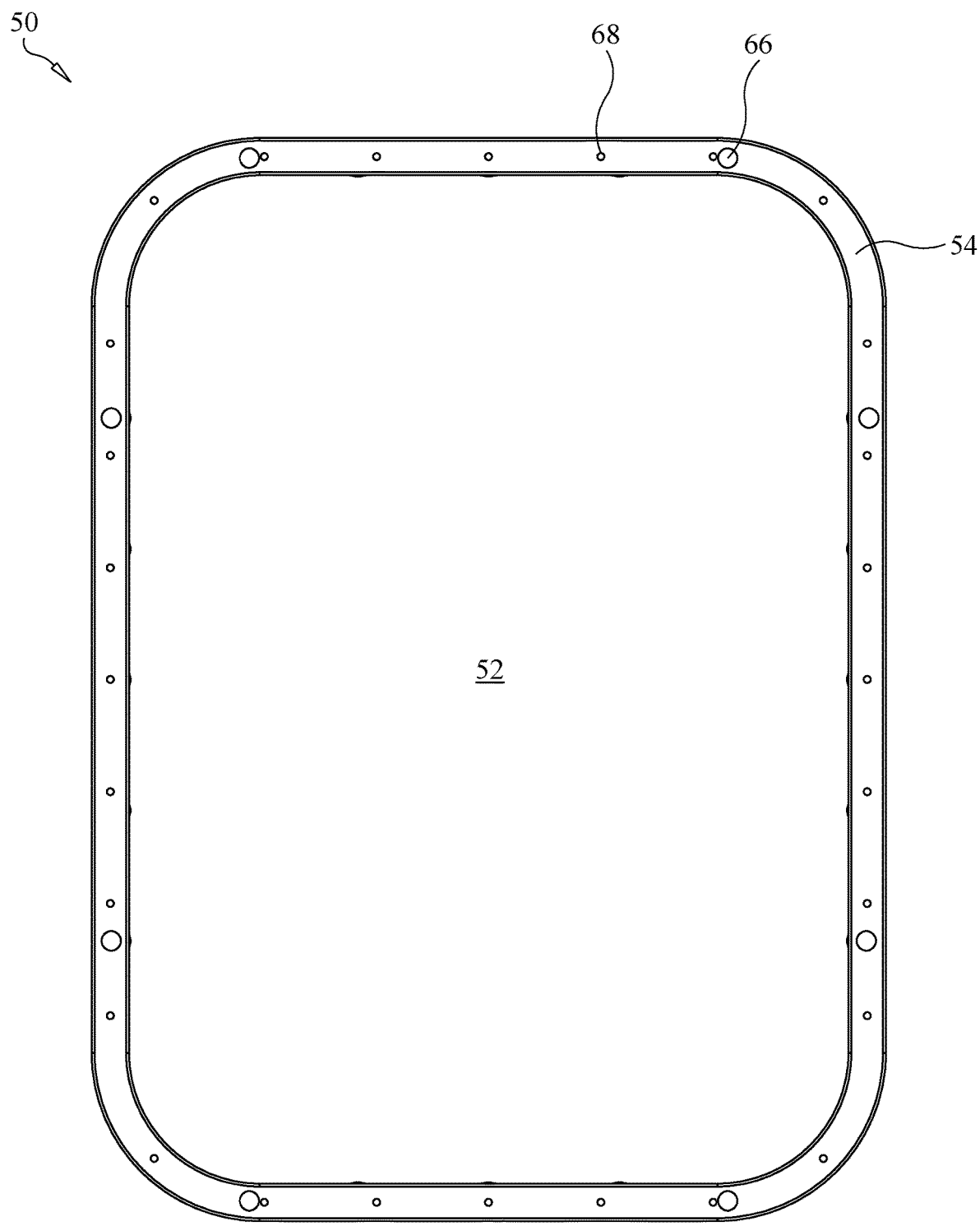
FIG. 5B depicts a top view of a frame, in accordance with one embodiment of the invention.
Figure 5C:
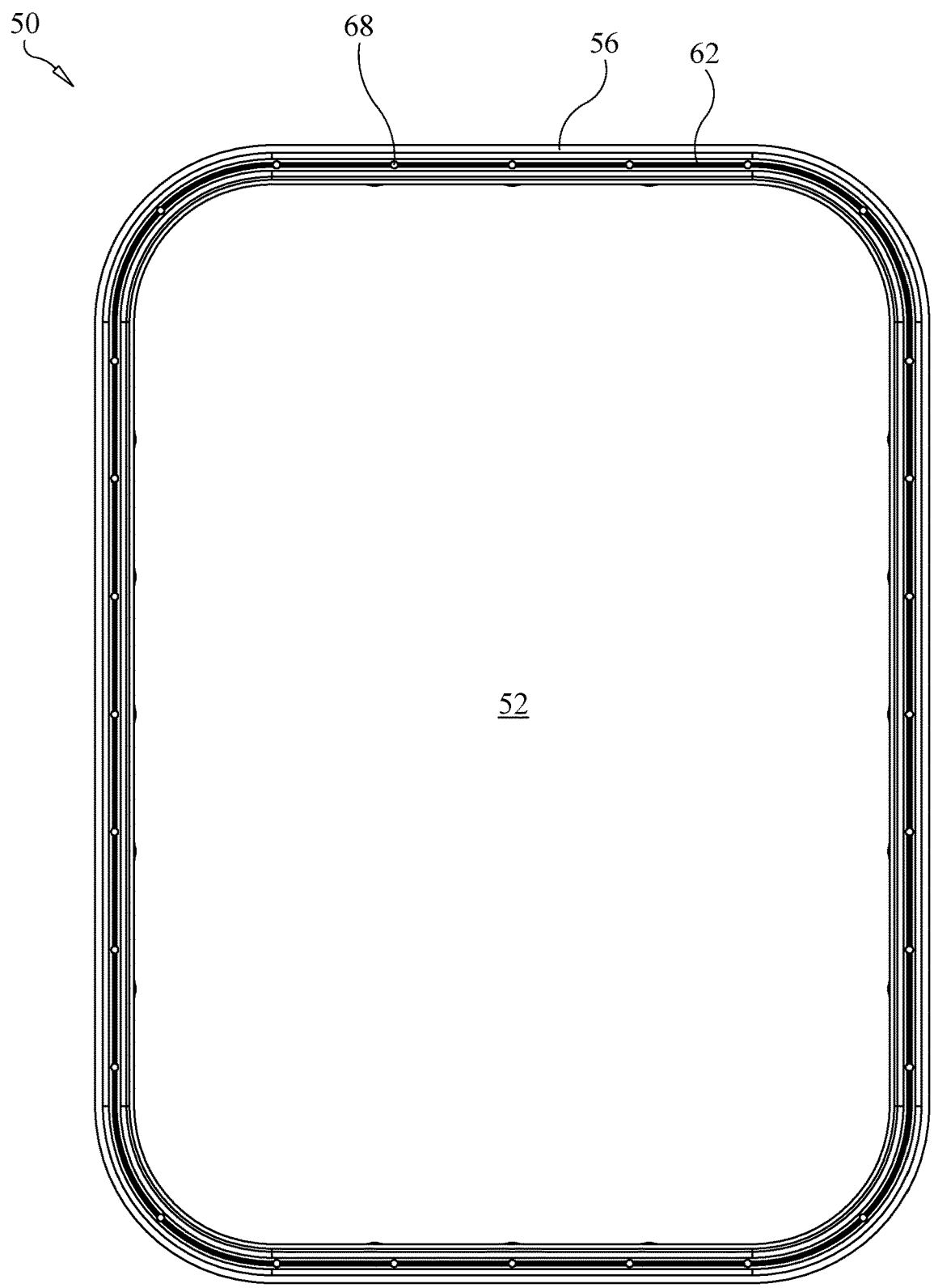
FIG. 5C depicts a bottom view of a frame, in accordance with one embodiment of the invention.
Figure 5D:
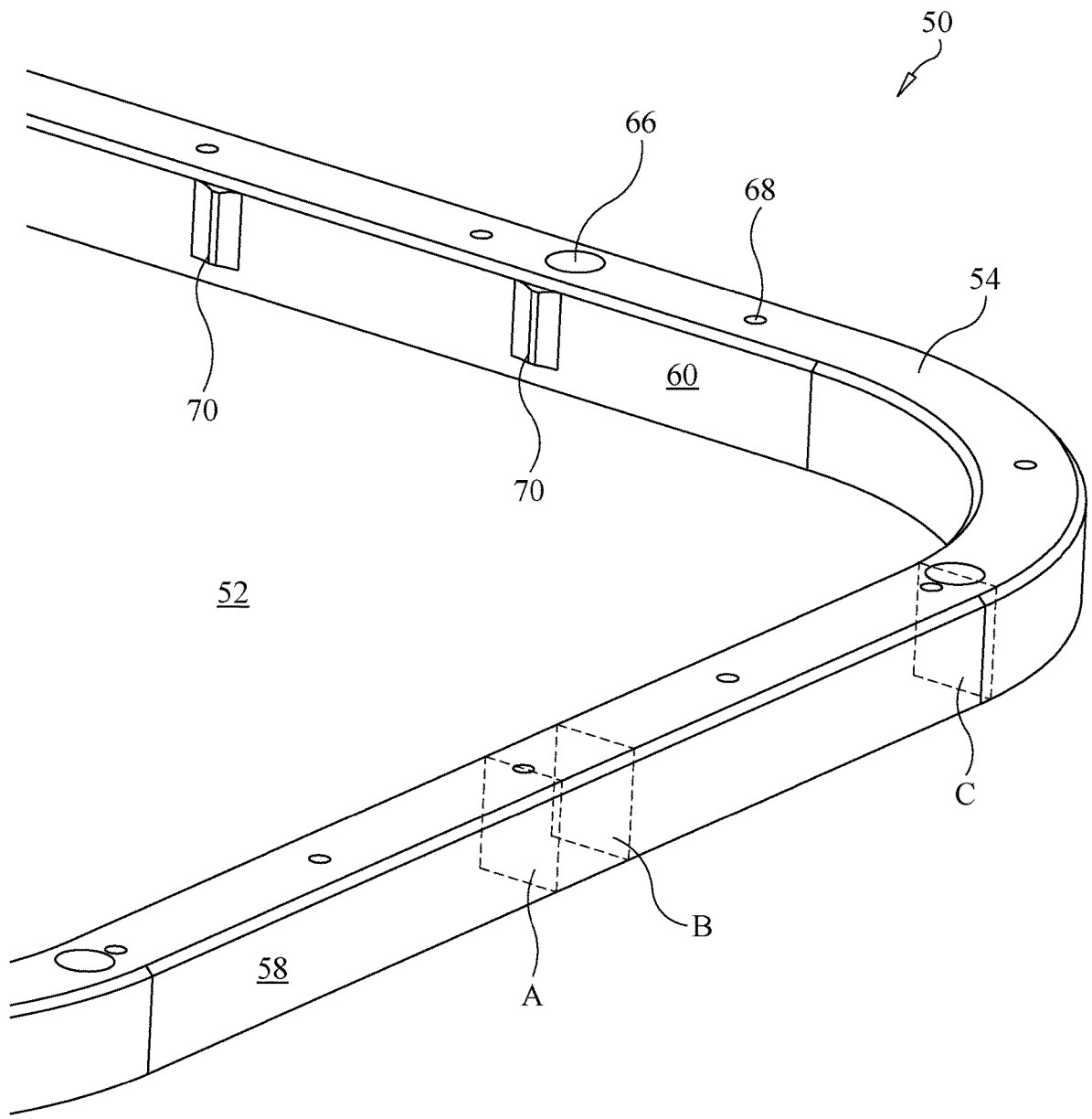
FIG. 5D depicts a magnified portion of FIG. 5A, in accordance with one embodiment of the invention.
Figure 5E:
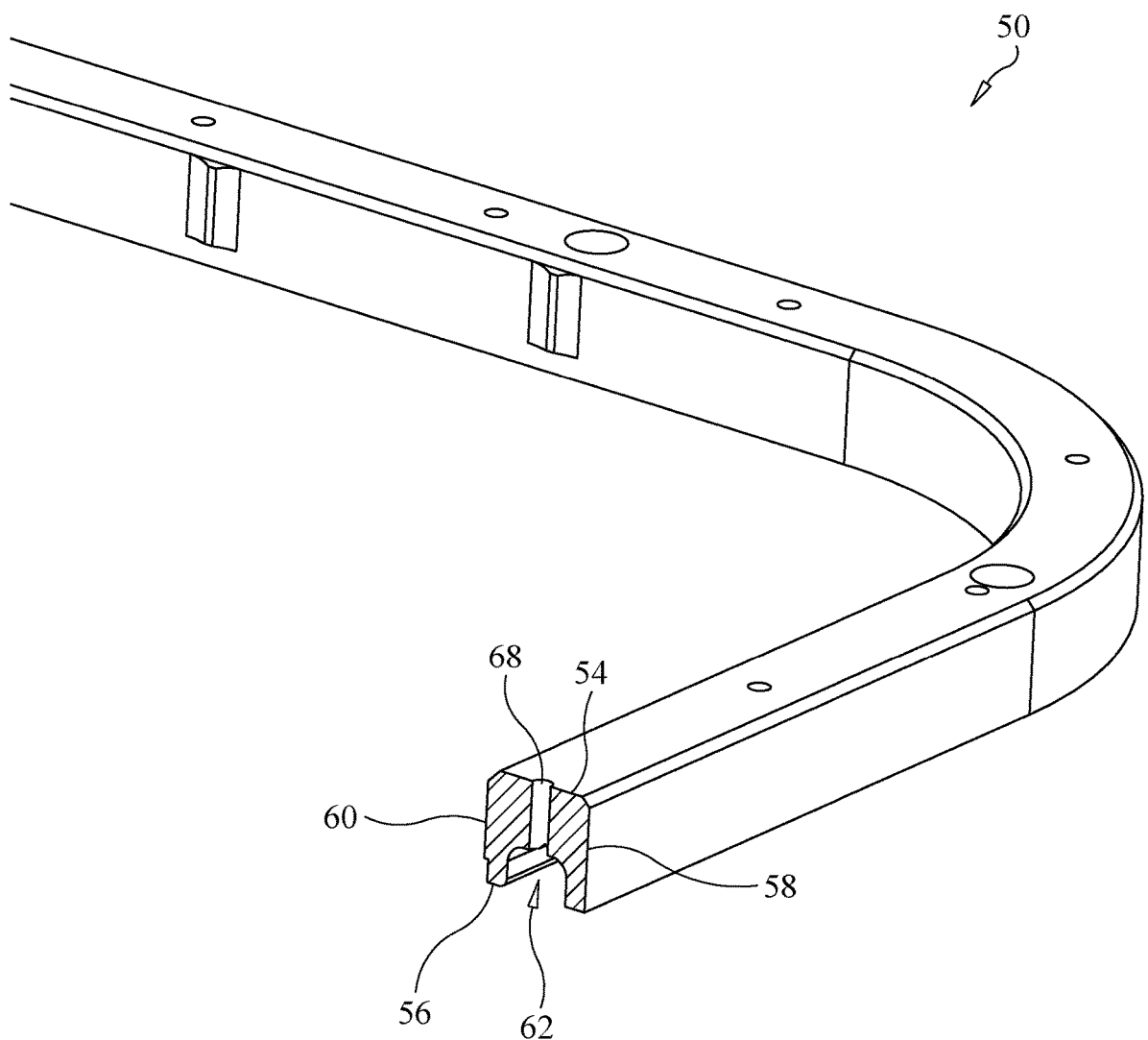
FIG. 5E depicts a cross-sectional—perspective view along plane A of FIG. 5D, in accordance with one embodiment of the invention.
Figure 5F:
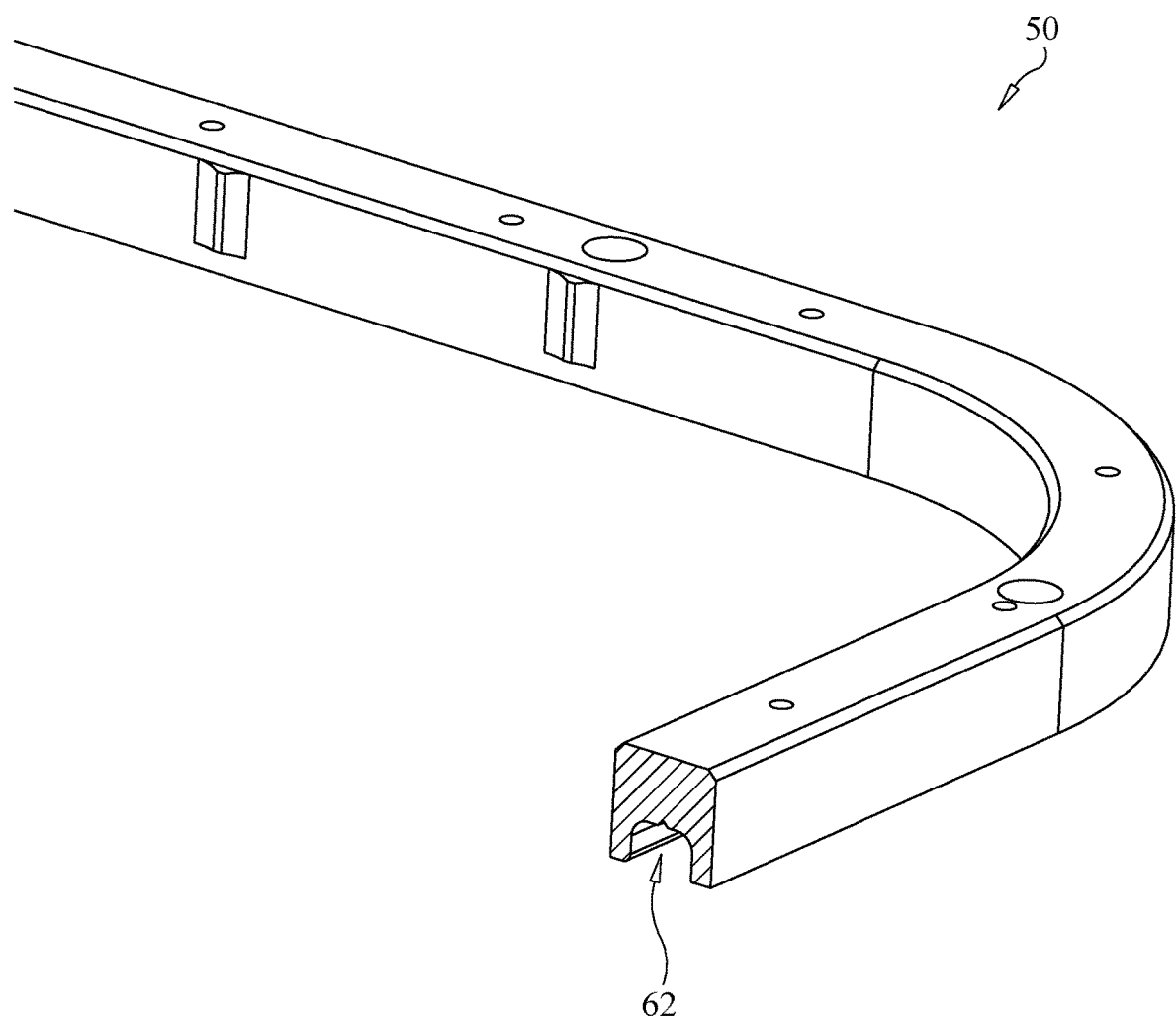
FIG. 5F depicts a cross-sectional—perspective view along plane B of FIG. 5D, in accordance with one embodiment of the invention.
Figure 5G:
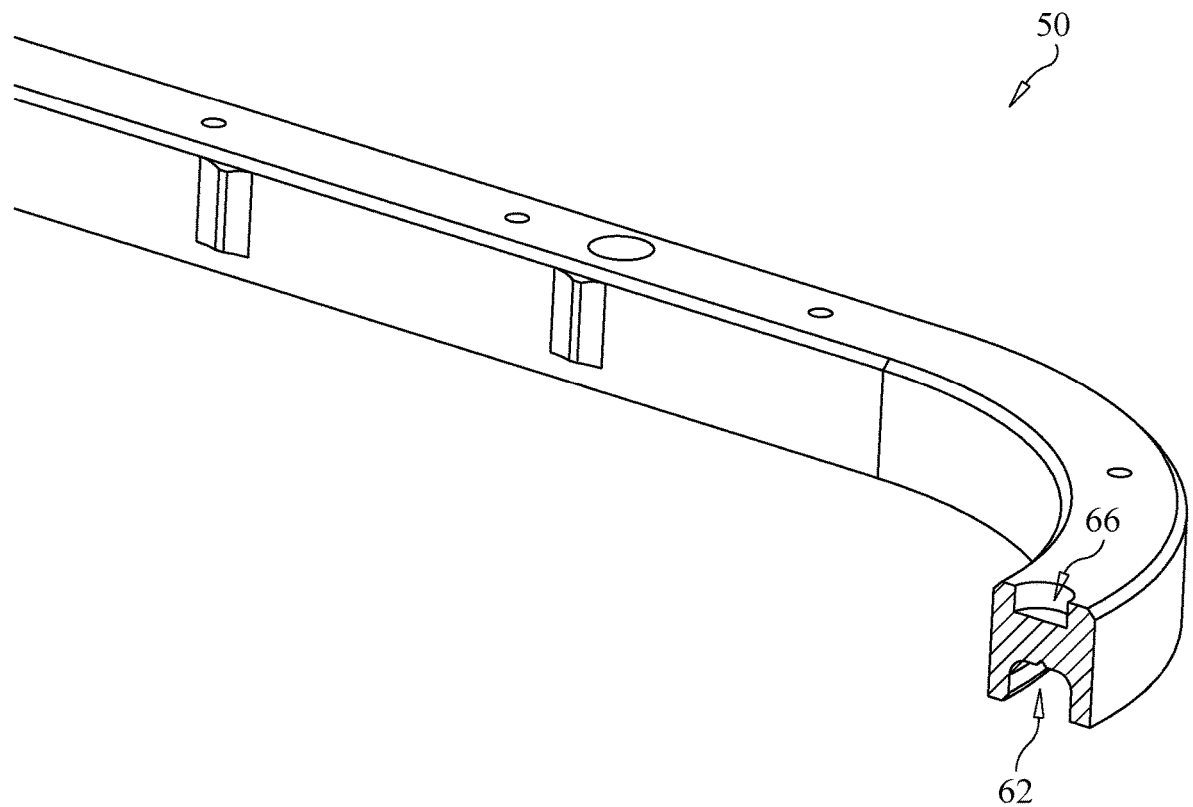
FIG. 5G depicts a cross-sectional—perspective view along plane C of FIG. 5D, in accordance with one embodiment of the invention.

FIG. 5B depicts a top view of frame 50. Top surface 54, as well as magnet receptacles 66 and vias 68 are visible in the top view. FIG. 5C depicts a bottom view of frame 50. Bottom surface 56, groove 62, as well as vias 68 are visible in the bottom view. FIG. 5D depicts a magnified portion of FIG. 5A. FIG. 5E depicts a cross-sectional—perspective view along plane A of FIG. 5D. A cross section through via 68, which fluidly connects top surface 54 and groove 62 of frame 50, is visible in FIG. 5E. FIG. 5F depicts a cross-sectional—perspective view along plane B of FIG. 5D. The up-side-down U-profile of groove 62 is visible in FIG. 5F. FIG. 5G depicts a cross-sectional—perspective view along plane C of FIG. 5D. The cross section through magnet receptacle 66 is visible in FIG. 5G.

Figure 6A:
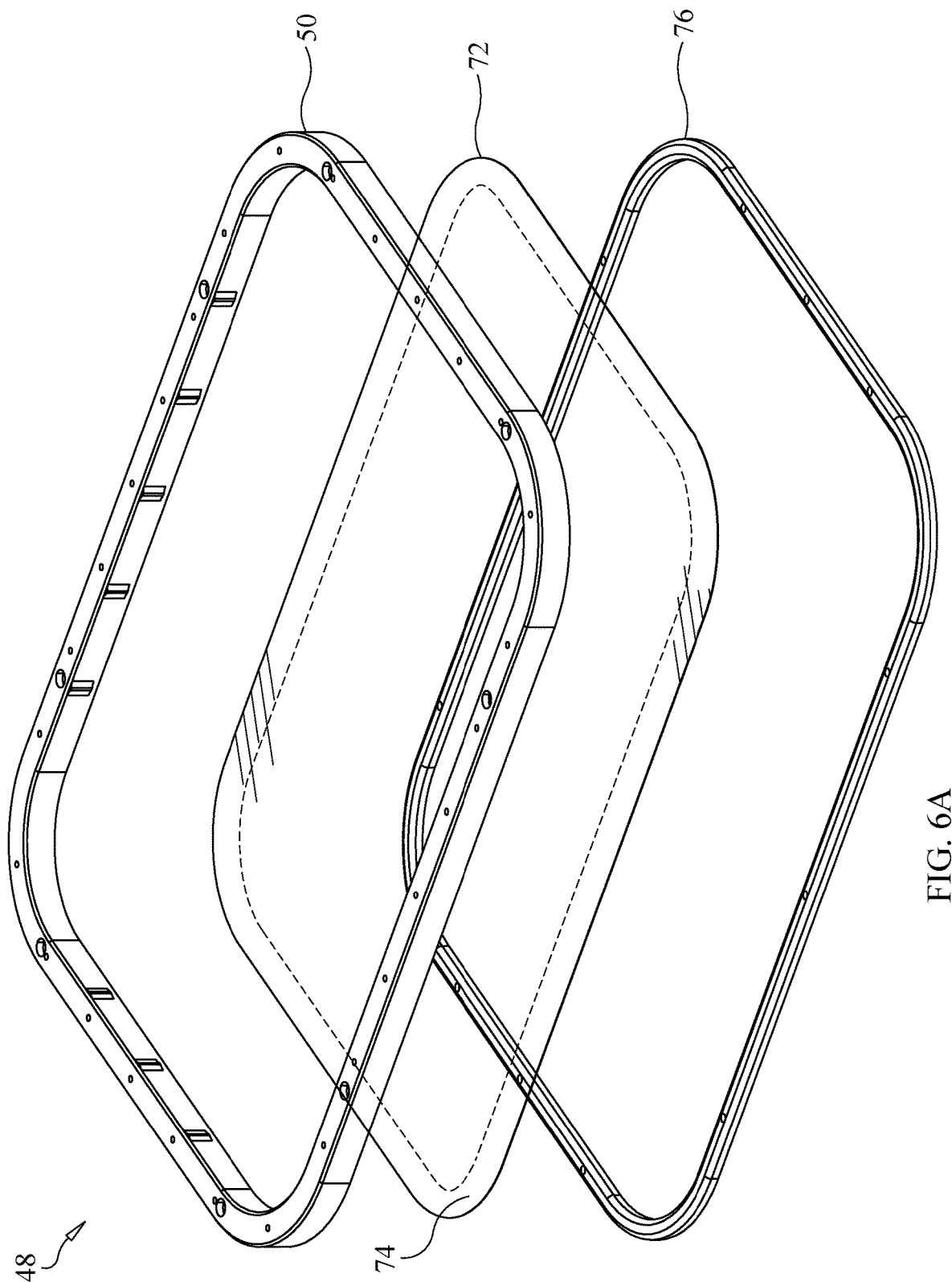
FIG. 6A depicts an exploded—perspective view of a membrane assembly, in accordance with one embodiment of the invention.

FIG. 6A depicts an exploded—perspective view of membrane assembly 48. In the exploded view, membrane 72 is shown between frame 50 and membrane securing member 76. As will be more clearly depicted in the following figures, an outer perimeter portion 74 of membrane 72 may be secured within a groove of frame 50 by membrane securing member 76. Prior to the insertion of membrane securing member 76 into the groove of frame 50, membrane 72 may be pulled and/or stretched in a taut manner against frame 50, so that some tension is present in the surface of membrane 72. When membrane securing member 76 secures outer perimeter portion 74 of membrane 72 into the groove of frame 50, such tension in the surface of membrane 72 may be maintained and/or increased. Such tension, of course, is lower than a degree of tension that would cause membrane 72 to tear. Also, frame 50 is made from a material with sufficient rigidity in order to maintain the tension of membrane 72.

Figure 6B:
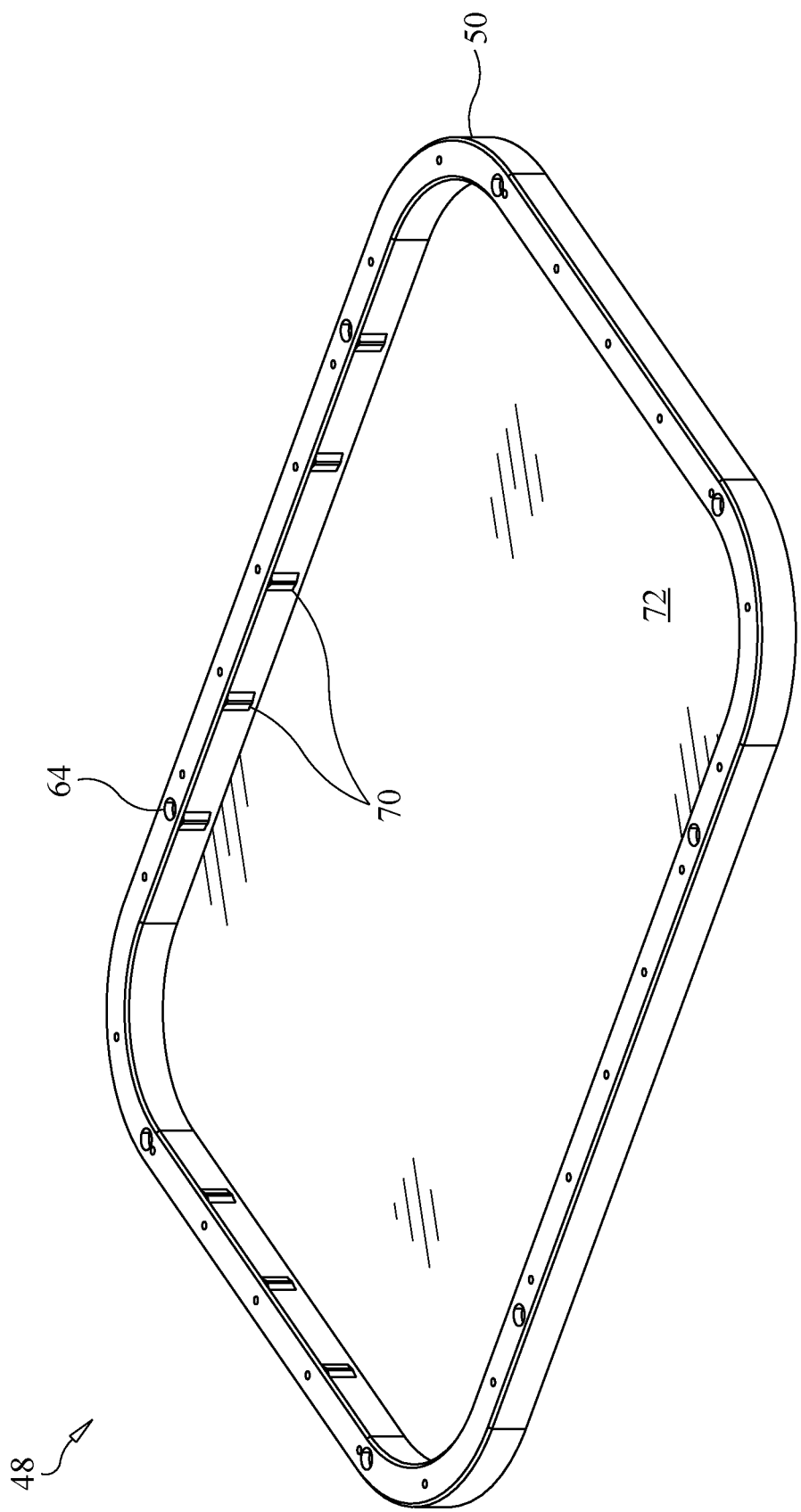
FIG. 6B depicts a perspective view of a membrane assembly, in accordance with one embodiment of the invention.
Figure 6C:
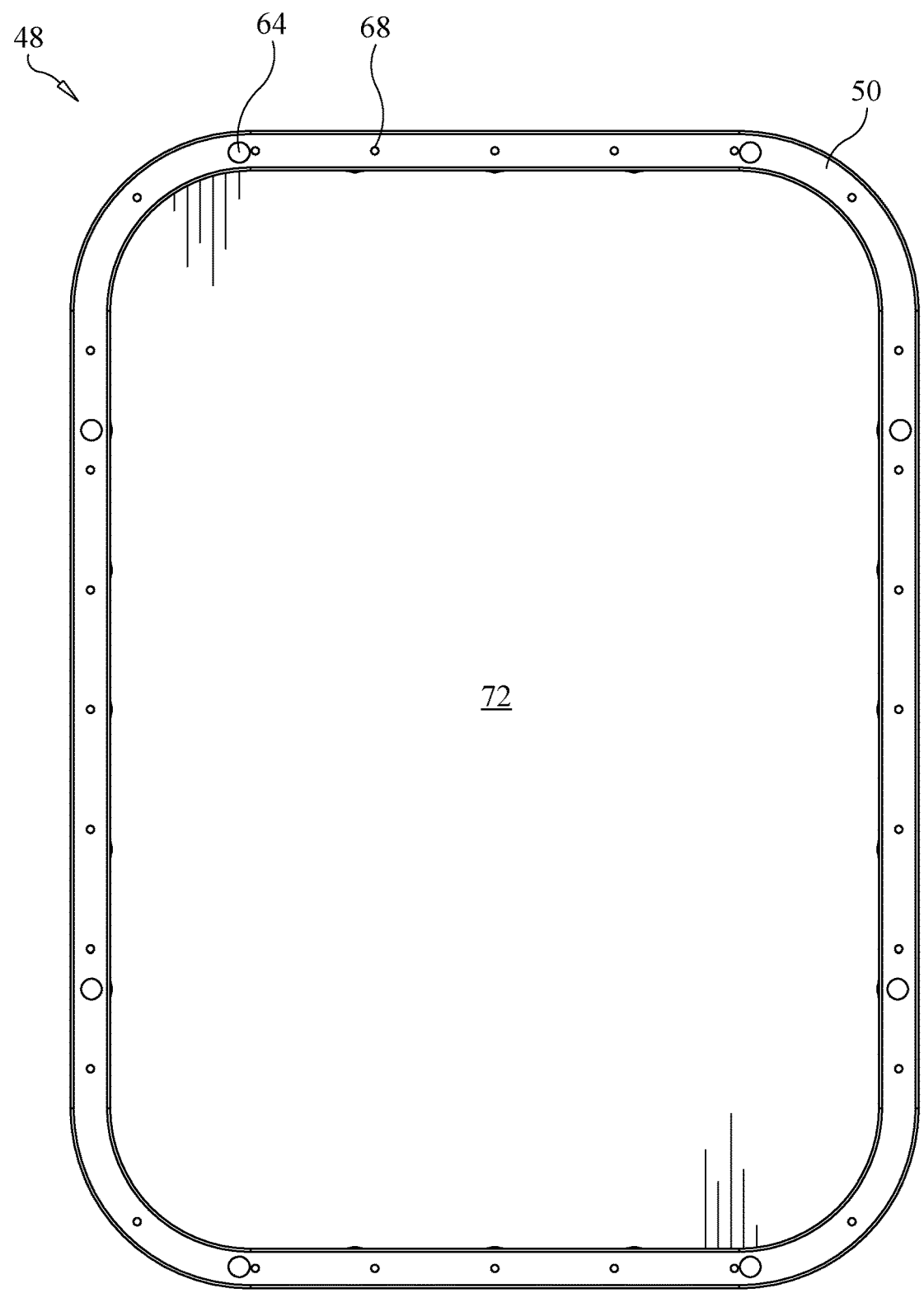
FIG. 6C depicts a top view of a membrane assembly, in accordance with one embodiment of the invention.
Figure 6D:
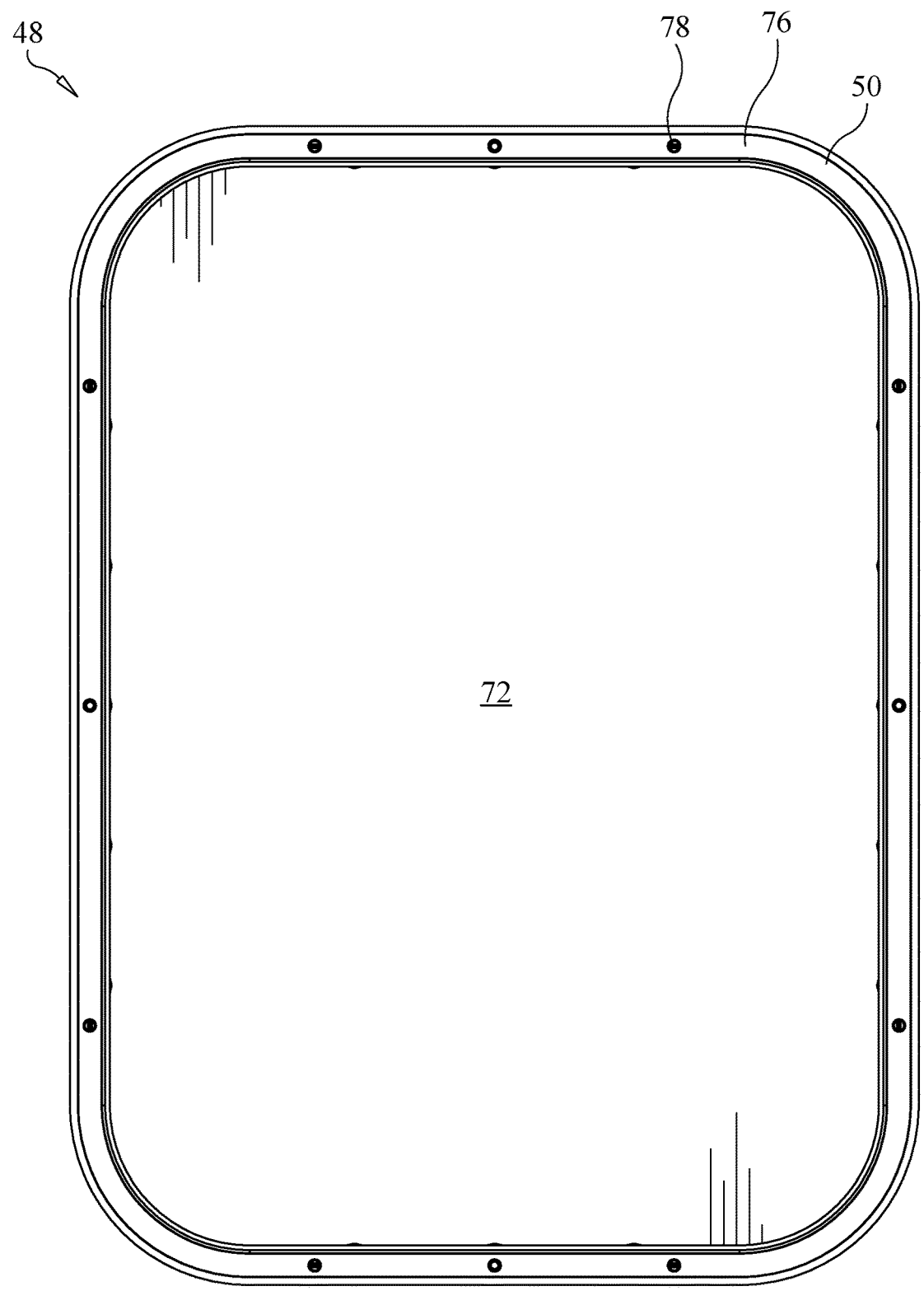
FIG. 6D depicts a bottom view of a membrane assembly, in accordance with one embodiment of the invention.

FIG. 6B depicts a perspective view of membrane assembly 48 in which membrane 72 is secured to frame 50 by membrane securing member 76 (although the membrane securing member is not visible in this view). FIG. 6C depicts a top view of membrane assembly 48, and FIG. 6D depicts a bottom view of membrane assembly 48, in which membrane securing member 76 is visible. Vias 78 through membrane securing member 76 are visible in the bottom view of FIG. 6D and may serve a similar purpose as vias 68 of frame 50, allowing air to quickly escape from between membrane 72 and membrane securing member 76 (and/or between groove 62 and membrane securing member 76) when membrane securing member 76 is inserted into the groove.

Figure 6E:
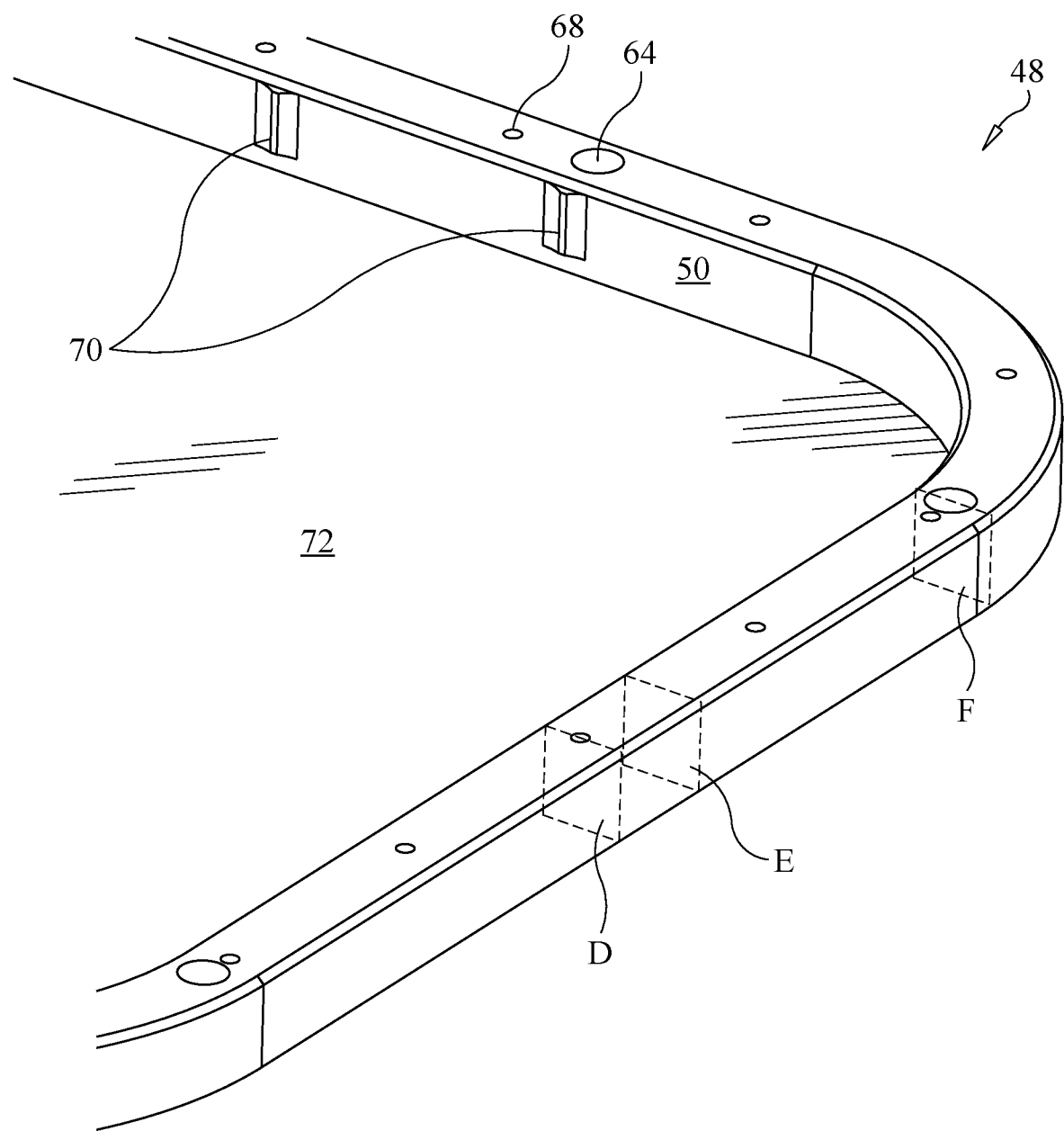
FIG. 6E depicts a magnified portion of FIG. 6A, in accordance with one embodiment of the invention.
Figure 6F:
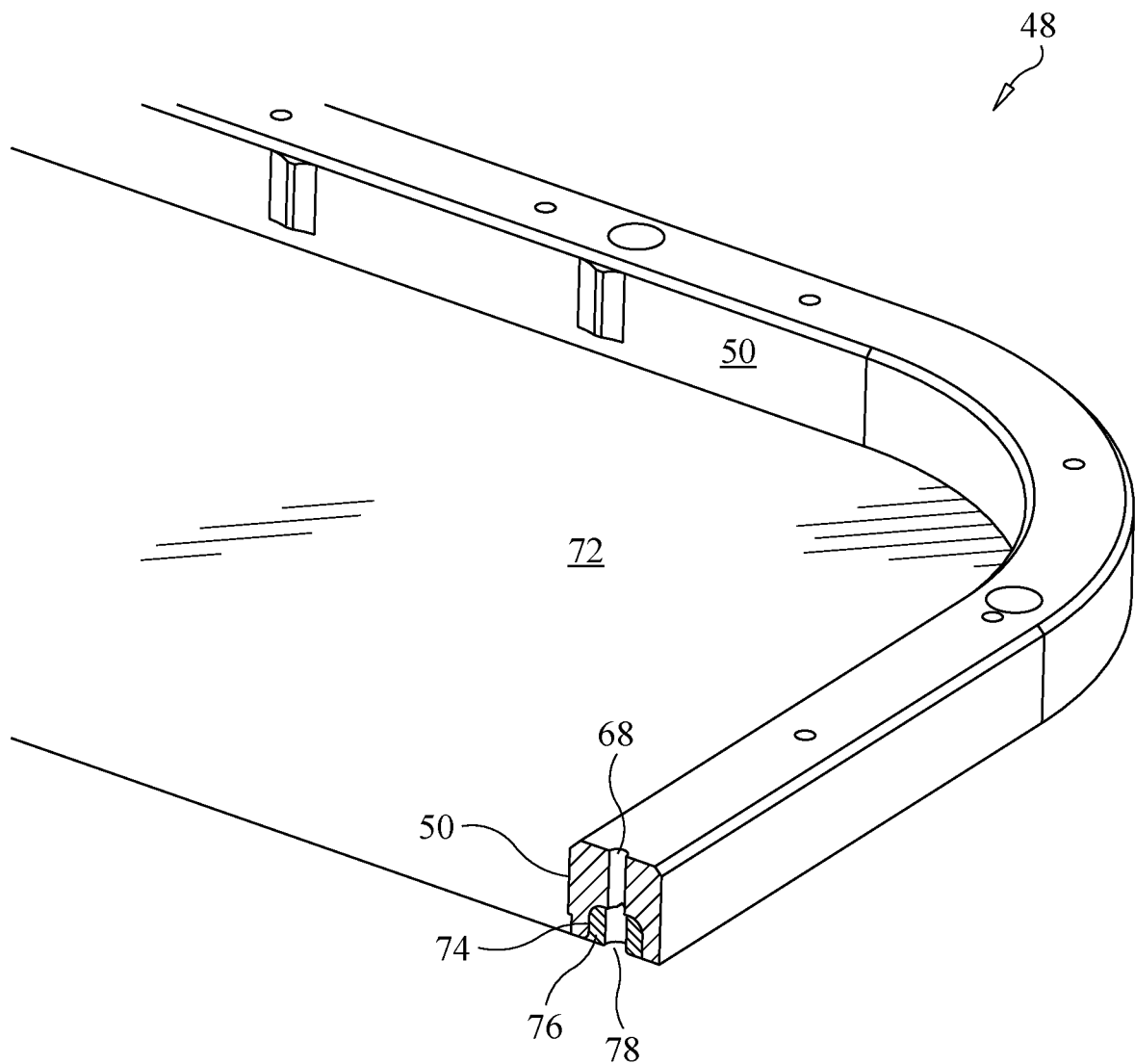
FIG. 6F depicts a cross-sectional—perspective view along plane D of FIG. 6E, in accordance with one embodiment of the invention.
Figure 6G:
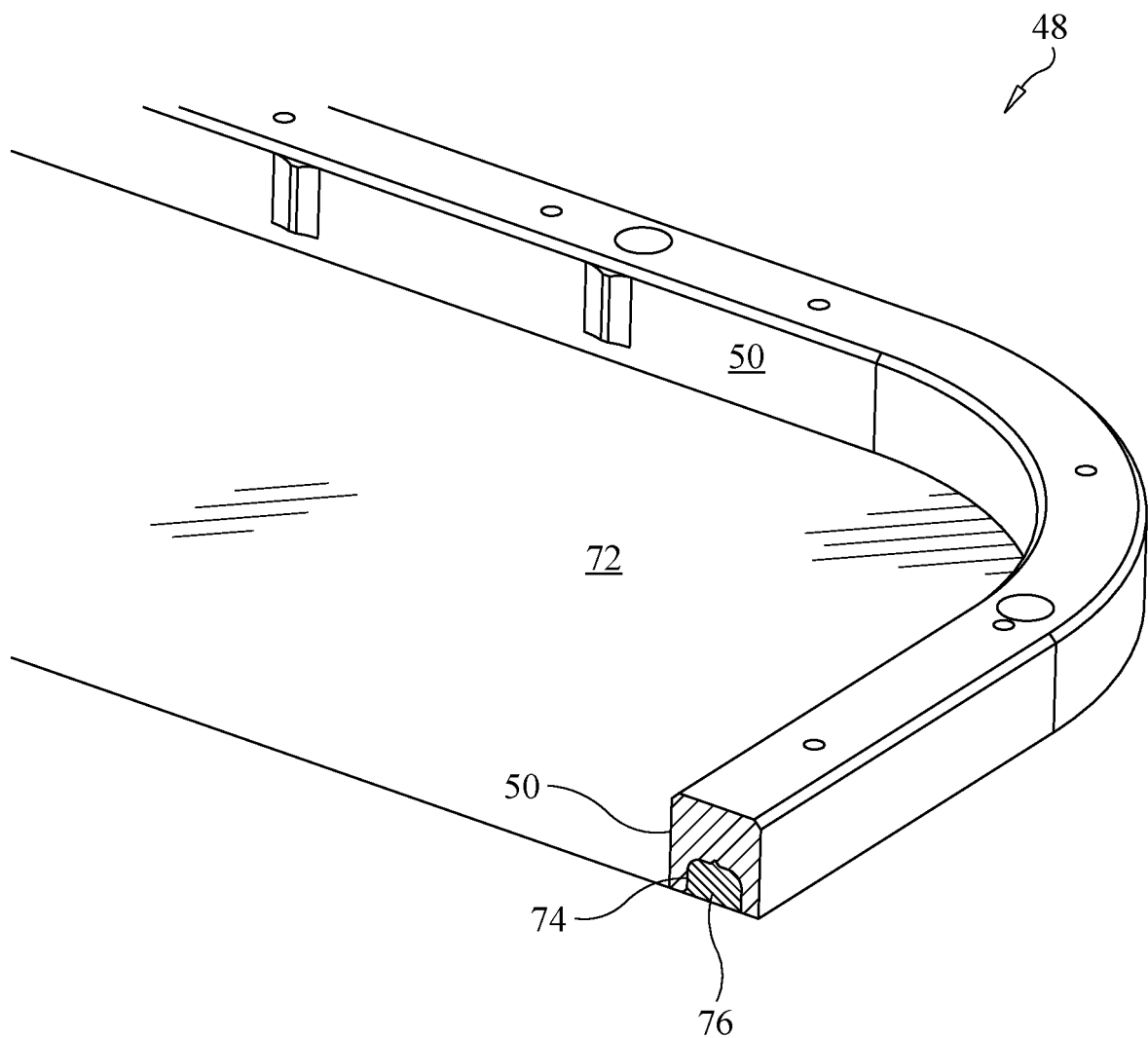
FIG. 6G depicts a cross-sectional—perspective view along plane E of FIG. 6E, in accordance with one embodiment of the invention.
Figure 6H:
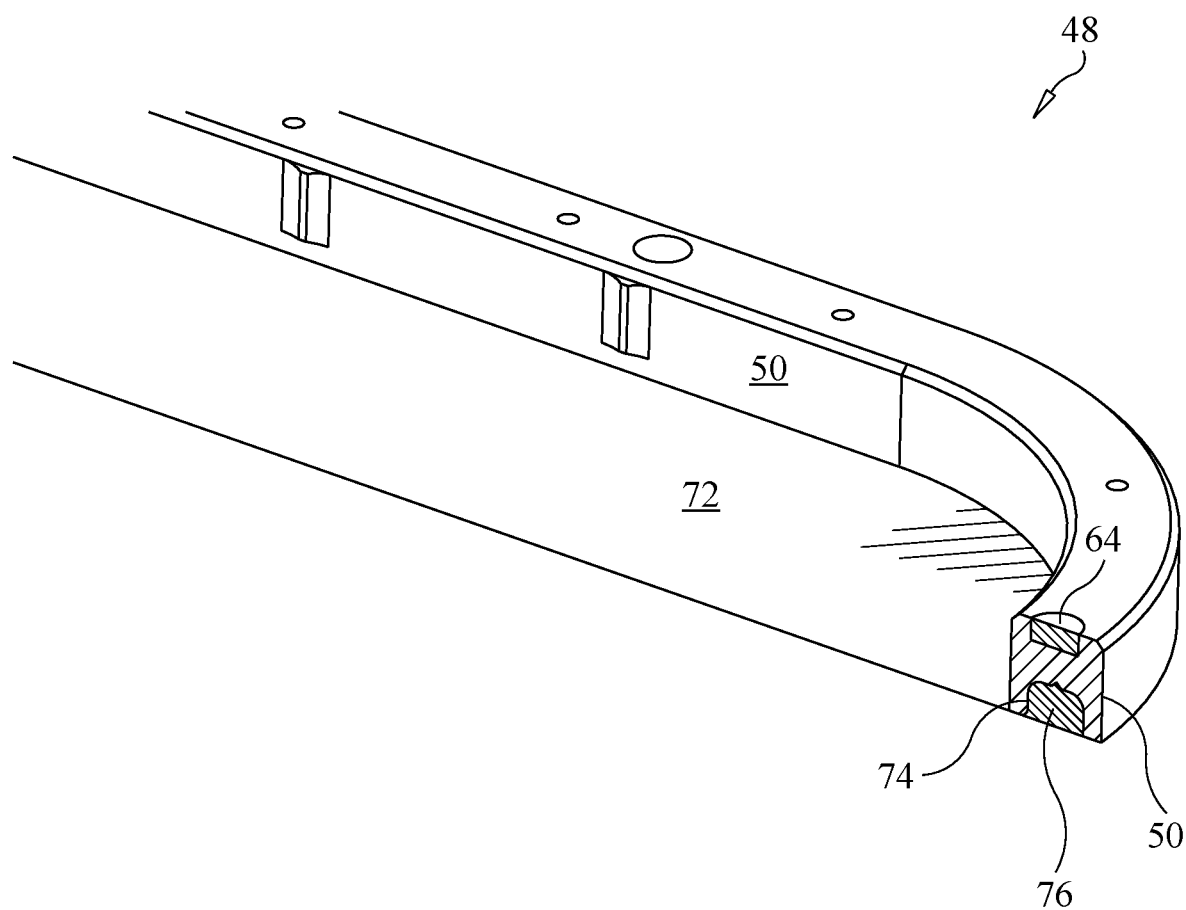
FIG. 6H depicts a cross-sectional—perspective view along plane F of FIG. 6E, in accordance with one embodiment of the invention.

FIG. 6E depicts a magnified portion of FIG. 6A. FIG. 6F depicts a cross-sectional—perspective view along plane D of FIG. 6E, and shows membrane securing member 76 inserted within the groove of frame 50 so as to secure peripheral portion 74 of membrane 72 within the groove of the frame. The cross-section also shows via 68 of frame 50 aligned with via 78 of membrane securing member 76. While the alignment of via 68 and via 78 may be present in some embodiments, such alignment may not be present in other embodiments (not depicted). FIG. 6G depicts a cross-sectional—perspective view along plane E of FIG. 6E, and shows membrane securing member 76 inserted within the groove of frame 50 so as to secure peripheral portion 74 of membrane 72 within the groove of the frame. FIG. 6H depicts a cross-sectional—perspective view along plane F of FIG. 6E, and shows a cross section through magnet 64.

Figure 7A:
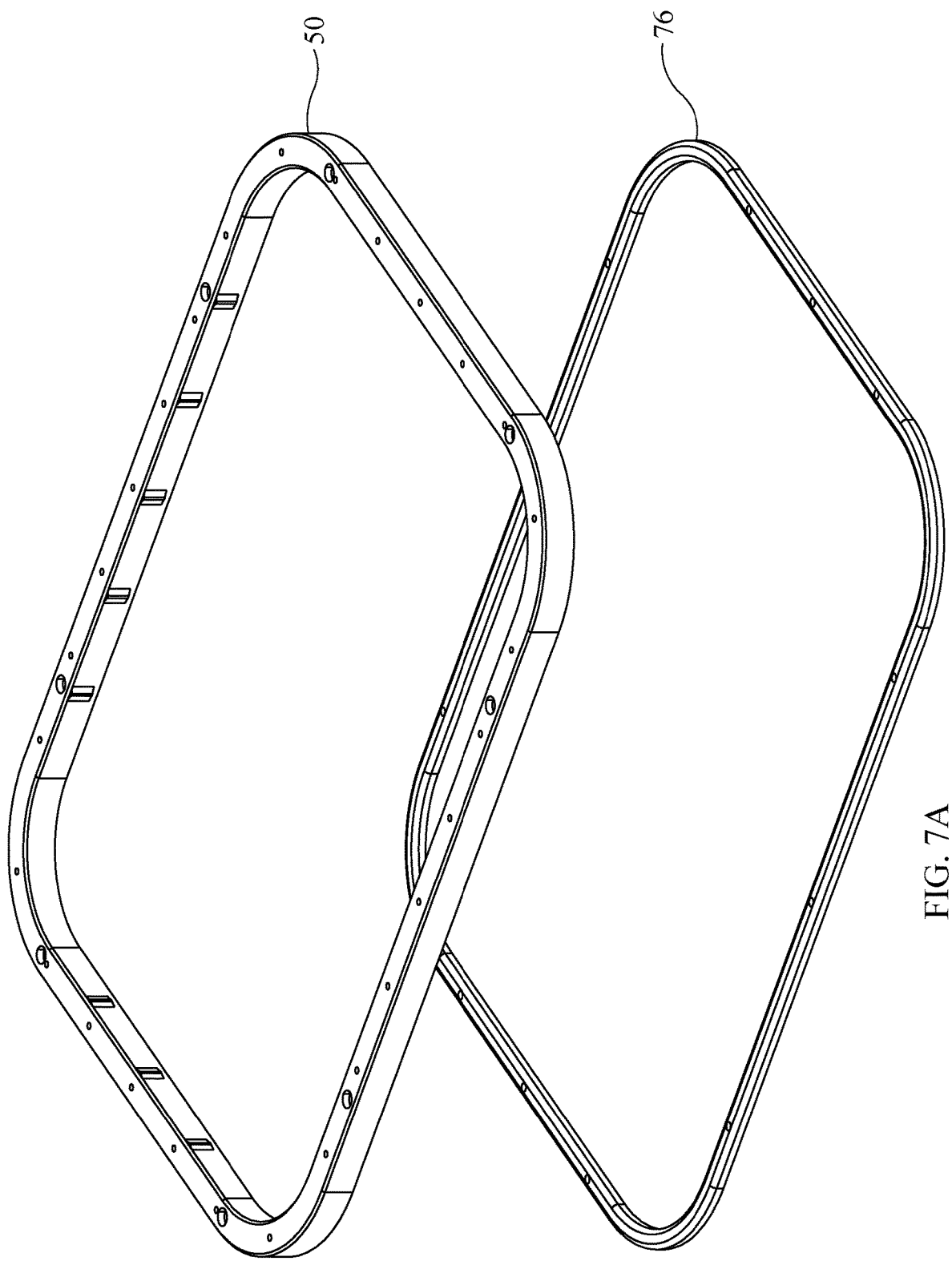
FIG. 7A depicts an exploded—perspective view of a frame assembly, in accordance with one embodiment of the invention.
Figure 7B:
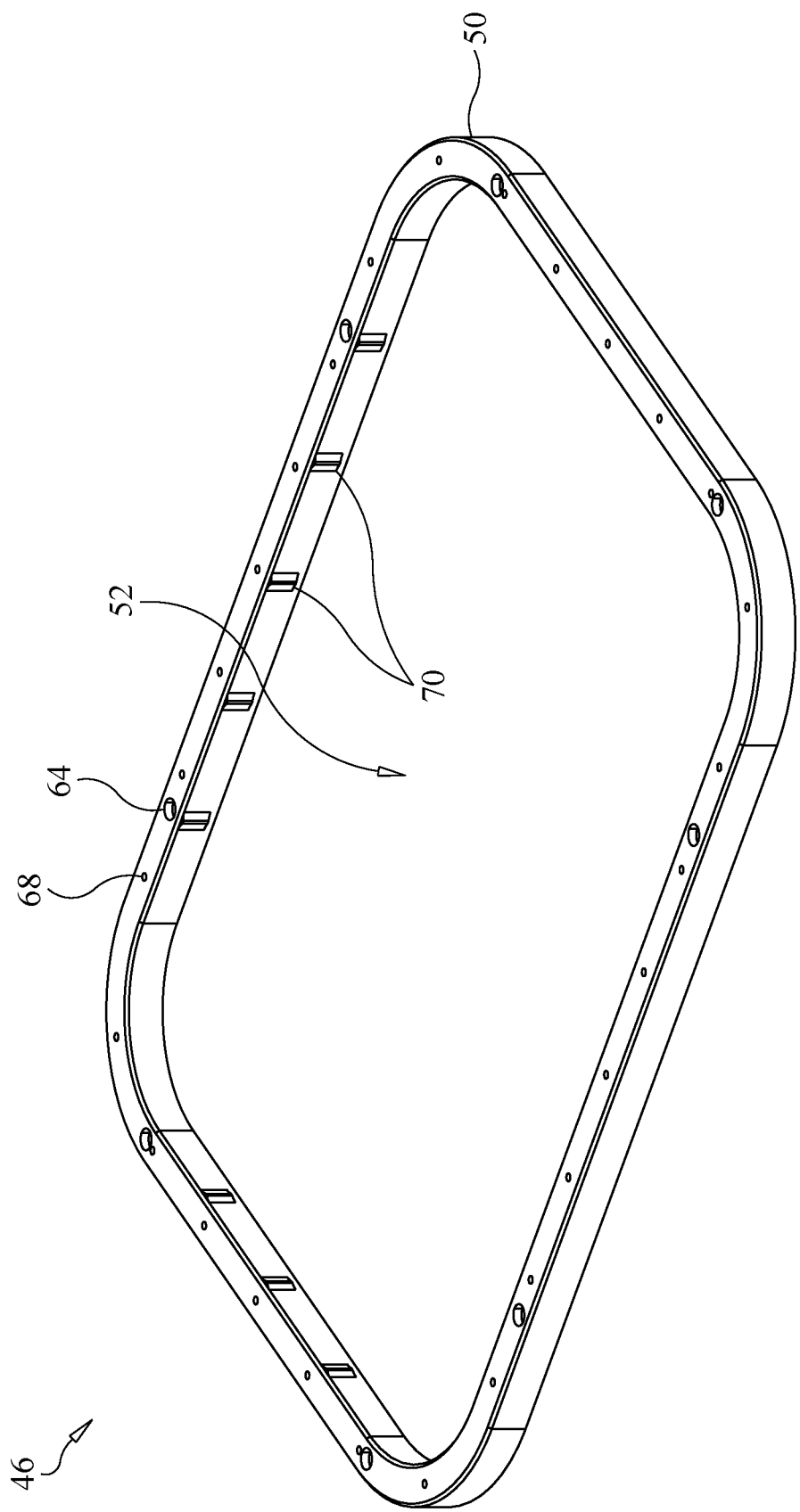
FIG. 7B depicts a perspective view of a frame assembly, in accordance with one embodiment of the invention.

FIG. 7A depicts an exploded—perspective view of frame assembly 46, including frame 50 and membrane securing member 76. Frame assembly 46 is essentially identical to membrane assembly 48, except that it does not include membrane 72. The motivation for frame assembly 46 is that frame assembly 46 may be sold separately from membrane 72. Of course, when tank assembly 10 is assembled, membrane 72 will be secured to frame assembly 46, converting frame assembly 46 into membrane assembly 48. FIG. 7B depicts a perspective view of frame assembly 46, in which membrane securing member 76 (not visible in FIG. 7B) has been inserted into the groove of frame 50 without membrane 72 therebetween.

Figure 7C:
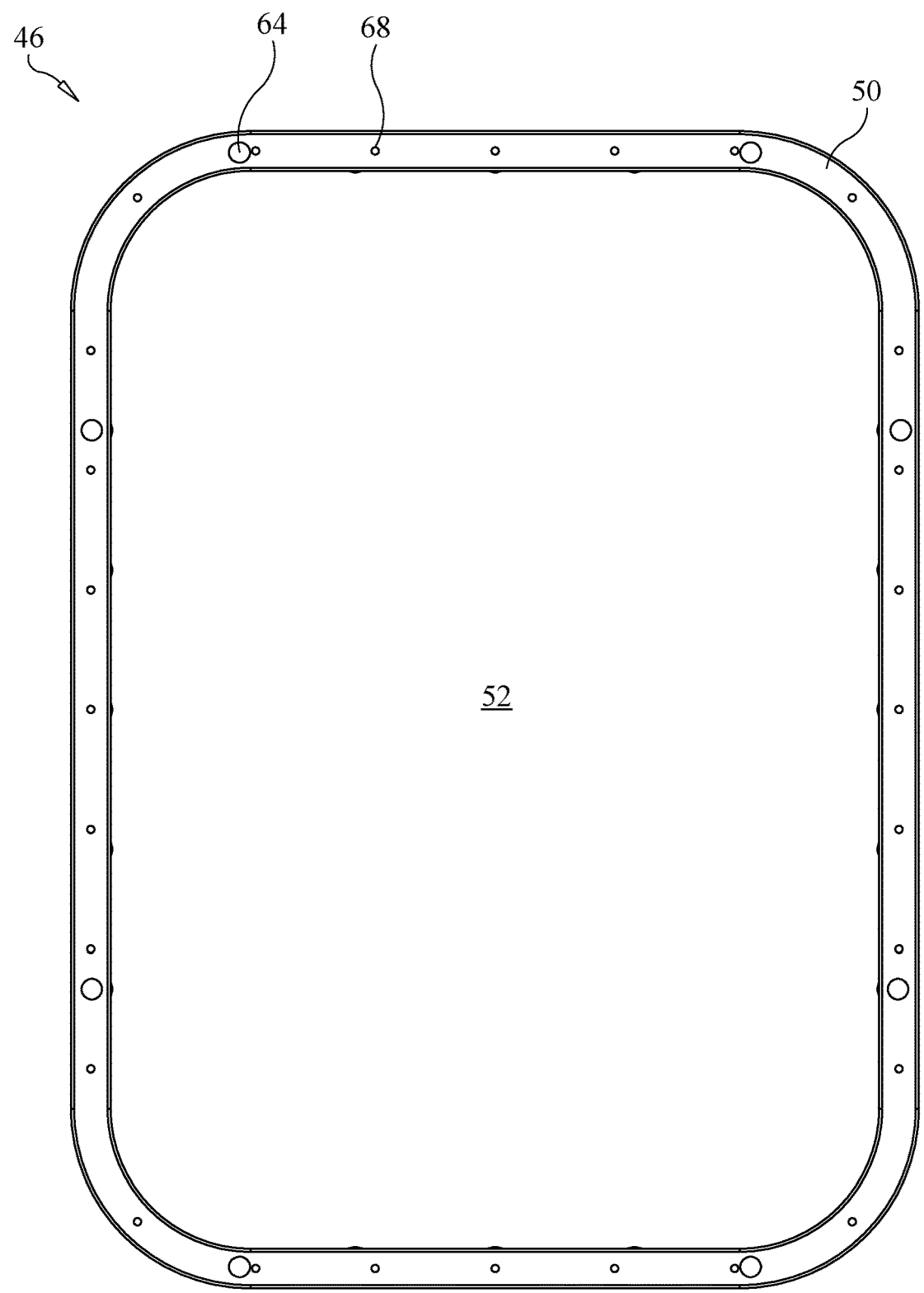
FIG. 7C depicts a top view of a frame assembly, in accordance with one embodiment of the invention.
Figure 7D:
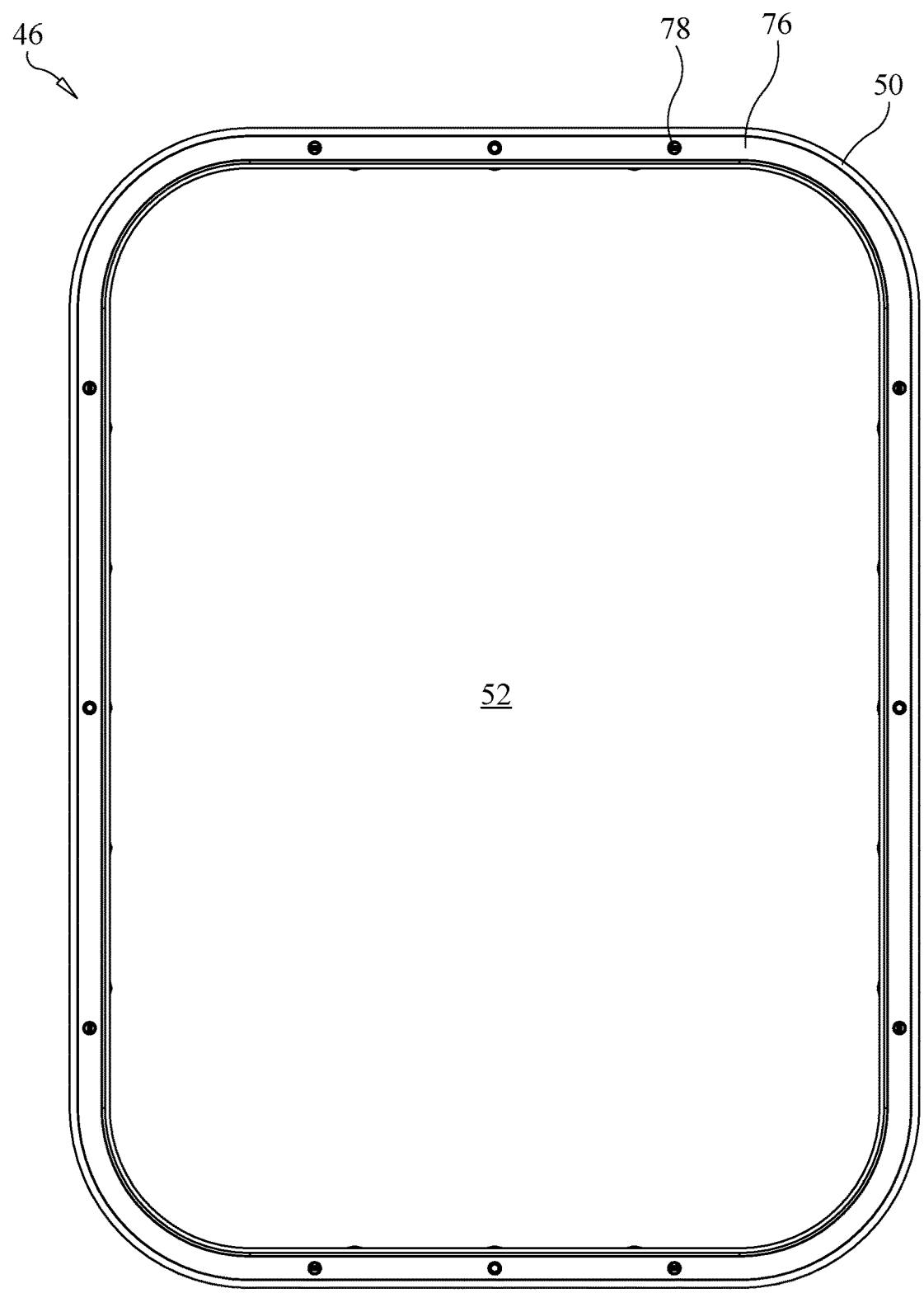
FIG. 7D depicts a bottom view of a frame assembly, in accordance with one embodiment of the invention.
Figure 7E:
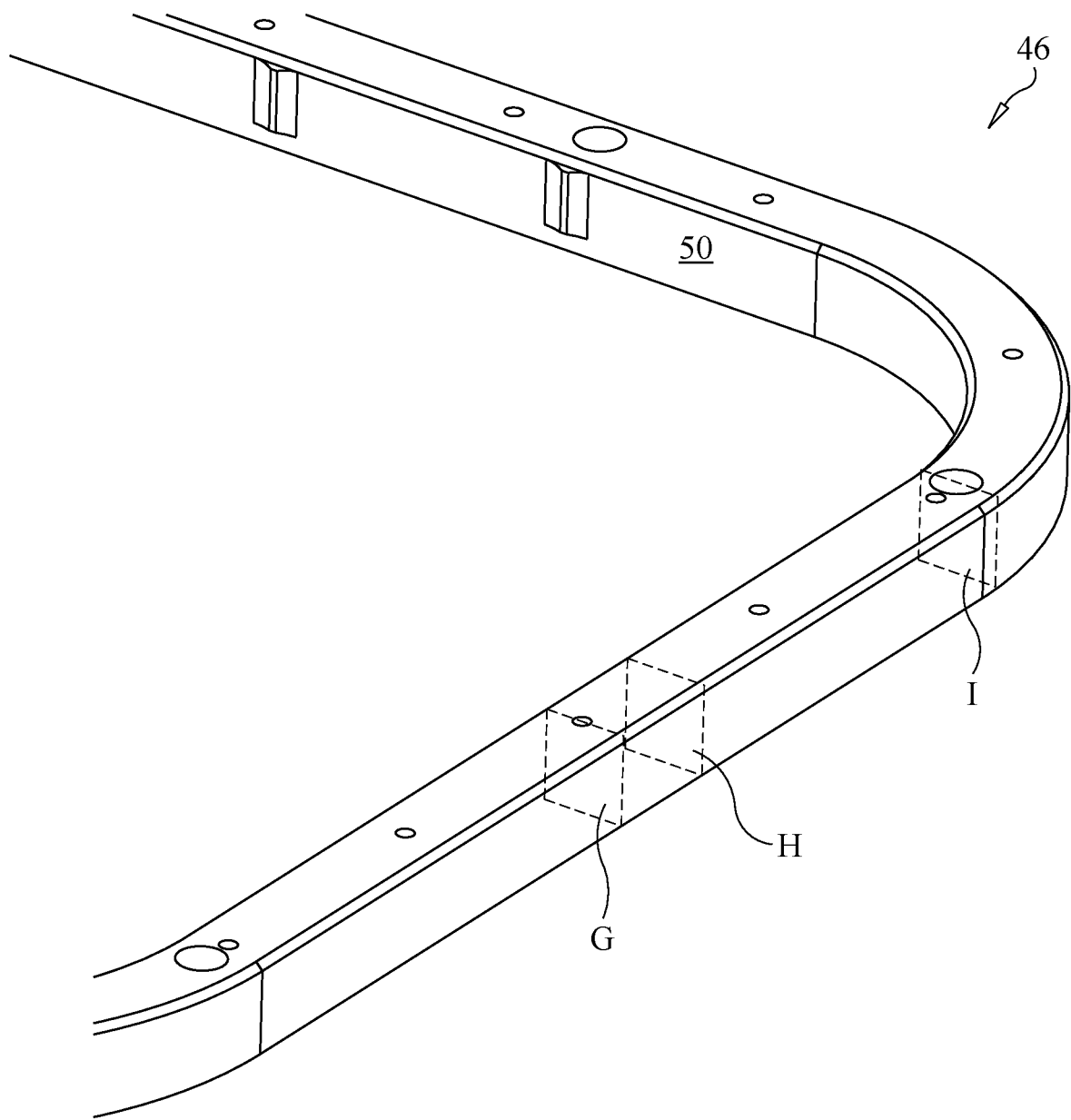
FIG. 7E depicts a magnified portion of FIG. 7A, in accordance with one embodiment of the invention.
Figure 7F:
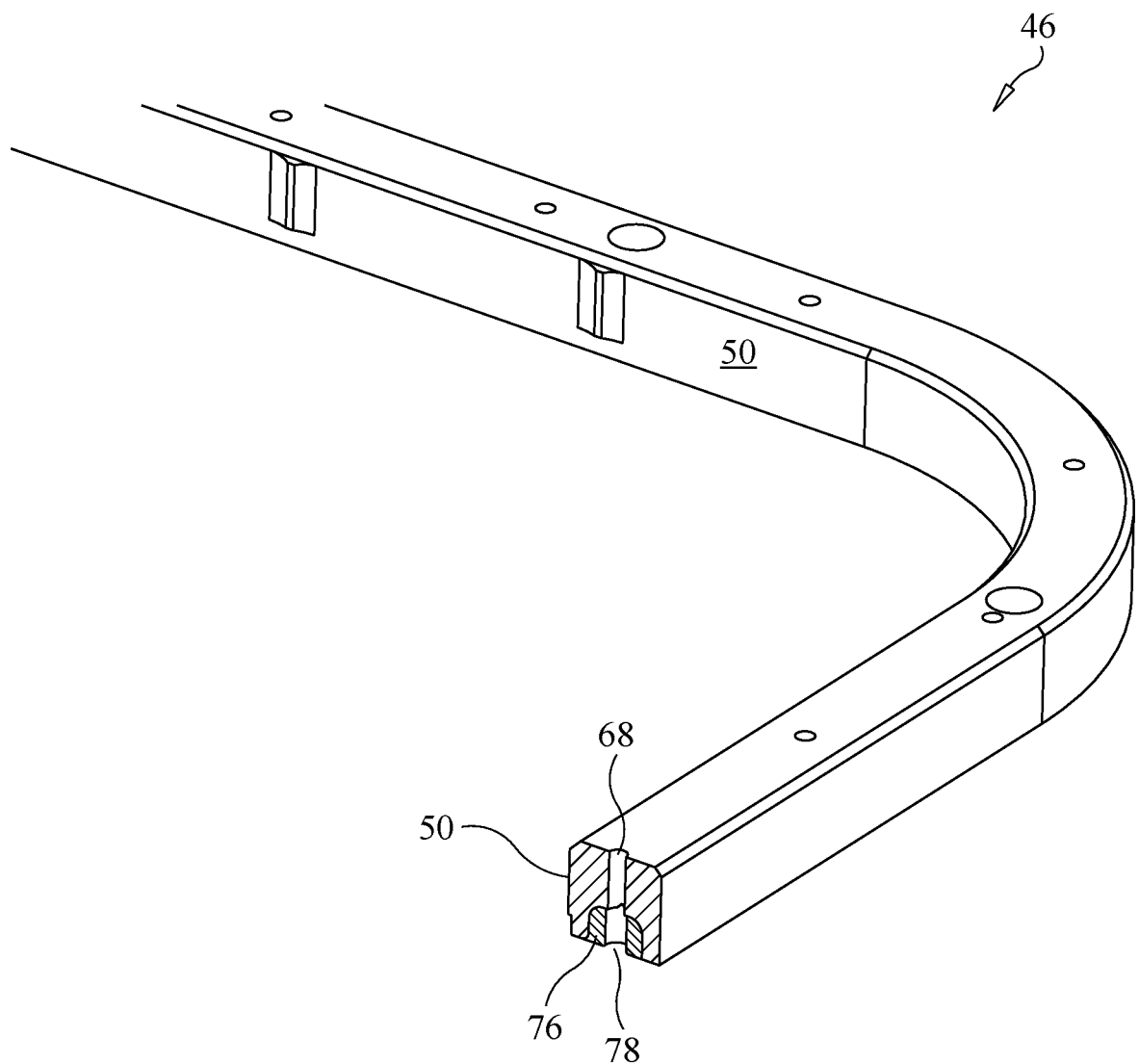
FIG. 7F depicts a cross-sectional—perspective view along plane G of FIG. 7E, in accordance with one embodiment of the invention.
Figure 7G:
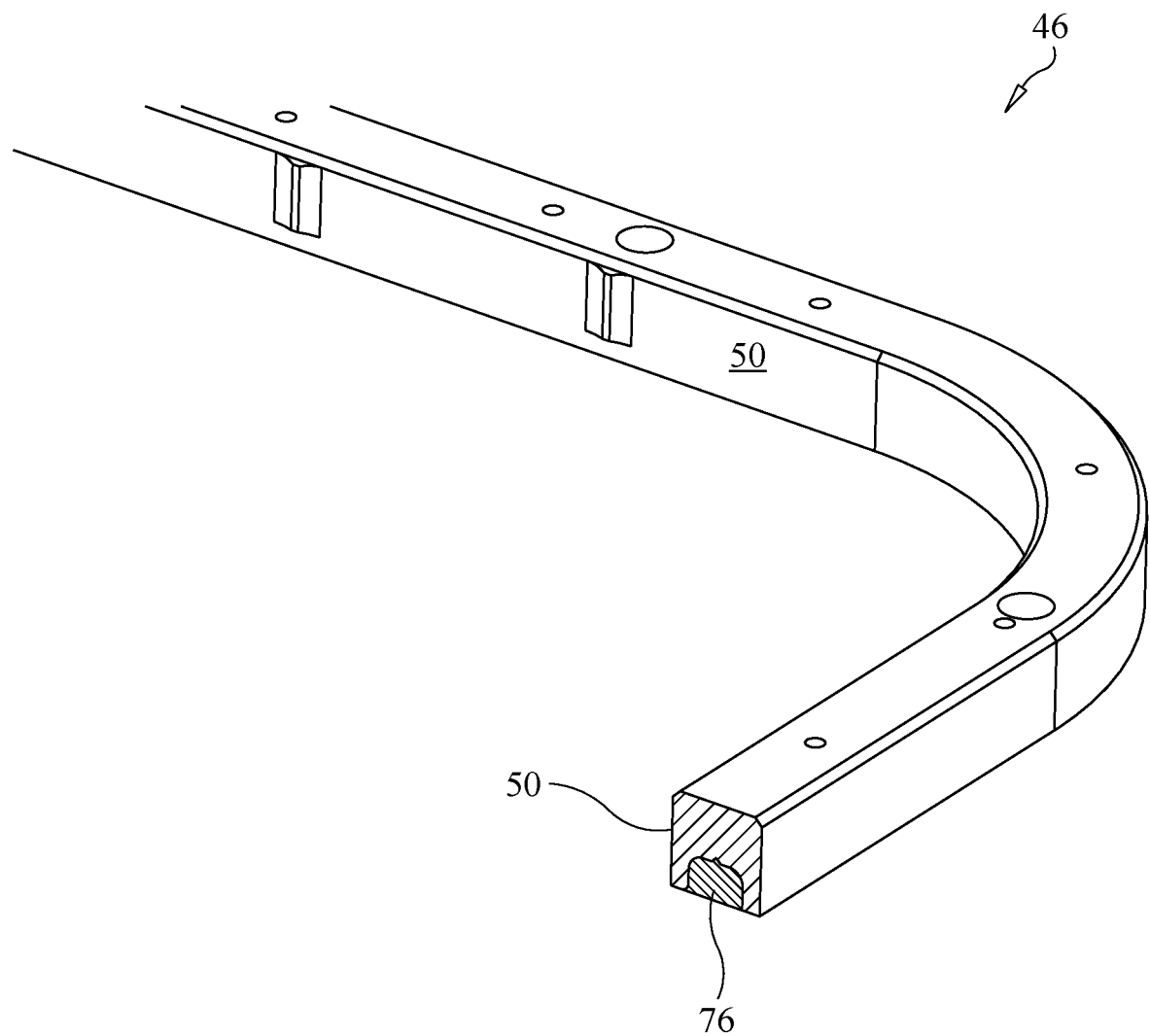
FIG. 7G depicts a cross-sectional—perspective view along plane H of FIG. 7E, in accordance with one embodiment of the invention.
Figure 7H:
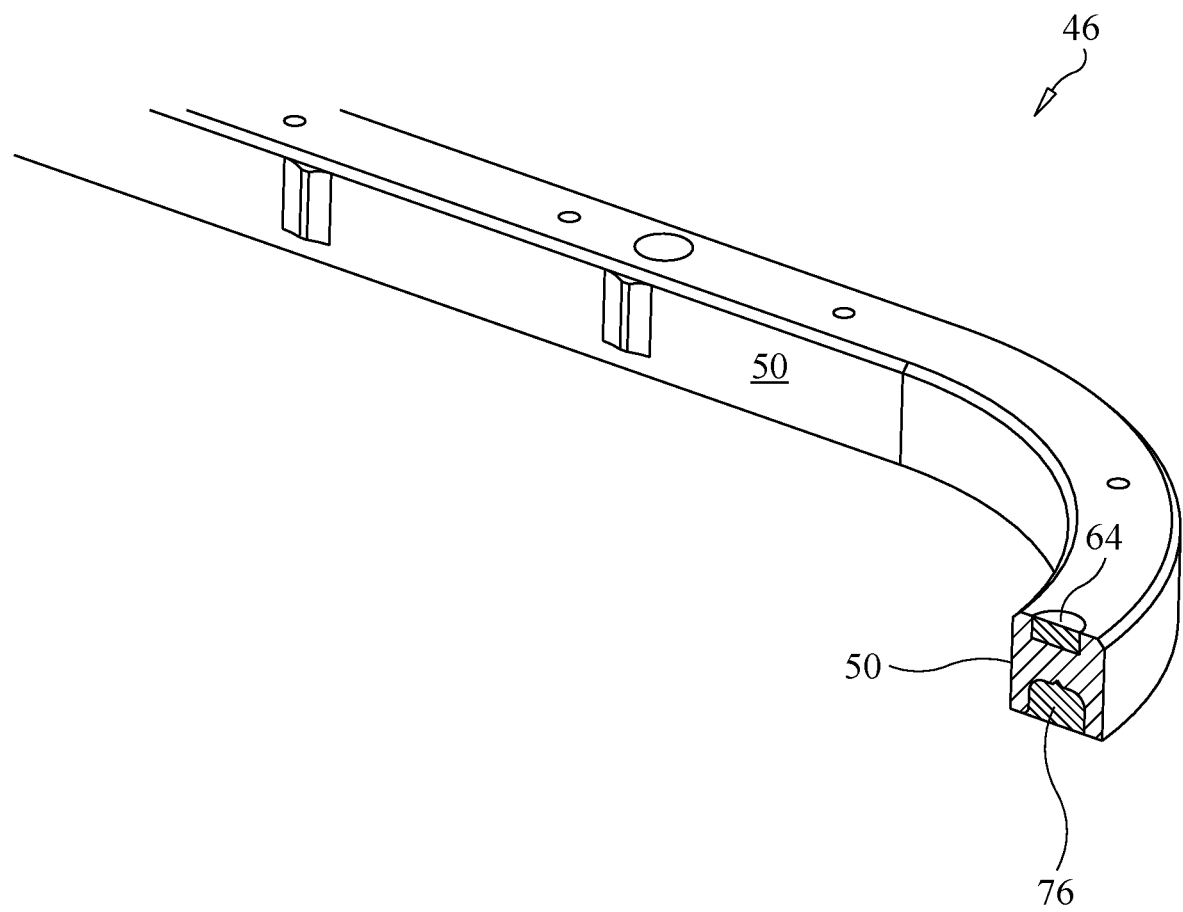
FIG. 7H depicts a cross-sectional—perspective view along plane I of FIG. 7E, in accordance with one embodiment of the invention.

FIG. 7C depicts a top view of frame assembly 46, and FIG. 7D depicts a bottom view of frame assembly 46. In the bottom view, membrane securing member 76 is shown inserted within the groove of frame 50. FIG. 7E depicts a magnified portion of FIG. 7A. FIG. 7F depicts a cross-sectional—perspective view along plane G of FIG. 7E, which shows membrane securing member 76 inserted within the groove of frame 50. FIG. 7G depicts a cross-sectional—perspective view along plane H of FIG. 7E, and FIG. 7H depicts a cross-sectional—perspective view along plane I of FIG. 7E.

Figure 8A:
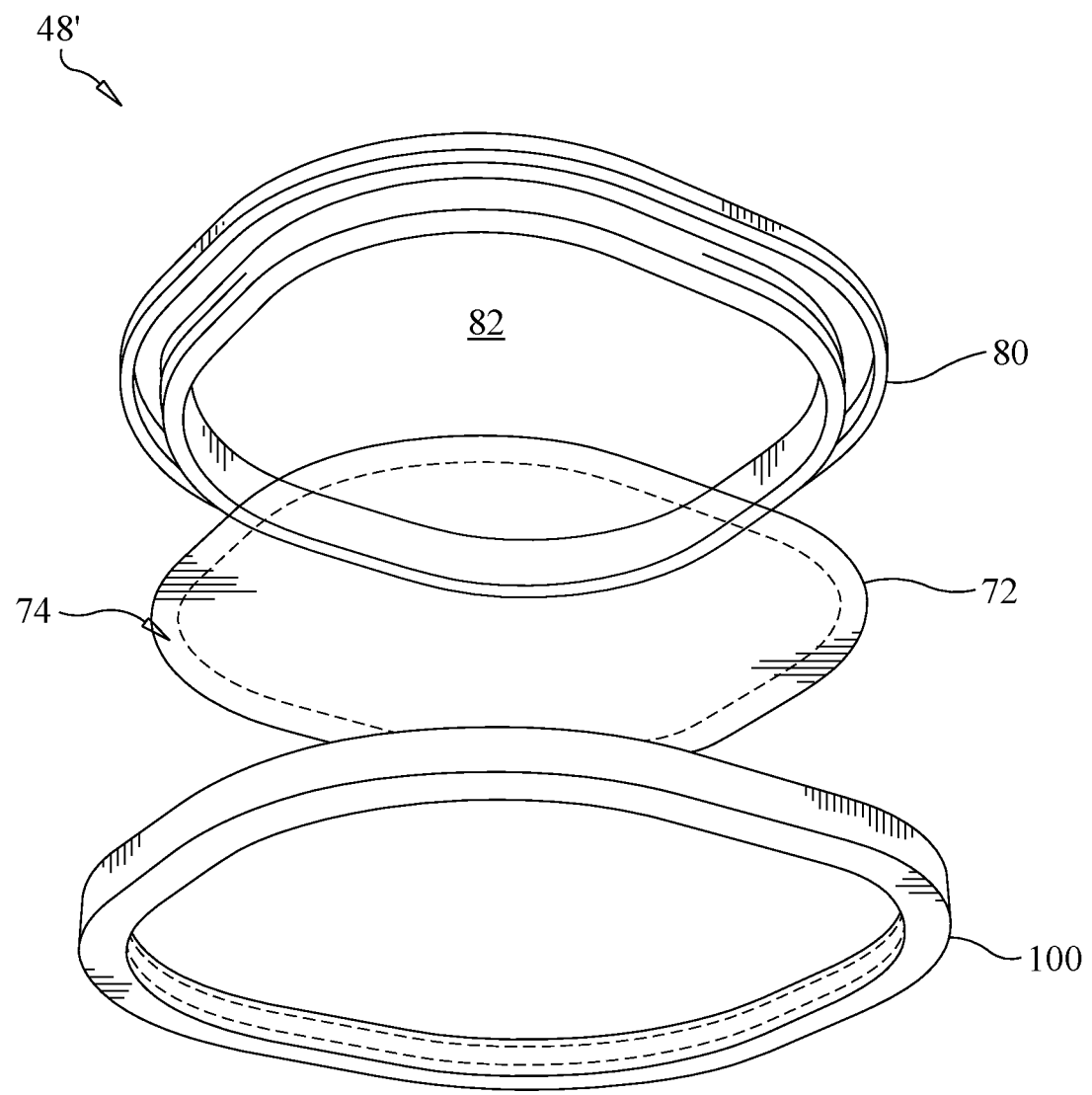
FIG. 8A depicts an exploded—perspective view of a membrane assembly, in accordance with one embodiment of the invention.

FIG. 8A depicts an exploded—perspective view of membrane assembly 48', which has certain features that are different from the earlier described membrane assembly 48.

First, the rectangular profile of membrane assembly 48' has corners that are more rounded than the corners of the rectangular profile of membrane assembly 48. The rounded corners provide the advantage of minimizing the wrinkling and/or bunching of membrane 72 in the outer peripheral portions of membrane 72 that occasionally occurs near the corners of the rectangular profile. Second, the structure of frame 80 and membrane securing member 100 are different from previously described frame 50 and membrane securing member 76. Such structure will be described in detail in FIG. 8D below. On the other hand, there are certain features of membrane assembly 48' that are the same as membrane assembly 48. In particular, a size and shape of membrane assembly 48' are still complementary to a size and shape of a bottom rim of the tank sidewall. The tank sidewall that is complementary to membrane assembly 48' has not been depicted, but it is expected the reader will understand how tank sidewall 12 could be modified to make the bottom rim complementary to the size and shape of membrane assembly 48'. Similarly, a certain degree of tension may be present in membrane 72 due to how membrane 72 is mounted on frame 80 and the rigidity of frame 80.

Figure 8B:
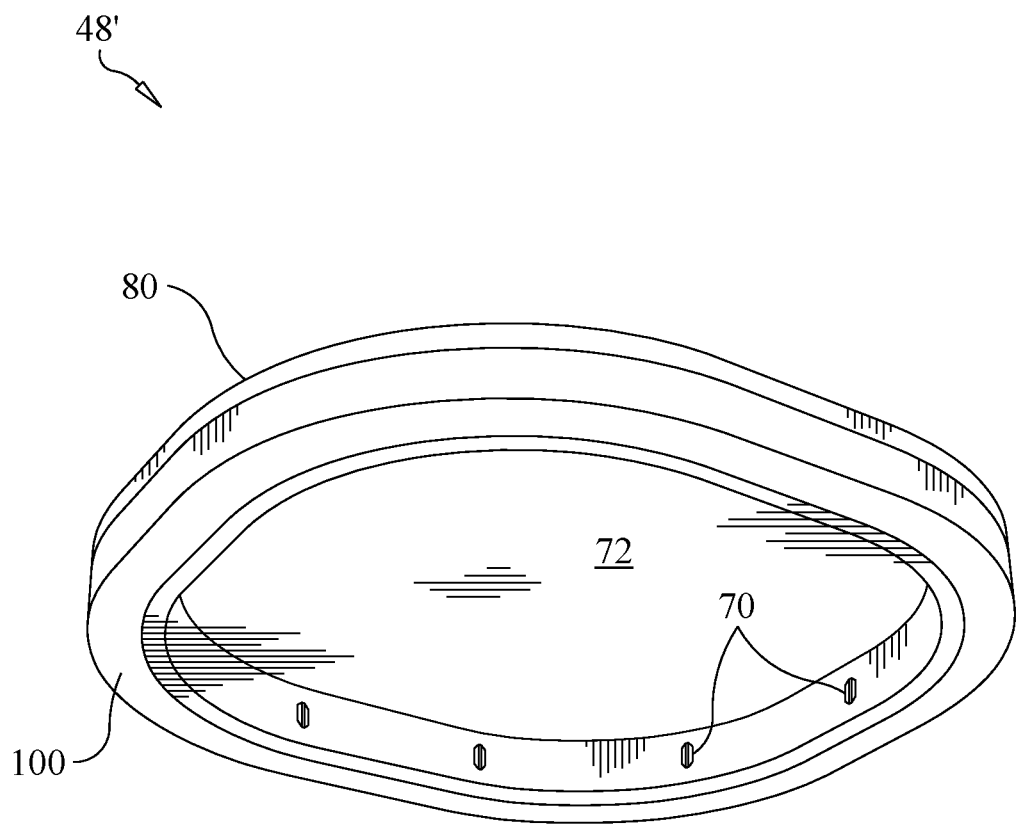
FIG. 8B depicts a perspective view of a membrane assembly, in accordance with one embodiment of the invention.
Figure 8C:
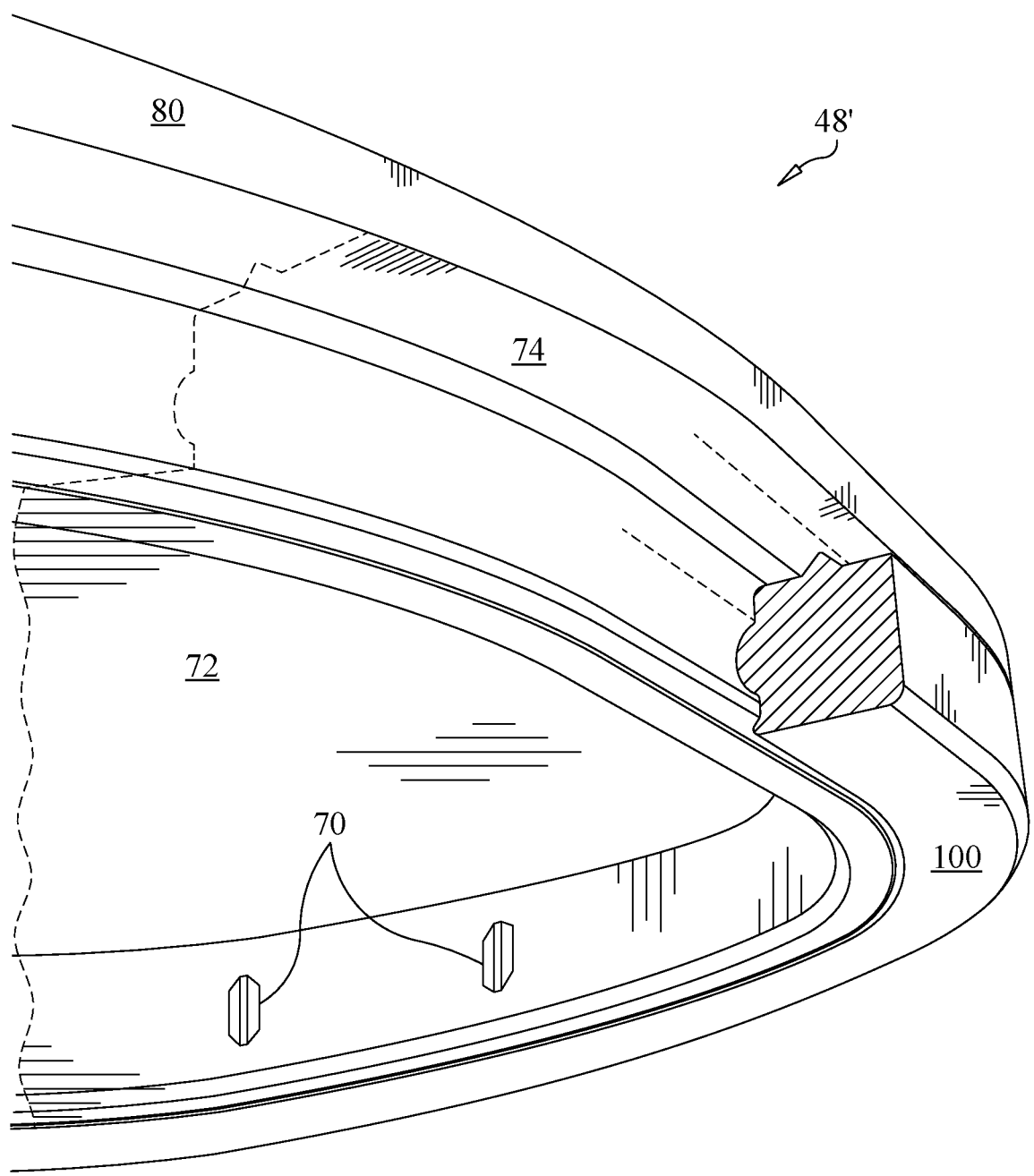
FIG. 8C depicts a magnified portion of FIG. 8B (further with a portion of the membrane securing member cut away so as to show the structure of the frame), in accordance with one embodiment of the invention.

FIG. 8B depicts a perspective view of membrane assembly 48'. FIG. 8C depicts a magnified portion of FIG. 8B (further with a portion of membrane securing member 100 cut away so as to show peripheral portion 74 of membrane 72 and the structure of frame 80). As shown in FIG. 8C, peripheral portion 74 of membrane 72 is secured in the region between frame 80 and membrane securing member 100. The multiple grooves in this region help to increase the amount of friction that can be applied (by frame 80 and membrane securing member 100) to peripheral portion 74 of membrane 72 so as to securely affix membrane 72 to frame 80.

Figure 8D:
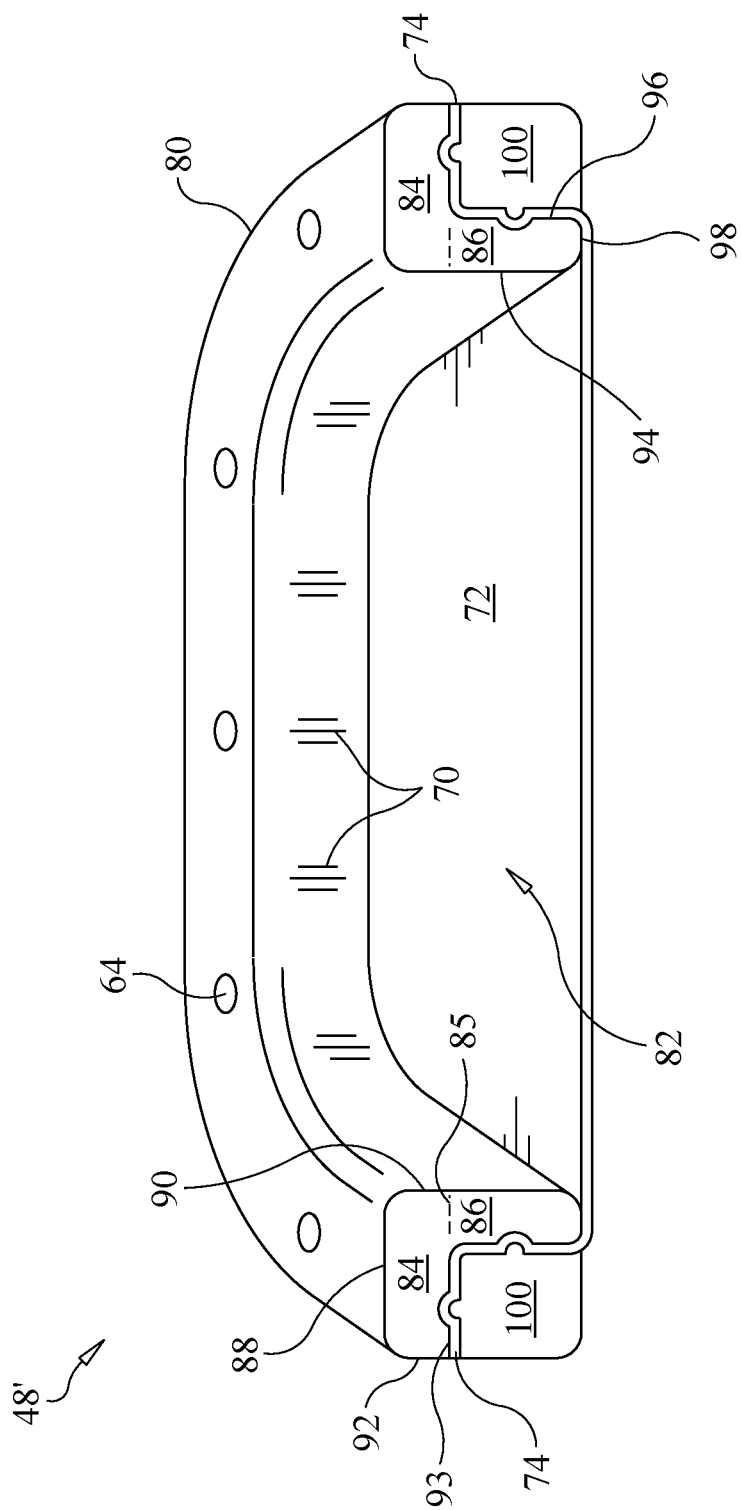
FIG. 8D depicts a cross-sectional perspective view of a membrane assembly, in accordance with one embodiment of the invention.

FIG. 8D depicts a cross-sectional perspective view of membrane assembly 48', showing the structure of frame 80 and membrane securing member 100 in greater detail. Frame 80 includes two portions: flange portion 84 and hollow shaft portion 86. Dashed line 85 has been drawn to indicate the "descriptive" boundary between these two portions. Such boundary is for the sake of description, and it is understood that no physical boundary may exist between flange portion 84 and hollow shaft portion 86 (i.e., frame 80 may be injection molded as a single integral component).

Flange portion 84 may include upper surface 88, within which magnets 64 may be disposed. Flange portion 84 may also include inner side surface 90, facing towards central opening 82, on which ribs 70 may be disposed for increasing the degree of friction between frame 80 and the bottom rim of the tank sidewall. Flange portion 84 may also include outer side surface 92 facing away from central opening 82. Flange portion 84 may also include a bottom surface 93 that contacts peripheral portion 74 of membrane 72. A bottom portion of flange portion 84 may be joined to a top portion of hollow shaft portion 86.

Hollow shaft portion 86 may include an inner side surface 94 on which ribs 70 may be disposed. Hollow shaft portion 86 may also include outer side surface 96 and bottom surface 98 that both contact peripheral portion 74 of membrane 72. As is visible in FIG. 8D, the multiple grooves of membrane securing member 100 may be complementary to the multiple grooves of frame 80.

Figure 9:
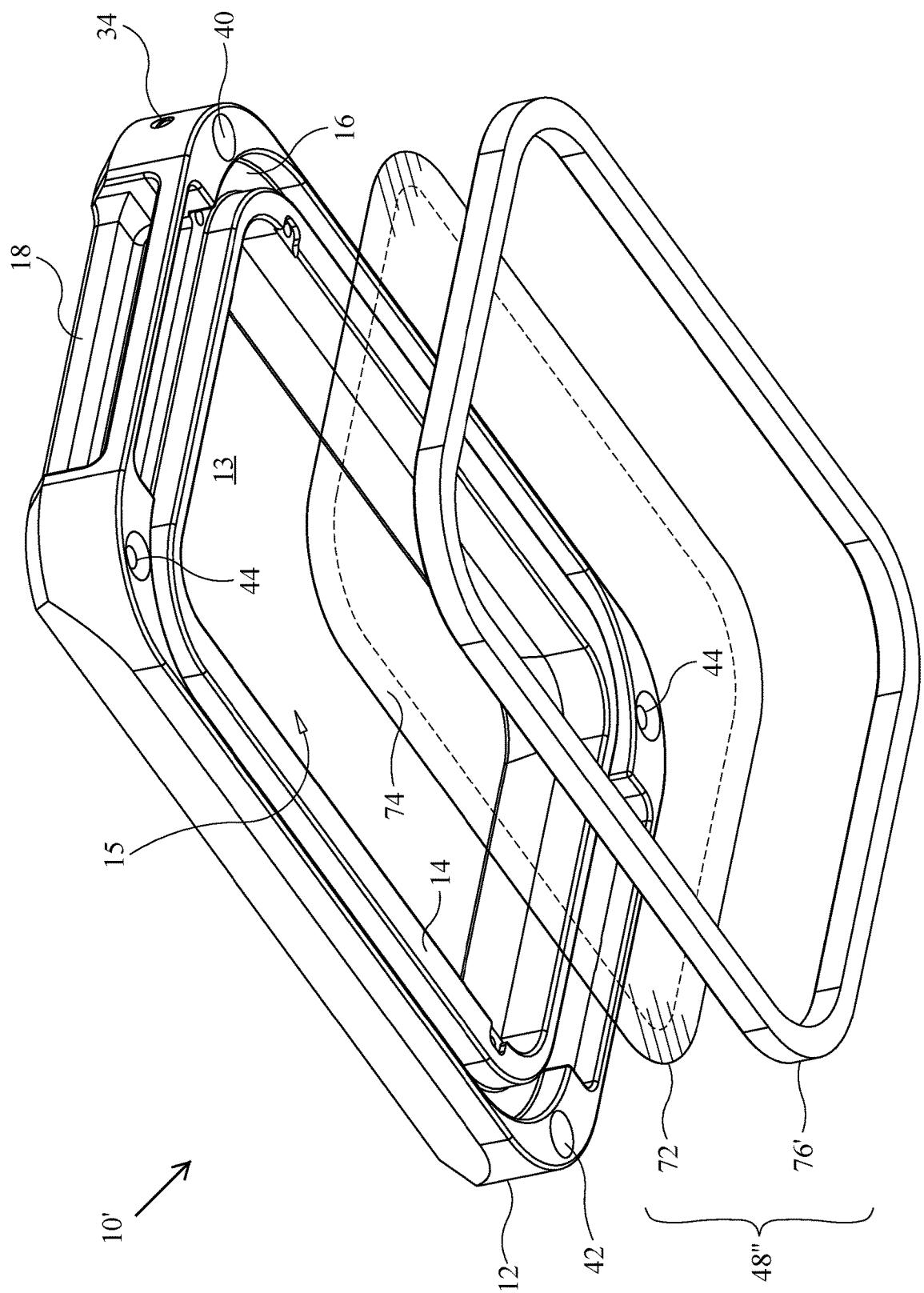
FIG. 9 depicts an exploded—perspective view of a tank assembly, in accordance with one embodiment of the invention.

FIG. 9 depicts an exploded—perspective view of tank assembly 10'. Tank assembly 10' is different from tank assembly 10 in that peripheral portion 74 of membrane 72 is secured directed to bottom rim 14 of tank sidewall 12 by membrane securing member 76'. Stated differently, membrane assembly 48" includes membrane 72 and membrane securing member 76', but leaves out frame 50 from (earlier described) membrane assembly 48. More specifically, membrane assembly 48" is configured to seal central opening 15 of bottom rim 14 of tank sidewall 12, in which central opening 15 conjoined with central cavity 13 of tank sidewall 12. A size and shape of membrane securing member 76' may be complementary to a size and shape of bottom rim 14 of tank sidewall 12. In fact, the size and shape of membrane securing member 76' may be similar to (earlier described) frame 50 of tank assembly 10. In contrast to frame 50, however, membrane securing member 76' may not include ribs or a groove. It is noted that in tank assembly 10', the only consumable component may be membrane 72, and tank sidewall 12 and membrane securing member 76' may be reused even after membrane 72 is replaced. Similar to the earlier described embodiments, a certain degree of tension may be present in membrane 72 due to how membrane 72 is mounted onto bottom rim 14 of tank sidewall 12.

Thus, various embodiments of a tank assembly of a 3D printing system have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

REFERENCE NUMERAL LIST 1 3D printing system
2 Extractor plate
3 Object
4 Photo-curing liquid polymer
5 Liquid Lubricant
6 Backing member
7 Mask
8 Light source
10, 10' Tank assembly
12 Tank sidewall
13 Central cavity (of tank sidewall)
14 Tank sidewall bottom rim
15 Central opening (of bottom rim)
16 Tank sidewall bottom groove
18 Handle
20 Magnet (of tank sidewall)
22 Inlet (for fresh resin)
24 Outlet (for used resin)
26 Channel (for fresh resin)
28 Channel (for used resin)
30 Tube coupling member (for fresh resin)
32 Tube coupling member (for used resin)
34 Port
36 Plug
38 Leg
40 Tube coupling member receptacle (for fresh resin)
42 Tube coupling member receptacle (for used resin)
44 Leg receptacle
46 Frame assembly
48, 48', 48" Membrane assembly
50 Frame
52 Central opening (of frame)
54 Top surface (of frame)
56 Bottom surface (of frame)
58 Outer side surface (of frame)
60 Inner side surface (of frame)
62 Groove (of frame)
64 Magnet (of frame)
66 Magnet receptacle (of frame)
68 Via (of frame)
70 Rib
72 Flexible membrane
74 Peripheral portion of membrane
76, 76' Membrane securing member
78 Via (of membrane securing member)
80 Frame
82 Central opening
84 Flange portion
85 Dashed line
86 Hollow shaft portion
88 Top surface (flange portion)
90 Inner side surface (flange portion)
92 Outer side surface (flange portion)
93 Bottom surface (flange portion)
94 Inner side surface (hollow shaft portion)
96 Outer side surface (hollow shaft portion)
98 Bottom surface (hollow shaft portion)
100 Membrane securing member

What is claimed is:

1. A membrane assembly, comprising:
a frame having a top surface, a bottom surface with a groove therein, an outer side surface, and an inner side surface adapted to be friction fit with a tank sidewall, the frame thereby forming a collar-like structure about a central opening with the outer side surface of the frame facing away from the central opening and the inner side surface of the frame facing towards the central opening;
a flexible membrane disposed with the central opening of the frame; and
a membrane securing member securing a perimeter portion of the flexible membrane within the groove of the frame.

2. The membrane assembly of claim 1, wherein the membrane assembly has a rectangular profile with rounded corners.

3. The membrane assembly of claim 1, wherein the flexible membrane comprises silicone that is enriched with polytetrafluoroethylene (PTFE).

4. The membrane assembly of claim 1, wherein the flexible membrane is transparent to electromagnetic radiation at one or more wavelengths.

5. The membrane assembly of claim 4, wherein the one or more wavelengths correspond to wavelengths of ultraviolet light.

6. The membrane assembly of claim 1, further comprising a plurality of magnets embedded in the frame of the membrane assembly.

7. The membrane assembly of claim 1, wherein the inner side surface of the frame includes ribs configured to engage the tank sidewall when the tank sidewall is friction fit with the frame.

8. The membrane assembly of claim 1, wherein the top surface of the frame comprises a plurality of vias that fluidly connect the top surface and the groove within the bottom surface of the frame.

9. The membrane assembly of claim 1, wherein the membrane securing member comprises a plurality of vias that fluidly connect a first surface of the membrane securing member with a second surface of the membrane securing member.

10. The membrane assembly of claim 1, wherein:
the frame comprises a first plurality of vias that fluidly connect the top surface and the groove within the bottom surface of the frame,
the membrane securing member comprises a second plurality of vias that fluidly connect a first surface of the membrane securing member with a second surface of the membrane securing member, and
the first plurality of vias is aligned with the second plurality of vias.

* * * * *